(12) United States Patent
Fonte

(10) Patent No.: US 11,827,402 B2
(45) Date of Patent: Nov. 28, 2023

(54) FILLING ALUMINUM CANS ASEPTICALLY

(71) Applicant: ColdSnap, Corp., Billerica, MA (US)

(72) Inventor: Matthew Fonte, Concord, MA (US)

(73) Assignee: ColdSnap, Corp., Billerica, MA (US)

(*) Notice: Subject to any disclaimer, the term of this patent is extended or adjusted under 35 U.S.C. 154(b) by 0 days.

(21) Appl. No.: 17/591,304

(22) Filed: Feb. 2, 2022

(65) Prior Publication Data
US 2022/0242602 A1 Aug. 4, 2022

Related U.S. Application Data

(60) Provisional application No. 63/144,682, filed on Feb. 2, 2021.

(51) Int. Cl.
B65B 25/10 (2006.01)
B65B 55/02 (2006.01)
B65B 25/00 (2006.01)
B65B 55/10 (2006.01)

(52) U.S. Cl.
CPC .......... *B65B 55/027* (2013.01); *B65B 25/001* (2013.01); *B65B 55/10* (2013.01)

(58) Field of Classification Search
USPC .......................................................... 53/167
See application file for complete search history.

(56) References Cited

U.S. PATENT DOCUMENTS

| 1,438,523 | A | 12/1922 | Duren |
| 1,555,701 | A | 9/1925 | Prichard et al. |
| 1,944,114 | A | 1/1934 | Skowlund |
| 2,350,534 | A | 6/1944 | Rosinger |
| 2,518,758 | A | 8/1950 | Cook |
| 2,541,814 | A | 2/1951 | Gaddini |
| 2,577,916 | A | 12/1951 | Rollman |
| 3,061,280 | A | 10/1962 | Kraft et al. |

(Continued)

FOREIGN PATENT DOCUMENTS

| CN | 203314023 | 12/2013 |
| CN | 106492721 | 3/2017 |

(Continued)

OTHER PUBLICATIONS

Allpax, "Shaka Retorts 1300 and 1600," 2020, retrieved Apr. 16, 2020 from URL <https://www.allpax.com/products/production-shaka-retorts/>, 4 pages.

(Continued)

*Primary Examiner* — Chinyere J Rushing-Tucker
(74) *Attorney, Agent, or Firm* — Fish & Richardson P.C.

(57) ABSTRACT

Methods of manufacturing shelf stable pods containing food or drink to be rapidly cooled, include inserting a mixing paddle into an aluminum can through an open end of a body of the can and sterilizing the can and mixing paddle at temperatures below a stress relief temperature of the can in a first aseptic chamber. The method also includes filling the can with a sterilized food or drink in the aseptic chamber, sealing a sterilized base of the can to the open end of the body of the can with a food-safe adhesive to create a hermetic seal, removing the can from the first aseptic chamber while maintaining the hermetic seal outside the first aseptic chamber, and mechanically seaming the base to the can.

36 Claims, 34 Drawing Sheets

(56) References Cited

U.S. PATENT DOCUMENTS

| | | |
|---|---|---|
| 3,393,900 A | 7/1968 | Wagner et al. |
| 3,635,147 A | 1/1972 | Lee |
| 3,896,959 A | 7/1975 | Roy |
| 3,914,673 A | 10/1975 | Wallin |
| 3,951,289 A | 4/1976 | Landen |
| 4,110,476 A | 8/1978 | Rhodes |
| 4,162,855 A | 7/1979 | Bender |
| 4,359,283 A | 11/1982 | McClellan |
| 4,408,690 A | 10/1983 | Ferrero |
| 4,535,604 A | 8/1985 | Cavalli et al. |
| 4,538,427 A | 9/1985 | Cavalli |
| 4,563,880 A | 1/1986 | Cipelletti |
| 4,568,192 A | 2/1986 | Kudermann |
| 4,573,329 A | 3/1986 | Cavalli |
| 4,583,863 A | 4/1986 | Pandolfi |
| 4,632,566 A | 12/1986 | Masel et al. |
| 4,635,560 A | 1/1987 | Ballantyne |
| 4,664,529 A | 5/1987 | Cavalli |
| 4,784,866 A | 11/1988 | Wissgott |
| 4,784,886 A | 11/1988 | Wissgott |
| 4,796,440 A | 1/1989 | Shiotani et al. |
| 4,827,732 A | 5/1989 | Suyama et al. |
| 4,885,917 A | 12/1989 | Spector |
| 4,910,972 A | 3/1990 | Jaster |
| 4,913,645 A | 4/1990 | Daouse et al. |
| 4,926,390 A | 5/1990 | Murzsa |
| 4,993,238 A | 2/1991 | Inagaki |
| 5,054,265 A * | 10/1991 | Perigo ............... B21D 51/32 53/425 |
| 5,264,237 A | 11/1993 | Traitler et al. |
| 5,331,820 A | 7/1994 | Faries et al. |
| 5,343,710 A | 9/1994 | Cathenaut et al. |
| 5,363,746 A | 11/1994 | Gordon |
| 5,435,143 A | 7/1995 | Heinrich |
| 5,447,036 A | 9/1995 | Heinrich |
| 5,533,800 A | 7/1996 | Stiegelmann et al. |
| 5,549,042 A | 8/1996 | Bukoschek et al. |
| 5,556,659 A | 9/1996 | De Pedro et al. |
| 5,568,729 A | 10/1996 | Heinrich et al. |
| 5,571,282 A | 11/1996 | Earle |
| 5,603,965 A | 2/1997 | Daouse |
| 5,692,633 A | 12/1997 | Gordon |
| 5,823,675 A | 10/1998 | Myerly |
| 5,834,739 A | 11/1998 | Lockwood et al. |
| 5,843,512 A | 12/1998 | Daouse et al. |
| 5,879,731 A | 3/1999 | Beckett et al. |
| 5,888,562 A | 3/1999 | Hansen et al. |
| 5,888,567 A | 3/1999 | Daouse |
| 5,932,275 A | 8/1999 | Nalur |
| 5,955,136 A | 9/1999 | Laaman et al. |
| 5,967,381 A | 10/1999 | Van Zeeland et al. |
| 6,004,606 A | 12/1999 | French et al. |
| 6,012,383 A | 1/2000 | Lande |
| 6,045,836 A | 4/2000 | Saunier et al. |
| 6,060,094 A | 5/2000 | Nalur |
| 6,071,546 A | 6/2000 | Nalur |
| 6,089,747 A | 7/2000 | Huang |
| 6,174,157 B1 | 1/2001 | Daouse et al. |
| 6,194,014 B1 | 2/2001 | Busse et al. |
| 6,210,739 B1 | 4/2001 | Nalur |
| 6,220,047 B1 | 4/2001 | Vogel et al. |
| 6,221,409 B1 | 4/2001 | Bueno Ceresuela |
| 6,251,455 B1 | 6/2001 | Thomas |
| 6,251,456 B1 | 6/2001 | Maul et al. |
| 6,267,049 B1 | 7/2001 | Silvano |
| 6,267,073 B1 | 7/2001 | Busse et al. |
| 6,272,974 B1 | 8/2001 | Pascotti et al. |
| 6,280,783 B1 | 8/2001 | Blaschke et al. |
| 6,284,294 B1 | 9/2001 | French et al. |
| 6,299,923 B1 | 10/2001 | Meziane |
| 6,338,569 B1 | 1/2002 | McGill |
| 6,338,863 B1 | 1/2002 | Amiel et al. |
| 6,340,488 B1 | 1/2002 | French et al. |
| 6,379,724 B1 | 4/2002 | Best et al. |
| 6,399,134 B1 | 6/2002 | Best et al. |
| 6,413,563 B1 | 7/2002 | Blaschke et al. |
| 6,431,395 B1 | 8/2002 | San Martin et al. |
| 6,444,044 B1 | 9/2002 | Beckett et al. |
| 6,454,455 B1 | 9/2002 | Jungvig |
| 6,479,085 B1 | 11/2002 | Archibald |
| 6,524,634 B2 | 2/2003 | Busse et al. |
| 6,524,635 B2 | 2/2003 | Aebi |
| 6,531,169 B2 | 3/2003 | Best et al. |
| 6,548,097 B1 | 4/2003 | Best et al. |
| 6,565,902 B2 | 5/2003 | Ruano Del Campo et al. |
| 6,579,375 B2 | 6/2003 | Beckett et al. |
| 6,592,928 B2 | 7/2003 | Makela et al. |
| 6,616,963 B1 | 9/2003 | Zerby et al. |
| 6,623,784 B2 | 9/2003 | Zerby et al. |
| 6,627,239 B1 | 9/2003 | Gavie et al. |
| 6,645,538 B2 | 11/2003 | Best et al. |
| 6,689,406 B2 | 2/2004 | Kuehl et al. |
| 6,713,101 B2 | 3/2004 | Lometillo et al. |
| 6,726,944 B2 | 4/2004 | Blaschke et al. |
| 6,739,475 B2 | 5/2004 | San Martin et al. |
| 6,758,056 B1 | 7/2004 | Cathenaut et al. |
| 6,790,467 B2 | 9/2004 | Kostival et al. |
| 6,818,238 B2 | 11/2004 | Napolitano et al. |
| 6,820,765 B2 | 11/2004 | Pahl |
| 6,824,808 B2 | 11/2004 | Best et al. |
| 6,835,406 B1 | 12/2004 | Wurzel et al. |
| 6,861,082 B2 | 3/2005 | Laffont et al. |
| 6,890,577 B2 | 5/2005 | Vaghela et al. |
| 6,936,794 B2 | 8/2005 | Zhang et al. |
| 6,942,885 B2 | 9/2005 | Ross et al. |
| 6,971,248 B1 | 12/2005 | Wiggs |
| 7,211,283 B2 | 5/2007 | Jones et al. |
| 7,314,307 B2 | 1/2008 | Cai |
| 7,407,681 B2 | 8/2008 | Marchon et al. |
| 7,451,613 B2 | 11/2008 | Barraclough et al. |
| 7,513,213 B2 | 4/2009 | Mange et al. |
| 7,619,188 B2 | 11/2009 | Oghafua et al. |
| 7,650,834 B2 | 1/2010 | Bravo |
| 7,658,960 B2 | 2/2010 | Thomas et al. |
| 7,727,573 B2 | 6/2010 | Vaghela et al. |
| 7,730,831 B2 | 6/2010 | Mange et al. |
| 7,736,681 B2 | 6/2010 | Belzowski et al. |
| 7,754,260 B2 | 7/2010 | Kruik et al. |
| 7,918,334 B2 | 4/2011 | Gaetano et al. |
| 8,182,853 B2 | 5/2012 | Puaud et al. |
| 8,273,392 B2 | 9/2012 | Ho et al. |
| 8,347,808 B2 | 1/2013 | Belzowski et al. |
| 8,425,967 B2 | 4/2013 | Vaghela et al. |
| 8,459,497 B2 | 6/2013 | Milan et al. |
| 8,628,811 B2 | 1/2014 | Panyam et al. |
| 8,685,477 B2 | 4/2014 | Almblad et al. |
| 8,720,493 B2 | 5/2014 | Dose et al. |
| 8,777,057 B2 | 7/2014 | Fiedler |
| 8,784,091 B2 | 7/2014 | Henriet et al. |
| 8,840,943 B2 | 9/2014 | Amend |
| 8,844,426 B2 | 9/2014 | Ochoa et al. |
| 8,877,179 B2 | 11/2014 | Mercenier et al. |
| 8,906,437 B2 | 12/2014 | Green et al. |
| 8,936,821 B2 | 1/2015 | Ummadi et al. |
| 8,940,352 B2 | 1/2015 | Ambrogi et al. |
| 8,960,992 B2 | 2/2015 | de Jong |
| 8,960,999 B1 | 2/2015 | Ochoa et al. |
| 8,980,354 B2 | 3/2015 | Harlaux-Pasquier et al. |
| 9,155,322 B2 | 10/2015 | Ricco et al. |
| 9,232,811 B2 | 1/2016 | Panyam et al. |
| 9,242,387 B2 | 1/2016 | Amend et al. |
| 9,253,993 B2 | 2/2016 | Ummadi et al. |
| 9,346,611 B1 | 5/2016 | Roberts et al. |
| 9,351,503 B2 | 5/2016 | Amend et al. |
| 9,351,504 B2 | 5/2016 | Ricco et al. |
| 9,448,006 B2 | 9/2016 | Kulkarni et al. |
| 9,572,358 B2 | 2/2017 | Whitehouse |
| 9,573,726 B2 | 2/2017 | Danesin et al. |
| 9,591,865 B2 | 3/2017 | Ravji et al. |
| 9,826,756 B2 | 11/2017 | Ummadi et al. |
| 9,861,114 B2 | 1/2018 | Lallemand et al. |
| 9,888,706 B2 | 2/2018 | Ummadi et al. |
| 9,913,486 B2 | 3/2018 | Nalur |
| 10,039,298 B2 | 8/2018 | Noth et al. |

(56) References Cited

U.S. PATENT DOCUMENTS

| | | |
|---|---|---|
| 10,058,833 B2 | 8/2018 | Bloch |
| 10,111,447 B2 | 10/2018 | Noth et al. |
| 10,117,445 B2 | 11/2018 | Imer |
| 10,149,487 B2 | 12/2018 | Shuntich |
| 10,279,973 B2 | 5/2019 | Butscher et al. |
| 10,314,320 B2 | 6/2019 | Roberts et al. |
| 10,334,868 B2 | 7/2019 | Fonte |
| 10,358,284 B2 | 7/2019 | Fonte |
| 10,368,561 B1 * | 8/2019 | Benson .................. B65D 81/24 |
| 10,368,680 B2 | 8/2019 | Ryan |
| 10,426,180 B1 | 10/2019 | Fonte |
| 10,543,978 B1 * | 1/2020 | Fonte ...................... A23G 9/22 |
| 10,604,337 B2 | 3/2020 | Fonte et al. |
| 10,612,835 B2 | 4/2020 | Fonte et al. |
| 10,667,542 B2 | 6/2020 | Fonte |
| 10,752,432 B2 | 8/2020 | Fonte et al. |
| 10,782,049 B1 | 9/2020 | Fonte et al. |
| 10,830,529 B2 | 11/2020 | Fonte et al. |
| 10,897,916 B2 | 1/2021 | Fonte |
| 10,973,240 B1 | 4/2021 | Fonte |
| 11,021,319 B2 | 6/2021 | Fonte |
| 11,033,044 B1 | 6/2021 | Fonte et al. |
| 11,109,610 B2 | 9/2021 | Fonte et al. |
| 11,175,075 B2 | 11/2021 | Flynn et al. |
| 11,230,429 B2 | 1/2022 | Fonte et al. |
| 11,279,609 B2 | 3/2022 | Fonte et al. |
| 11,280,543 B2 | 3/2022 | Fonte et al. |
| 11,311,026 B2 | 4/2022 | Fonte et al. |
| 11,337,438 B2 | 5/2022 | Fonte et al. |
| 11,337,439 B2 | 5/2022 | Fonte et al. |
| 2001/0035016 A1 | 11/2001 | Weber et al. |
| 2001/0052294 A1 | 12/2001 | Schmed |
| 2002/0001644 A1 | 1/2002 | Busse et al. |
| 2002/0020659 A1 | 2/2002 | Sweeney et al. |
| 2002/0034572 A1 | 3/2002 | Blaschke et al. |
| 2002/0166870 A1 | 11/2002 | Martin et al. |
| 2002/0182300 A1 | 12/2002 | Groh et al. |
| 2003/0000240 A1 | 1/2003 | Pahl |
| 2003/0012864 A1 | 1/2003 | Gerber |
| 2003/0017244 A1 | 1/2003 | Blaschke et al. |
| 2003/0035876 A1 | 2/2003 | Kostival et al. |
| 2003/0084898 A1 | 5/2003 | Beckett et al. |
| 2003/0134025 A1 | 7/2003 | Vaghela et al. |
| 2004/0058037 A1 | 3/2004 | Masuda et al. |
| 2004/0161503 A1 | 8/2004 | Malone et al. |
| 2004/0211201 A1 | 10/2004 | Bischel et al. |
| 2004/0219269 A1 | 11/2004 | Cathenaut et al. |
| 2005/0098561 A1 | 5/2005 | Schwoebel |
| 2005/0178796 A1 | 8/2005 | Schraiber |
| 2005/0189375 A1 | 9/2005 | McGill |
| 2005/0193896 A1 | 9/2005 | McGill |
| 2005/0229622 A1 | 10/2005 | Franck et al. |
| 2005/0279219 A1 | 12/2005 | Turi |
| 2006/0090654 A1 | 5/2006 | Mange et al. |
| 2006/0110507 A1 | 5/2006 | Yoakinn et al. |
| 2006/0110515 A1 | 5/2006 | Waletzko et al. |
| 2006/0254429 A1 | 11/2006 | Sinton |
| 2006/0255066 A1 | 11/2006 | Damiano et al. |
| 2006/0263490 A1 | 11/2006 | Wall et al. |
| 2006/0266751 A1 | 11/2006 | Ali et al. |
| 2006/0280826 A1 | 12/2006 | Mange et al. |
| 2007/0144357 A1 | 6/2007 | Rivera |
| 2007/0160722 A1 | 7/2007 | Best et al. |
| 2007/0172562 A1 | 7/2007 | Medina Quintanilla |
| 2007/0177455 A1 | 8/2007 | Renfro |
| 2007/0181604 A1 | 8/2007 | Rusch |
| 2007/0202231 A1 | 8/2007 | Ambrogi et al. |
| 2007/0275131 A1 | 11/2007 | Bertini et al. |
| 2008/0066483 A1 | 3/2008 | Klier et al. |
| 2008/0102172 A1 | 5/2008 | Capelle et al. |
| 2008/0113069 A1 | 5/2008 | Green et al. |
| 2008/0140437 A1 | 6/2008 | Russo et al. |
| 2008/0206404 A1 | 8/2008 | Green et al. |
| 2008/0206426 A1 | 8/2008 | Rousset et al. |
| 2008/0226771 A1 | 9/2008 | Cathenaut et al. |
| 2008/0239867 A1 | 10/2008 | Gilbert |
| 2008/0282723 A1 | 11/2008 | Perrier et al. |
| 2009/0017149 A1 | 1/2009 | Richman |
| 2009/0090254 A1 | 4/2009 | Rusch |
| 2009/0110559 A1 | 4/2009 | Bell et al. |
| 2009/0110786 A1 | 4/2009 | Wells |
| 2009/0147618 A1 | 6/2009 | Kovacic et al. |
| 2009/0179042 A1 | 7/2009 | Milan et al. |
| 2009/0191318 A1 | 7/2009 | Cocchi et al. |
| 2009/0223386 A1 | 9/2009 | Edwards et al. |
| 2009/0269452 A1 | 10/2009 | Dufort |
| 2009/0291170 A1 | 11/2009 | Rousset et al. |
| 2009/0304866 A1 | 12/2009 | Bovetto et al. |
| 2010/0034937 A1 | 2/2010 | Schmitt et al. |
| 2010/0068340 A1 | 3/2010 | Wille et al. |
| 2010/0068354 A1 | 3/2010 | Roberson et al. |
| 2010/0108696 A1 | 5/2010 | Farrell et al. |
| 2010/0124599 A1 | 5/2010 | Saikali et al. |
| 2010/0132310 A1 | 6/2010 | Dose et al. |
| 2010/0189866 A1 | 7/2010 | Denger |
| 2010/0196551 A1 | 8/2010 | Harlaux-Pasquier et al. |
| 2010/0203202 A1 | 8/2010 | Quessette et al. |
| 2010/0203215 A1 | 8/2010 | Russo |
| 2010/0206220 A1 | 8/2010 | Belzowski et al. |
| 2010/0206875 A1 | 8/2010 | Bratsch |
| 2010/0209562 A1 | 8/2010 | Henriet et al. |
| 2010/0209571 A1 | 8/2010 | Vaghela et al. |
| 2010/0269534 A1 | 10/2010 | Kumakiri et al. |
| 2010/0285178 A1 | 11/2010 | Labbe et al. |
| 2011/0000872 A1 | 1/2011 | Aneas |
| 2011/0003041 A1 | 1/2011 | Garbi et al. |
| 2011/0027427 A1 | 2/2011 | Panyam et al. |
| 2011/0088558 A1 | 4/2011 | Farrel et al. |
| 2011/0142996 A1 | 6/2011 | Kruger |
| 2011/0217425 A1 | 9/2011 | Puaud et al. |
| 2011/0229608 A1 | 9/2011 | Plessier et al. |
| 2011/0262600 A1 | 10/2011 | McGill |
| 2011/0311703 A1 | 12/2011 | Ummadi et al. |
| 2012/0096875 A1 | 4/2012 | Ravji et al. |
| 2012/0096876 A1 | 4/2012 | Ravji et al. |
| 2012/0100271 A1 | 4/2012 | Leas et al. |
| 2012/0138621 A1 | 6/2012 | Bratsch |
| 2012/0201932 A1 | 8/2012 | Kihnke |
| 2012/0320707 A1 | 12/2012 | Planet et al. |
| 2013/0008321 A1 | 1/2013 | Bravo |
| 2013/0045310 A1 | 2/2013 | Ricco et al. |
| 2013/0052308 A1 | 2/2013 | Palzer et al. |
| 2013/0074535 A1 | 3/2013 | Schmidt |
| 2013/0098088 A1 | 4/2013 | Lin et al. |
| 2013/0101702 A1 | 4/2013 | Nalur |
| 2013/0122176 A1 | 5/2013 | Ummadi et al. |
| 2013/0129896 A1 | 5/2013 | Ummadi et al. |
| 2013/0129897 A1 | 5/2013 | Lallemand et al. |
| 2013/0136842 A1 | 5/2013 | Ummadi et al. |
| 2013/0149421 A1 | 6/2013 | Vaghela et al. |
| 2013/0152620 A1 | 6/2013 | Ugolini |
| 2013/0206771 A1 | 8/2013 | Arnold et al. |
| 2013/0216660 A1 | 8/2013 | Green et al. |
| 2013/0236581 A1 | 9/2013 | Mercenier et al. |
| 2013/0259975 A1 | 10/2013 | Schaffer-Lequart et al. |
| 2013/0323393 A1 | 12/2013 | Olmos et al. |
| 2013/0340456 A1 | 12/2013 | Hoare et al. |
| 2014/0000302 A1 | 1/2014 | Cocchi et al. |
| 2014/0004230 A1 | 1/2014 | Ricco et al. |
| 2014/0033969 A1 | 2/2014 | Leas et al. |
| 2014/0065270 A1 | 3/2014 | Huynh-Ba et al. |
| 2014/0083879 A1 | 3/2014 | Ulstad |
| 2014/0099422 A1 | 4/2014 | Panyam et al. |
| 2014/0106055 A1 | 4/2014 | Gamay |
| 2014/0123859 A1 | 5/2014 | Verbeek |
| 2014/0141147 A1 | 5/2014 | Dopfer et al. |
| 2014/0161940 A1 | 6/2014 | Aviles et al. |
| 2014/0178534 A1 | 6/2014 | Amend et al. |
| 2014/0197195 A1 | 7/2014 | Peuker et al. |
| 2014/0211586 A1 | 7/2014 | Conti |
| 2014/0231562 A1 | 8/2014 | Potter et al. |
| 2014/0242229 A1 | 8/2014 | Whitehouse |
| 2014/0255558 A1 | 9/2014 | Amend et al. |
| 2014/0272016 A1 | 9/2014 | Nowak |

(56) References Cited

U.S. PATENT DOCUMENTS

| | | |
|---|---|---|
| 2014/0335232 A1 | 11/2014 | Halachmi |
| 2014/0335255 A1 | 11/2014 | Jung et al. |
| 2014/0370173 A1 | 12/2014 | Gunes et al. |
| 2015/0017286 A1 | 1/2015 | Ural et al. |
| 2015/0064330 A1 | 3/2015 | Ummadi et al. |
| 2015/0099050 A1 | 4/2015 | Ummadi et al. |
| 2015/0128619 A1 | 5/2015 | Wild |
| 2015/0140193 A1 | 5/2015 | Desai et al. |
| 2015/0157040 A1 | 6/2015 | Althaus et al. |
| 2015/0157042 A1 | 6/2015 | Amend et al. |
| 2015/0164106 A1 | 6/2015 | Ricco et al. |
| 2015/0166222 A1 | 6/2015 | Danesin et al. |
| 2015/0201646 A1 | 7/2015 | Olmos et al. |
| 2015/0201810 A1 | 7/2015 | Sands |
| 2015/0210443 A1* | 7/2015 | Sarson .............. B65D 3/268 220/592.2 |
| 2015/0219506 A1 | 8/2015 | Izadi-Zamanabadi et al. |
| 2015/0245638 A1 | 9/2015 | Ummadi et al. |
| 2015/0282502 A1 | 10/2015 | Ummadi et al. |
| 2015/0289538 A1 | 10/2015 | Ummadi et al. |
| 2015/0289540 A1 | 10/2015 | Imer |
| 2015/0296831 A1 | 10/2015 | Noth et al. |
| 2015/0296833 A1 | 10/2015 | Ummadi et al. |
| 2015/0327571 A1 | 11/2015 | Amend |
| 2015/0329282 A1 | 11/2015 | Bartoli et al. |
| 2015/0351426 A1 | 12/2015 | Ricco et al. |
| 2015/0351430 A1 | 12/2015 | Pipe et al. |
| 2015/0353261 A1 | 12/2015 | Gupta |
| 2016/0051081 A1 | 2/2016 | Grassia et al. |
| 2016/0135479 A1 | 5/2016 | Ummadi et al. |
| 2016/0176624 A1 | 6/2016 | Talon |
| 2016/0192675 A1 | 7/2016 | Abu-Ali |
| 2016/0213026 A1 | 7/2016 | Lepagnol et al. |
| 2016/0214787 A1* | 7/2016 | Iotti .............. B65D 85/8052 |
| 2016/0235089 A1 | 8/2016 | Ricco et al. |
| 2016/0255858 A1 | 9/2016 | Noth et al. |
| 2016/0270424 A1 | 9/2016 | Noth et al. |
| 2016/0278401 A1 | 9/2016 | Noth et al. |
| 2016/0309739 A1 | 10/2016 | Chandrsekaran |
| 2016/0309740 A1 | 10/2016 | Bunce et al. |
| 2016/0309741 A1 | 10/2016 | Zhou et al. |
| 2016/0309742 A1 | 10/2016 | Ma et al. |
| 2016/0316778 A1 | 11/2016 | Nagy et al. |
| 2016/0316784 A1 | 11/2016 | Chandrasekaran |
| 2016/0332188 A1 | 11/2016 | Agnello |
| 2016/0338378 A1 | 11/2016 | Ummadi et al. |
| 2016/0347525 A1 | 12/2016 | Butscher et al. |
| 2017/0000162 A1 | 1/2017 | Lallemand et al. |
| 2017/0042182 A1 | 2/2017 | Olmos et al. |
| 2017/0042183 A1 | 2/2017 | Puaud et al. |
| 2017/0042184 A1 | 2/2017 | Olmos et al. |
| 2017/0079305 A1 | 3/2017 | Barniol Gutierrez et al. |
| 2017/0112326 A1 | 4/2017 | Ochoa et al. |
| 2017/0173544 A1 | 6/2017 | Laby |
| 2017/0183210 A1 | 6/2017 | Wyatt et al. |
| 2017/0188600 A1 | 7/2017 | Scharfman et al. |
| 2017/0215456 A1 | 8/2017 | Noth et al. |
| 2017/0217648 A1 | 8/2017 | Bouzaid et al. |
| 2017/0225879 A1 | 8/2017 | Stein et al. |
| 2017/0265495 A1 | 9/2017 | Amend |
| 2017/0275086 A1 | 9/2017 | Perentes et al. |
| 2017/0275088 A1 | 9/2017 | Bouzaid et al. |
| 2017/0280745 A1 | 10/2017 | Herbert et al. |
| 2017/0318833 A1 | 11/2017 | Curschellas et al. |
| 2017/0318995 A1 | 11/2017 | Rai |
| 2017/0326749 A1 | 11/2017 | Amend |
| 2017/0332656 A1 | 11/2017 | Amend |
| 2017/0332844 A1 | 11/2017 | Behar et al. |
| 2017/0339976 A1 | 11/2017 | Amend |
| 2017/0360061 A1 | 12/2017 | Fonte |
| 2017/0367371 A1 | 12/2017 | Lebleu et al. |
| 2018/0008087 A1 | 1/2018 | Miller et al. |
| 2018/0042258 A1 | 2/2018 | Roberts et al. |
| 2018/0042279 A1 | 2/2018 | Kerler et al. |
| 2018/0056256 A1 | 3/2018 | Sun et al. |
| 2018/0064127 A1 | 3/2018 | Chisholm et al. |
| 2018/0064131 A1 | 3/2018 | Noth |
| 2018/0064132 A1 | 3/2018 | Noth |
| 2018/0084800 A1 | 3/2018 | Noth |
| 2018/0092378 A1 | 4/2018 | Webering et al. |
| 2018/0117545 A1 | 5/2018 | Noth |
| 2018/0141011 A1 | 5/2018 | Mou |
| 2018/0146695 A1 | 5/2018 | Amend et al. |
| 2018/0146699 A1 | 5/2018 | Vafeiadi et al. |
| 2018/0169599 A1 | 6/2018 | Ahmad et al. |
| 2018/0177545 A1 | 6/2018 | Boudreaux et al. |
| 2018/0199760 A1 | 7/2018 | Rai |
| 2018/0213816 A1 | 8/2018 | Amend |
| 2018/0263274 A1 | 9/2018 | Ray et al. |
| 2018/0271115 A1 | 9/2018 | Ray et al. |
| 2019/0021548 A1 | 1/2019 | Eisner |
| 2019/0029248 A1 | 1/2019 | Cutting |
| 2019/0053513 A1 | 2/2019 | Halachmi |
| 2019/0053514 A1 | 2/2019 | Fonte et al. |
| 2019/0069725 A1 | 3/2019 | Wang et al. |
| 2019/0239534 A1 | 8/2019 | Halachmi |
| 2019/0254307 A1 | 8/2019 | Noth et al. |
| 2019/0269148 A1 | 9/2019 | Bouzaid et al. |
| 2019/0270555 A1 | 9/2019 | Noth et al. |
| 2019/0291947 A1 | 9/2019 | Kruger |
| 2019/0313665 A1 | 10/2019 | Fonte |
| 2019/0320679 A1 | 10/2019 | Halachmi |
| 2019/0325182 A1 | 10/2019 | Noth et al. |
| 2019/0329948 A1 | 10/2019 | Ritzenhoff et al. |
| 2019/0330038 A1 | 10/2019 | Melrose |
| 2019/0344955 A1 | 11/2019 | Fonte |
| 2019/0357564 A1 | 11/2019 | Yang et al. |
| 2020/0022382 A1 | 1/2020 | Fonte |
| 2020/0055664 A1 | 2/2020 | Fonte et al. |
| 2020/0055665 A1 | 2/2020 | Fonte et al. |
| 2020/0056814 A1 | 2/2020 | Fonte et al. |
| 2020/0146308 A1 | 5/2020 | Roberts et al. |
| 2020/0146311 A1 | 5/2020 | Halachmi |
| 2020/0245818 A1 | 8/2020 | Halkes et al. |
| 2020/0292212 A1 | 9/2020 | Fonte et al. |
| 2020/0315206 A1 | 10/2020 | Fonte |
| 2020/0326124 A1 | 10/2020 | Fonte et al. |
| 2020/0333056 A1 | 10/2020 | Ito et al. |
| 2020/0378659 A1 | 12/2020 | Novak et al. |
| 2021/0002066 A1 | 1/2021 | Fonte |
| 2021/0002067 A1 | 1/2021 | Fonte |
| 2021/0003342 A1 | 1/2021 | Fonte et al. |
| 2021/0007370 A1 | 1/2021 | Fonte |
| 2021/0032015 A1 | 2/2021 | Fonte |
| 2021/0076694 A1 | 3/2021 | Prewett et al. |
| 2021/0084930 A1 | 3/2021 | Fonte |
| 2021/0127706 A1 | 5/2021 | Fonte |
| 2021/0130083 A1 | 5/2021 | Fonte et al. |
| 2021/0212338 A1 | 7/2021 | Fonte et al. |
| 2021/0325105 A1 | 10/2021 | Fonte et al. |
| 2021/0368819 A1 | 12/2021 | Fonte et al. |
| 2021/0371265 A1 | 12/2021 | Fonte et al. |
| 2022/0127070 A1 | 4/2022 | Fonte et al. |

FOREIGN PATENT DOCUMENTS

| | | |
|---|---|---|
| DE | 1211905 | 3/1966 |
| EP | 0471904 | 2/1992 |
| EP | 1009678 | 6/2000 |
| EP | 1139837 | 10/2001 |
| EP | 1415543 | 5/2004 |
| EP | 1907300 | 4/2008 |
| EP | 2266418 | 12/2010 |
| EP | 2281464 | 2/2011 |
| EP | 2679100 | 1/2014 |
| EP | 2775855 | 9/2014 |
| EP | 3044125 | 7/2016 |
| EP | 3160870 | 5/2017 |
| FR | 2501009 | 9/1982 |
| FR | 2501080 | 9/1982 |
| GB | 978808 | 12/1964 |
| JP | H11-507295 | 6/1999 |
| JP | 2002/068304 | 3/2002 |
| JP | 2005/318869 | 11/2005 |

(56) References Cited

FOREIGN PATENT DOCUMENTS

| | | |
|---|---|---|
| JP | 2006/027662 | 2/2006 |
| WO | WO 1996/001224 | 1/1996 |
| WO | WO 1998/046486 | 10/1998 |
| WO | WO 2004/054380 | 7/2004 |
| WO | WO 2010/103483 | 9/2010 |
| WO | WO 2010/149509 | 12/2010 |
| WO | WO 2013/121421 | 8/2013 |
| WO | WO 2015/063092 | 5/2015 |
| WO | WO 2015/063094 | 5/2015 |
| WO | WO 2015/077825 | 6/2015 |
| WO | WO 2016/079641 | 5/2016 |
| WO | WO 2016/081477 | 5/2016 |
| WO | WO 2017/087970 | 5/2017 |
| WO | WO 2017/139395 | 8/2017 |
| WO | WO 2017/176580 | 10/2017 |
| WO | WO 2017/214357 | 12/2017 |
| WO | WO 2018/109765 | 6/2018 |
| WO | WO 2019/117804 | 6/2019 |
| WO | WO 2019/140251 | 7/2019 |
| WO | WO 2019/171588 | 9/2019 |
| WO | WO 2020/037287 | 2/2020 |
| WO | WO 2020/037293 | 2/2020 |
| WO | WO 2020/037296 | 2/2020 |
| WO | WO 2020/039439 | 2/2020 |
| WO | WO 2020/053859 | 3/2020 |
| WO | WO 2020/089919 | 5/2020 |
| WO | WO 2020/163369 | 8/2020 |

OTHER PUBLICATIONS

Arellano et al., "Online ice crystal size measurements during sorbet freezing by means of the focused beam reflectance measurement (FBRM) technology," Influence of Operating Conditions, Journal of Food Engineering, Nov. 1, 2012, 113(2):351-9.

Caldwell et al., "A low-temperature scanning electron microscopy study of ice cream. II. Influence of selected ingredients and processes, " Food Structure, 1992;11(1):2, 10 pages.

Cook et al., "Mechanisms of Ice Crystallization in Ice Cream production," Comprehensive Reviews in Food Science and Food safety, Mar. 2010, 9(2):213-22.

Design Integrated Technology, "Propellant Equipment Used by Arsenals Worldwide," 2016, retrieved on Apr. 16, 2020 from URL <https://www.ditusa.com/sc_helicone_mixers.php>, 3 pages.

Drewett et al., "Ice crystallization in a scraped surface freezer," Journal of Food Engineering, Feb. 1, 2007, 78(3):1060-6.

EP European Office Action by European Appln. No. 19762064.4, dated Oct. 25, 2021, 10 pages.

EP European Search Report in European Appln. No. 21181499.1, dated Nov. 3, 2021, 14 pages.

EP European Search Report in European Appln. No. 21199240.9, dated Feb. 2, 2022, 13 pages.

EP European Search Report in European Appln. No. 21199244.1, dated Feb. 2, 2022, 13 pages.

EP European Search Report in European Appln. No. 21199245.8, dated Feb. 2, 2022, 12 pages.

EP European Search Report in European Appln. No. 21199250.8, dated Feb. 2, 2022, 13 pages.

EP European Search Report in European Appln. No. 21199252.4, dated Feb. 2, 2022, 11 pages.

EP European Search Report in European Appln. No. 21199271.4, dated Feb. 2, 2022, 8 pages.

EP Extended Search Report in European Appln. No. 17814210.5, dated Jan. 24, 2020, 11 pages.

EP Office Action by European Appln. No. 19762063.6, dated Feb. 11, 2022, 6 pages.

Gonzalez-Ramirez et al., "Moments model for a continuous sorbet crystallization process," The 23rd IIR International Congress of Refrigeration, Refrigeration for Sustainable Development, Prague, Czech Republic, Aug. 2011, pp. 21-26.

Hagiwara et al., "Effect of sweetener, stabilizer, and storage temperature on ice recrystallization in ice cream," Journal of Dairy Science, May 1, 1996, 79(5):735-44.

Hosford et al., "The aluminum beverage can," Scientific American, Sep. 1, 1994, 271(3):48-53.

Ice Cream Science, "How Long Does Homemade Ice Cream Last in the Freezer," Jun. 3, 2016, retrieved Apr. 16, 2020 from URL <http://icecreamscience.com/long- ice-cream-last-freezer/>, 18 pages.

Ice Cream Science, "Ice Crystals in Ice Cream," Oct. 20, 2016, retrieved on Apr. 16, 2020 from URL <http://icecreamscience.com/ice-crystals-in-ice-cream/>, 18 pages.

Ice Cream, 2nd Edition, Arbuckle, 1972, pp. 96 and 240.

Inoue et al., "Modeling of the effect of freezer conditions on the principal constituent parameters of ice cream by using response surface methodology," Journal of Dairy Science, May 1, 2008, 91(5):1722-32.

International Search Report and Written Opinion in International Appln. No. PCT/US2022/070483, dated May 23, 2022, 15 pages.

JP Office Action in Japanese Appln. No. 2019-518176, dated Jan. 6, 2021, 8 pages (with English translation).

PCT Authorized Officer Gwenaelle Llorca, European Patent Office, International Application No. PCT/US2019/013286, "Invitation to Pay Additional Fees and, Where Applicable, Protest Fee", International Searching Authority, Apr. 4, 2019, 16 pages.

PCT International Preliminary Report on Patentability in International Appln. No. PCT/US17/37972, dated Dec. 18, 2018, 12 pages.

PCT International Preliminary Report on Patentability in International Appln. No. PCT/US2019/046946, dated Feb. 23, 2021, 16 pages.

PCT International Preliminary Report on Patentability in International Appln. No. PCT/US2019/046954, dated Feb. 23, 2021, 14 pages.

PCT International Preliminary Report on Patentability in International Appln. No. PCT/US2019/046958, dated Feb. 23, 2021, 17 pages.

PCT International Preliminary Report on Patentability in International Appln. No. PCT/US2020/051664, dated Mar. 31, 2022, 12 pages.

PCT International Report on Patentability in International Appln. No. PCT/2019/013286, dated Jul. 23, 2020, 16 pages.

PCT International Search Report and Written Opinion in International Appln. No. PCT/US17/37972, dated Oct. 27, 2017, 16 pages.

PCT International Search Report and Written Opinion in International Appln. No. PCT/US2019/013286, dated May 31, 2019, 21 pages.

PCT International Search Report and Written Opinion in International Appln. No. PCT/US2019/046946, dated Jan. 24, 2020, 24 pages.

PCT International Search Report and Written Opinion in International Appln. No. PCT/US2019/046954, dated Nov. 21, 2019, 20 pages.

PCT International Search Report and Written Opinion in International Appln. No. PCT/US2019/046958, dated Jan. 24, 2020, 25 pages.

PCT International Search Report and Written Opinion in International Appln. No. PCT/US2020/051664, dated Dec. 17, 2020, 44 pages.

PCT International Search Report and Written Opinion in International Appln. No. PCT/US2021/013619, dated Jun. 2, 2021, 15 pages.

PCT International Search Report and Written Opinion in International Appln. No. PCT/US2021/035260, dated Oct. 1, 2021, 18 pages.

PCT Invitation to Pay Additional Fees in International Appln. No. PCT/US2019/046946, dated Dec. 2, 2019, 19 pages.

Reichart, "Speed of Dasher and Scraper as Affecting the Quality of Ice Cream and Sherbet," Journal of Dairy Science, Mar. 1, 1931, 14(2):107-15.

Shaka Process, "Higher Quality Ambient Foods," 2018, retrieved Apr. 16, 2020 from URL <http://shakaprocess.com/>, 2 pages.

(56) References Cited

OTHER PUBLICATIONS

Tetra Pak Homogenizers, "Ice Cream Homogenization for Sounds Performance," 2014, retrieved Apr. 16, 2020 from URL <https://assets.tetrapak.com/static/documents/tetra_pak_homogenizers_br_63880_low.pdf>, 4 pages.

U.S. Notice of Allowance in U.S. Appl. No. 16/592,031, dated Jan. 10, 2020, 8 pages.

Waste Management Inc et al. "Tip: Aluminum Trays and Pans Are Recyclable," Nov. 2016 pp. 1-2 https://www.stocktonrecycles.conn/alunninunn-trays-pans-recyclable/.

Xiao-Wim, "This New Kitchen Gadget Makes Fro-Yo in Minutes", by Bloomberg, Aug. 8, 2017, 4 pages, http://fortune.com/2017/08/08/wim-frozen-yogurt-minutes/ Oct. 12, 2018.

PCT International Preliminary Report on Patentability in International Appln. No. PCT/US2022/070483, dated Aug. 17, 2023, 8 pages.

\* cited by examiner

FILLING ALUMINUM CANS ASEPTICALLY

CLAIM OF PRIORITY

This application claims priority under 35 USC § 119(e) to U.S. Patent Application Ser. No. 63/144,682, filed on Feb. 2, 2021, the entire contents of which are hereby incorporated by reference.

TECHNICAL FIELD

This specification generally relates to filling aluminum cans aseptically.

BACKGROUND

Aseptic processing involves three primary steps: thermal sterilization of the product; sterilization of the packaging material; and preservation of sterility during packaging.

To maintain commercial sterility, aseptic processing facilities are required to maintain proper documentation of production operations, showing that commercially sterile conditions were achieved and maintained in all areas of the facility. Any breach of a scheduled process for the processing or packaging system means that the affected product must be destroyed, reprocessed or segregated and held for further evaluation. In addition, the processing and packaging system must be cleaned and re-sterilized before processing and/or packaging operations can resume. Packaging equipment and packaging materials are sterilized with various mediums such as saturated steam, superheated steam, hydrogen peroxide, and/or heat.

SUMMARY

This specification describes systems and methods for aseptically filling aluminum cans. These systems and methods can be used to fill aluminum cans (e.g. thin-walled aluminum cans similar to soda cans) with, for example, low acidity foods or beverages.

In certain aspects, a method of manufacturing shelf stable pods containing food or drink to be rapidly cooled includes inserting a mixing paddle into a thin-walled aluminum can through an open end of a body of the can, sterilizing the can and mixing paddle at temperatures below a stress relief temperature of the can in an aseptic chamber, filling the can with a sterilized food or drink in the aseptic chamber, and sealing a sterilized base of the can to the open end of the body of the can with a food-safe adhesive to create a hermetic seal. The method also includes removing the can from the aseptic chamber while maintaining the hermetic seal outside the aseptic chamber and mechanically seaming the base to the can. The term aseptic chamber is used to indicate a chamber that is designed and configured to maintain aseptic conditions within the chamber during normal operating conditions. For example, an aseptic chamber with air-tight walls and joints and access ports that include systems to sterilize material passing through the ports.

In some embodiments, sterilizing the can and mixing paddle at temperatures below a stress relief temperature of the can in a first aseptic chamber includes contacting the can and mixing paddle with a sterilization medium using one or more of immersion bath technology, spraying technology, dry disinfection, rinser cold disinfection, or sterilization. The sterilization medium can be at least one of: hydrogen peroxide, vaporized hydrogen peroxide, peracetic acid, steam, and ozone.

In some cases, removing the can and base from the first aseptic chamber includes moving the can and base along a conveyor system.

The method can also include, prior to sealing the sterilized base to the open end of the body of the can with a food-safe adhesive to create the hermetic seal, sterilizing the base in a second aseptic chamber and transporting the base into the first aseptic chamber while maintaining the base in aseptic conditions.

Some bases have a protrusion.

Some bases include or are made of aluminum.

Some paddles include or are made of aluminum.

In some methods, the adhesive is at least one of: a heat-set adhesive, a hot melt adhesive, a pressure-sensitive adhesive, a glue, and an epoxy. The adhesive can be a food safe resin compliant with FDA Station 175.105 or 21 CFR Stations 175.105 or 177.1395.

In some embodiments, the method includes receiving sterilized food or drink at a dispensing system, the sterilized food or drink sterilized by ultra-high temperature (UHT) processing system or a high-temperature, short-time (HTST) processing system.

Some methods also include injecting liquefied gas into the body of the can prior to sealing the sterilized base to the open end of the body of the can. The liquefied gas can be sterilized to eradicate microbial contamination prior to being injected into the can. In some methods, the liquefied gas is injected to generate an internal pressure of about 5 psi to about 50 psi above atmospheric pressure. The internal pressure may be maintained in the first aseptic chamber and outside the first aseptic chamber.

In some methods, the step of sealing the sterilized base to the open end of the body of the can includes curing the adhesive by heat.

In some embodiments, the step of sealing the sterilized base to the open end of the body of the can with the food-safe adhesive includes curing the adhesive inductively or conductively.

In some methods, the step of sealing the sterilized base to the open end of the body of the can with the food-safe adhesive includes applying pressure to the base.

In some embodiments, the step of sealing the sterilized base to the open end of the body of the can with the food-safe adhesive includes applying the adhesive to the can.

In some methods, the step sealing the sterilized base to the open end of the body of the can with the food-safe adhesive includes applying the adhesive to the base.

The step of seaming the base to the can may include seaming the base to the can using a 2-roller can seamer.

In certain aspects, a method of manufacturing shelf stable pods containing food or drink to be rapidly cooled includes sterilizing a thin-walled aluminum can at temperatures below a stress relief temperature of the can in a filling system, sterilizing a mixing paddle below a stress relief temperature of the paddle in the filling system, sterilizing a base below a stress relief temperature of the base in the filling system, inserting the mixing paddle into the thin-walled aluminum can through an open end of a body of the can in a primary chamber of the aseptic filling system while maintaining aseptic conditions in the primary chamber, and filling the can with sterilized food or drink in the primary chamber. The method also includes securing the base to the open end of the body of the can with a food-safe adhesive to create a hermetic seal, removing the can and base from the primary chamber while maintaining the hermetic seal, and seaming the base to the can.

In some methods, the step of removing the can and base from the primary aseptic chamber includes moving the can and base along a conveyor system.

Some mixing paddles are inserted into the body using a robotic system under sterile conditions.

In certain aspects, a method of manufacturing shelf stable pods containing food or drink to be rapidly cooled, includes inserting a mixing paddle into a thin-walled aluminum can through an open end of a body of the can, sterilizing the can and mixing paddle at temperatures below a stress relief temperature of the can or mixing paddle, aseptically filling the can with sterilized food or drink, and sealing the can.

In certain aspects, a method of manufacturing shelf stable pods containing food or drink to be rapidly cooled, includes sterilizing a thin-walled aluminum can at temperatures below a stress relief temperature of the can, sterilizing a mixing paddle at temperatures below a stress relief temperature of the mixing paddle, inserting the mixing paddle into a thin-walled aluminum can through an open end of a body of the can, aseptically filling the can with sterilized food or drink, and sealing the can.

In certain aspects, a method of manufacturing shelf stable pods containing food or drink to be rapidly cooled, includes sterilizing a thin-walled aluminum can at temperatures below a stress relief temperature of the can, sterilizing a mixing paddle at temperatures below a stress relief temperature of the mixing paddle, inserting the mixing paddle into a thin-walled aluminum can through an open end of a body of the can, aseptically filling the can with sterilized food or drink, and securing a pre-sterilized base to the open end of the body of the can with a food-safe adhesive to create a hermetic seal.

These systems and methods can be used to fill thin-walled aluminum cans with little to no deformation of the cans. This feature is particularly significant in packaging that requires particular dimensions. For example, the pods described in U.S. Pat. No. 10,543,978 B1, the contents of which are incorporated herein by reference, can be used to produce cooled food and drinks. The pods contain internal stirring paddles configured to wipe the inner sidewalls of the pods during, for example, the production of ice cream. In contrast to systems that sterilize containers using 415° Fahrenheit superheated steam, the approach described in this specification enables the use of thin-walled aluminum cans (e.g., cans with walls between 0.001 inches to 0.015 inches, for example, about 0.004 inches) in cooling food or drink (e.g., freezing dairy-based ingredients to make ice cream or other frozen confections). Such cans cannot be used with systems using superheated steam sterilization because the applied temperatures would potentially soften the walls of these cans with the resulting deformation likely to result in binding between the walls of the pod and the internal mixing paddle during use.

This is important because the bodies and bases of aluminum cans derive their strength from both hot and cold working during manufacturing drawing steps. For the bodies of aluminum cans made of 3000 series aluminum, it is typical to achieve 310 MPa Ultimate Tensile Strength (UTS) as rolled. After curing the internal coating onto the can in a baking process, the strength decreases closer to 243 MPa UTS. For the can bases made of 5000 series aluminum, the work-hardened operations can achieve material strengths over 350 MPa UTS but baking the coating on can reduce their strength to 250 MPa UTS.

FIG. 8 illustrates the effects of temperatures on the yield strength of aluminum. Recovery annealing is also accompanied by changes in other properties of cold-worked aluminum. Generally, some property change can be detected at temperatures as low as 200° F. to 250° F. (e.g., 90° C. to 120° C.) and the change increases in magnitude with increasing temperature.

Using commercially available aseptic can filling systems relying on superheated sterilization at 210° C. to 212.8° C. (410° F. to 415° F.) would undesirably stress relieve the aluminum's mechanical properties weakening the can. The resulting distortion can make sealing of bases to bodies of the cans very difficult. Additionally, the bodies and bases of aluminum are typically made of different materials that have different coefficients of thermal expansion. This can cause the bodies and bases of aluminum cans to expand differently during sterilization heating, making sealing very difficult. In addition, heavily cold-worked, thin-walled aluminum cans are susceptible to dimensional distortion if subjected to high heat or thermal shock. This dimensional distortion from superheated steam could also make the operation of seaming of the bases to the bodies of aluminum cans very difficult. The problem is magnified when the thin-walled aluminum grows from the heat associated with the thermal coefficient of expansion during superheating, making the seaming process even more problematic while hot in the sterile environment of the aseptic chamber.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes systems and methods for aseptically filling aluminum cans. These systems and methods can be used to fill aluminum cans (e.g., thin-walled aluminum cans similar to soda cans) with, for example, low acidity foods or beverages.

Figure 1:
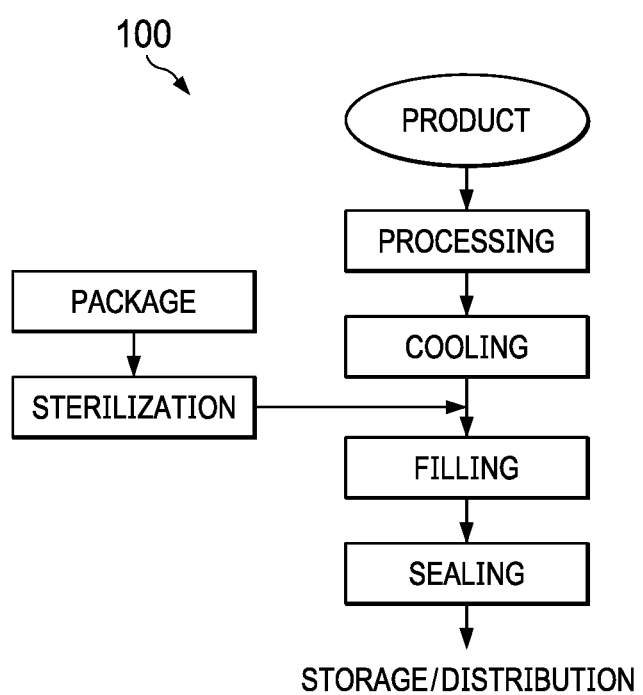
FIG. 1 is a schematic flow diagram of an aseptic packaging system.

FIG. 1 is a schematic flow diagram of a method 100 for aseptic packaging. The method 100 occurs at least partially in a chamber of a filling unit under aseptic conditions. The filling unit fills sterile product into sterile packages within the confines of the sterile zone of a chamber of a filling unit under aseptic conditions. The combination of a sterile product, a sterile package, and the sterile zone prevent post-processing contamination. The food or beverage contact surfaces of the container are sterile. The sterile product is filled aseptically into the containers and the containers are sealed hermetically. The filling unit includes automation monitoring and controlling the critical points of the transfer.

In this approach, the containers are disinfected to reduce the likelihood of biological contamination of the foodstuff during the packaging process. The goal of the disinfection is to reduce the germ count by at least log 12 (i.e., $1/10^{12}$). This approach can be implemented using immersion bath technology, spraying technology, dry disinfection, rinser cold disinfection or combination of these approaches.

Figure 2:
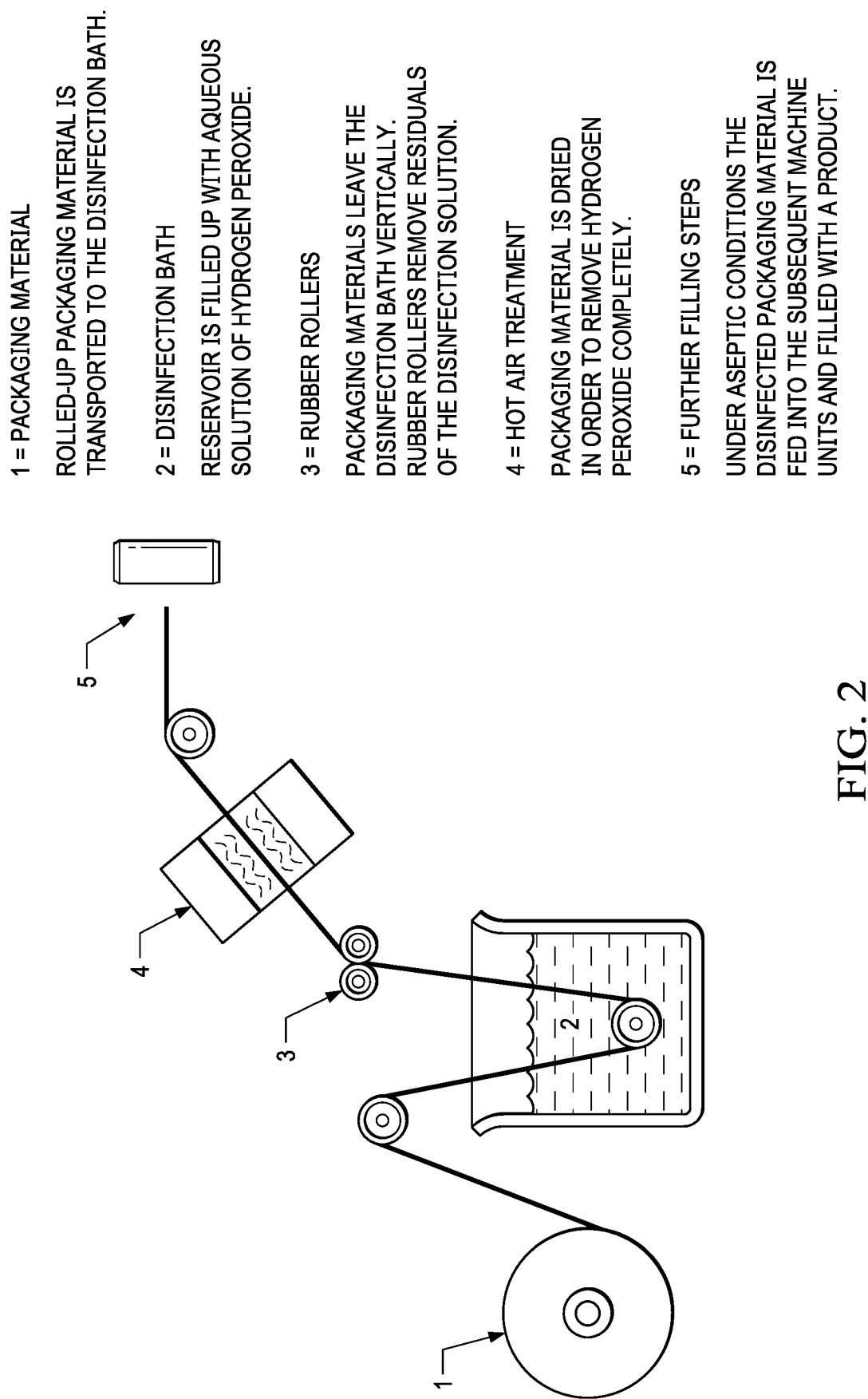
FIG. 2 illustrates immersion bath technology.

FIG. 2 illustrates immersion bath technology. In this approach, aluminum cans are passed through a heated bath of 35% hydrogen peroxide ($H_2O_2$). As there are only a few seconds of contact, the $H_2O_2$ is heated to a temperature of 70° C. to 85° C. to achieve an appropriate germ reduction. Remaining hydrogen peroxide is removed by pressurized air, the packaging unit (e.g., the can) is filled with food or beverage, and the packaging unit sealed. At this operating temperature, water evaporates and the concentration of $H_2O_2$ in the bath increases above 40%. The average consumption of $H_2O_2$ 35% is about 0.2 ml per can processed. Some systems include heating elements to support removal of $H_2O_2$ and completion of sterilization. Heat is generally applied using a tube heater, a horizontally placed heating element located above containers into which $H_2O_2$ has been sprayed, air knives that blow hot sterile air against packaging after emergence from an $H_2O_2$ immersion tank, or a water-heated stainless steel drum. Some systems use sterile air (generated by heating and subsequently cooling air) and associated sterile air filters to provide over-pressure in a sterile zone. Some systems include gas flush components in which nitrogen or other sterile gases is used to flush equipment or container headspace.

Figure 3:
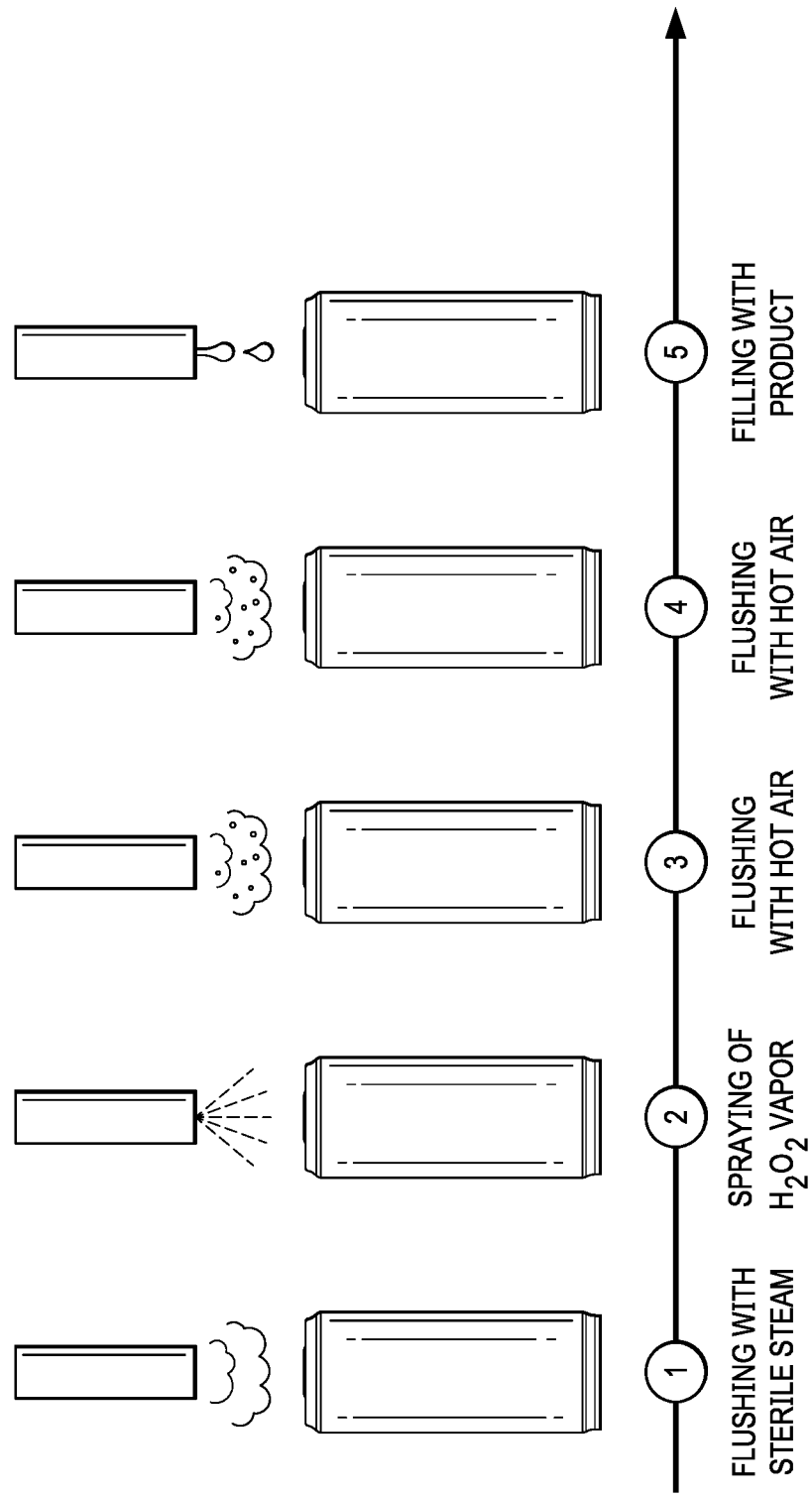
FIG. 3 illustrates spraying technology.

FIG. 3 illustrates spraying technology. In this approach, aluminum cans are sprayed with vaporized hydrogen peroxide. The temperature of the vapor is about 150° C. to about 200° C. to compensate for the short contact time compared to the immersion bath. In some cases, the spraying of the hydrogen peroxide can be done at room temperature or under 150° C. Remaining disinfectant can be removed by spraying the cans with hot steam. The packaging unit is then filled and the unit is sealed. Available machines slightly vary in how to heat and dose the hydrogen peroxide. Machines can sterilize about 10,000 to about 24,000 aluminum cans per hour with an average consumption of $H_2O_2$ 35% of about 0.2 ml per can. Some systems for sterilizing aluminum cans use a spraying step that includes dosing peracetic acid into a stream of hot steam. Consumption in this approach is about 0.3 ml peracetic acid 5% per unit. Some liquid sterilization mediums include ozonated water.

The dry disinfection approach is a further developed spraying technology that can be applied to aluminum cans. Hydrogen peroxide is sprayed into a can under conditions that reduce the likelihood that condensation occurs at the inner walls of the packaging unit. Without condensation, removal of remaining disinfectant is much easier. Capacity goes up to 50,000 units per hour consuming about 0.6 ml $H_2O_2$ 35% per unit.

Rinser cold disinfection relies on aluminum can packaging machines that include a rinser instead of a dry disinfection module. This technology rinses the can (upside down) with an aqueous disinfectant solution, typically based on peracetic acid as the active chemical. A second washing step with clear water follows to remove remaining disinfectant. The rinser approach does not need high temperatures and is also known as cold aseptic. Average consumption of peracetic acid is about 0.2 ml to 0.5 ml per unit.

Peracetic acid belongs to the group of oxidative disinfectants acting on microbes by oxidizing their proteins and cells. Typical commercially available products have a peracetic acid content of 5% and 15% but several other grades and concentrations are also available. OXTERILR is a 35% aqueous solution of highly purified high quality hydrogen peroxide based on a non-stannate containing stabilizer system that forms little to no residue on the packaging machines. OXTERILR 350 BATH and OXTERILR 350 SPRAY are tailor made for the individual immersion bath or spray process with regards to product stability, residues and packaging line effectiveness.

Figure 4:
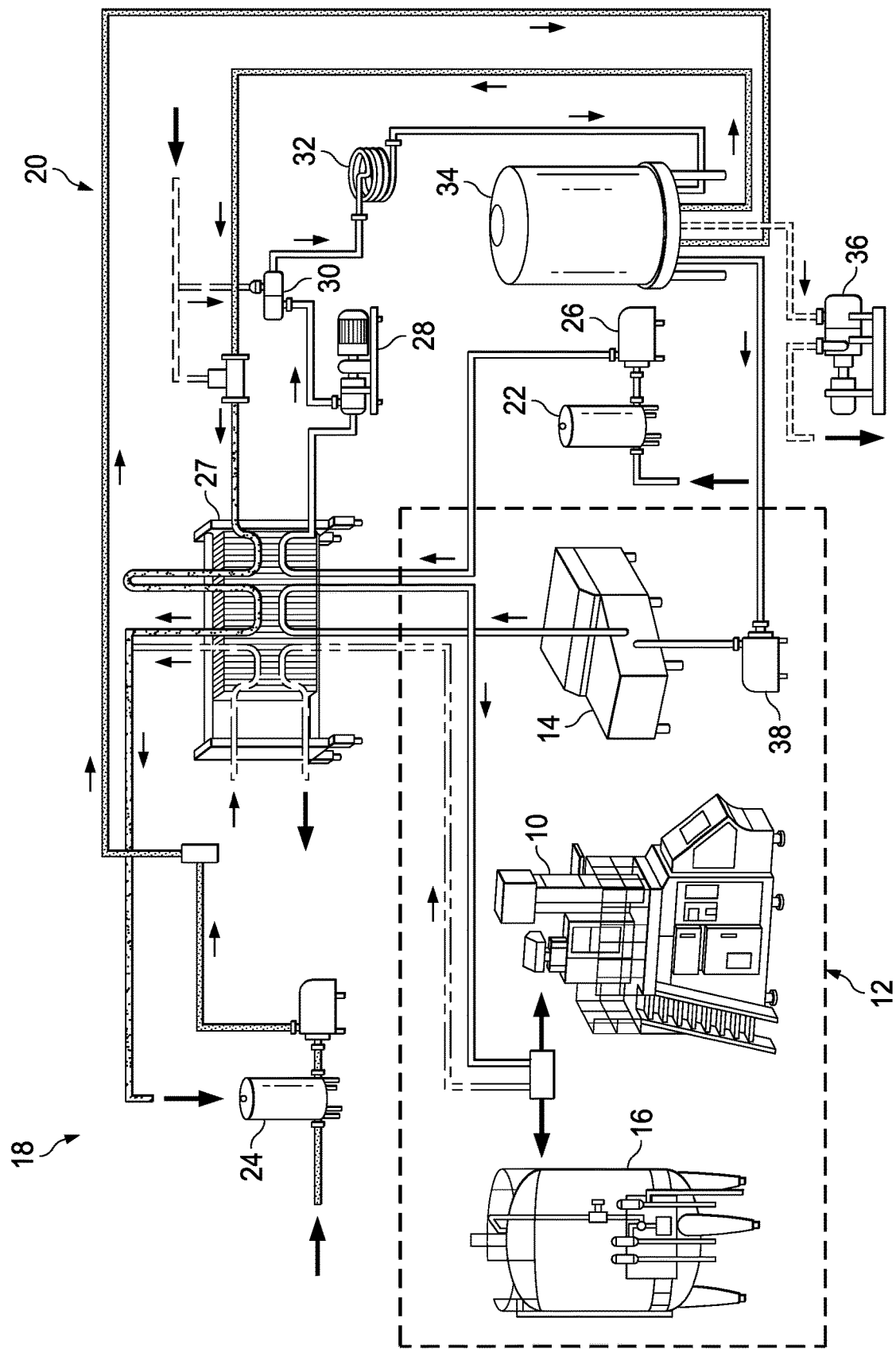
FIG. 4 illustrates Ultra High Temp (UHT) pasteurization of dairy and inline aseptic filling of aluminum cans.

FIG. 4 illustrates ultra-high temperature (UHT) pasteurization of dairy and inline aseptic filling of aluminum cans by a filling sub-unit 10. UHT processing (also known as ultra-heat treatment or ultra-pasteurization) is a food processing technology that sterilizes liquid food (e.g., milk) by heating it above 135° C. (275° F.), the temperature required to kill spores in milk, for 2 to 5 seconds. UHT is most commonly used in milk and dairy production, but is also used for fruit juices, cream, soymilk, yogurt, wine, soups, honey, and stews. The heat used during the UHT process can cause Maillard browning and change the taste and smell of dairy products. An alternative process is (high temperature/short time (HTST) pasteurization, in which the milk is heated to 72° C. (162° F.) for at least 15 seconds.

UHT milk packaged in a sterile container, if not opened, has a typical unrefrigerated shelf life of six to twelve months. In contrast, HTST pasteurized milk has a shelf life of about two weeks from processing, or about one week from being put on sale.

The filling sub-unit 10 is part of a larger aseptic unit 12. The aseptic unit 12 includes the filling sub-unit 10, a homogenizer sub-unit 14, and an aseptic tank 16. The aseptic unit 12 is part of a larger UHT system 18. The system 18 includes a fluid circuit 20 fluidly connected to the aseptic unit 12 to provide the aseptic unit 12 with sterilized fluid product (e.g., milk or a milk based product). The fluid circuit 20 has a balance fluid product tank (balance milk tank) 22, a balance water tank 24, a feed pump 26, a plate heat exchanger 27, a positive pump 28, a steam head injection 30, a holding tube 32, an expansion chamber 34, a vacuum pump 36, a centrifugal pump 38, and fluid lines connecting each components of the UHT system 18. The fluid lines can flow milk, steam, cooling water, hot water, and condensate.

The feed pump 26 conveys fluid product from the balance milk tank 22 to the heat plate exchanger 27. The positive pump 28 conveys the fluid product from the heat plate exchanger 27 to the expansion chamber 34. The steam head injector 30 and the holding tube 32 are arranged on the fluid line between the positive pump 28 and the expansion chamber 34. The steam head injector 30 injects a high temperature steam into the fluid line containing the fluid product. The steam sterilizes and pasteurizes the fluid product. The expansion chamber 34 is fluidly connected to the aseptic unit 12 by a fluid line. The centrifugal pump 38 conveys sterilized fluid product from the expansion chamber to the homogenizer sub-unit 14 of the aseptic unit 12. The homogenizer sub-unit 14 breaks up fat globules into very small particles so that they don't recombine and separate into a discrete layer. The fluid products flows from the homogenizer sub-unit 14 to the heat exchange plate 27 and onto the aseptic tank 16 or the aseptic filling sub-unit 10. The fluid product in the aseptic tank 16 can flow from the aseptic tank 16 to the filling sub-unit 10. The filling sub-unit 10 has an aseptic chamber in which a body of a pod or can is filled with sterilized fluid product. In some systems, the filling sub-unit is arranged in an aseptic chamber of the aseptic unit.

Figure 5:
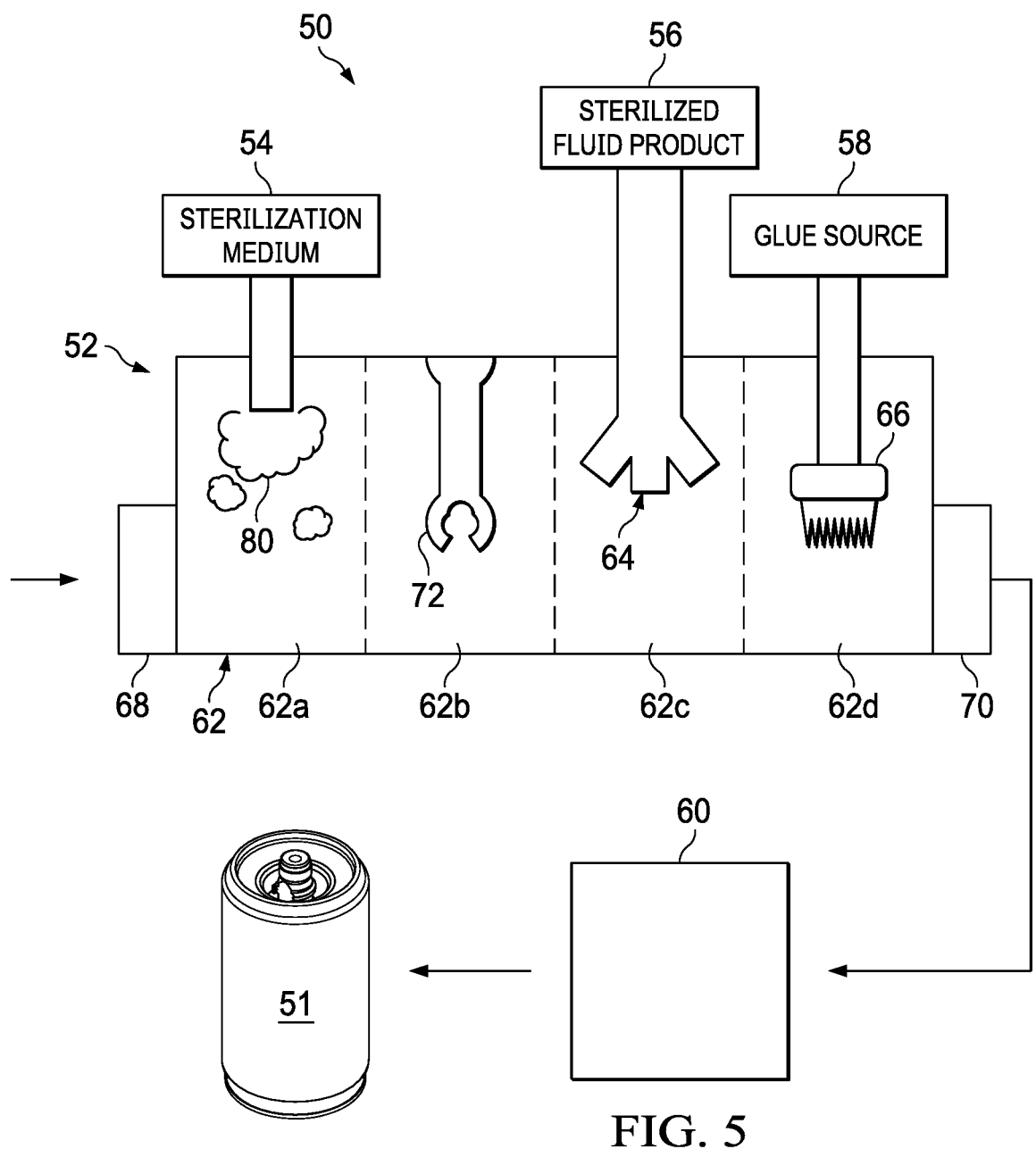
FIG. 5 illustrates a view of a processing system having an aseptic unit.

FIG. 5 illustrates a processing system 50 having an aseptic unit 52. The processing system 50 is configured to sterilize, assemble, fill, seal, and seam a pod 51 or can. The processing system 50 includes the aseptic unit 52, a sterilization medium source 54, a sterilized fluid product source 56, an adhesive source 58, and a roll seamer 60. The aseptic unit 52 defines an aseptic chamber 62. The aseptic chamber 62 is divided into sections. The aseptic chamber includes a sterilization section 62a, an assembly section 62b, a filling section 62c, and a sealing section 62d. The sterilization medium source 54 is fluidly connected to the sterilization section 62a of the aseptic chamber 62. The sterilized fluid product source 56 is fluidly connected to the filling section 62c of the aseptic chamber 62 by a dispensing head 64. The adhesive source 58 is fluidly connected to the sealing section 62d of the aseptic chamber 62 by an applicator 64. The applicator 66 can be a brush, a syringe, a tubing, a pipette, a swab, or funnel. The applicator 66 is configured to apply an adhesive layer to a base of the pod and/or a rim of the body of the pod. The base has a thickness of about 0.008 inches. The base and body are then pressed together in the sealing section 62d to form a hermetic seal. An intake chamber 68 and an export chamber 70 are mounted on the aseptic chamber 62. The intake chamber 68 is arranged adjacent to the sterilization section 62a and the export chamber 70 is arranged adjacent to the adhesive section 62d. The assembly section 62b houses at least one robotic arm operable to assembly the pod 51.

In use, components of the pod enter the intake chamber 68. The components are transported to the sterilization section 62a of the aseptic chamber 62 and are sterilized by a vapor 80 from the sterilization medium source 54. In some systems, the components are sterilized as they enter the aseptic chamber 62 (e.g., by being sprayed with a sterilization medium as the components enter the chamber through a pass-through).

The sterilized components are transported to the assembly section 62b of the aseptic chamber 62. The robotic arm 72 assembles the pod body with a mixing paddle and an attachment (e.g., a nut). A base of the pod 51 is not attached to the pod body at this stage. The base and assembled pod body and mixing paddle are moved into the filling section 62c. The dispensing head 64 fills the pod body with sterilized fluid product, for example the fluid product produced by the UHT system 18 (FIG. 4). The filled body and base are moved into the sealing section 62d of the aseptic chamber 62. The applicator 66 applies a layer of adhesive to the base of the pod and places the base on the open end of the body of the pod to cover the open end of the body. The adhesive layer forms a hermetic seal between the base and the body of the pod. The pod exits the aseptic unit 52 by the export chamber 70. The hermetic seal is maintained both in the aseptic chamber 62 and outside the aseptic chamber 62. A roll seamer mechanically couples the base to the body of the pod. By separating the initial sealing and the roll seaming, this approach allows the roll seamer and associated hardware to be located outside the aseptic chamber.

In some units, the fill station includes a dispenser that inserts (e.g., injects) a liquefied gas into the filled pod body, immediately prior to sealing the pod. The dispenser is configured to supply an amount of the liquefied gas (e.g., nitrogen or carbon dioxide) to increase the pressure in the sealed pod 51 to a predetermined internal pressure as the liquefied gas evaporates.

In some cases the sterilization medium source, the sterilized fluid product source, and the adhesive source are arranged in the aseptic chamber. In some cases, the roll seamer, or a portion thereof, is arranged in the aseptic chamber. In some cases the adhesive source imports bases and applies a layer of adhesive to the base, prior to inserting the base into the sealing section of the aseptic chamber or into the sterilization section of the aseptic chamber.

The filling unit includes a chamber for aseptically filling and sealing pods. Some filling units have multiple connected chambers under aseptic conditions. In these filling units, the aseptic chambers are separated from each other so that they do not share an airflow. For example, the chambers can be connected by pass-through (i.e., an opening which allows material to be transferred through walls under conditions which limit, for example, air flow through the opening).

The aseptic chamber is separated into stations for different processing steps. For example, the chamber may have an assembly station, a sterilization station, a filling station, a dosing station, a sealing station, and/or a roll seaming station. Some filling units have multiple stations designated to a processing step, for example, two, three, four, or five sterilization stations. Each station can include machinery or robots capable of performing each processing step. For example, the gluing station can include a robot capable of applying fast curing epoxy to the pod and the roll seaming station can include an aseptic-compatible roll seaming machine. The assembly station can include a sterile robotic system for inserting the mixing paddle into the body of the pod (can). Each station can include transport systems to move the components of the pod (e.g., continuously or in batches). The transport systems can include conveyors or grips for transporting the pod or pod components (e.g., the body of the pod, the mixing paddle, O-rings, attachments, etc.) within the aseptic chamber or between aseptic chambers.

Some filling units have secondary chambers where individual parts are sterilized before being transferred to a primary chamber where filling, assembly, and sealing occur. This configuration allows different types of sterilizing media used for different parts with the sterilizing mediums or approach best suited to the individual components being sterilized.

Figure 6:
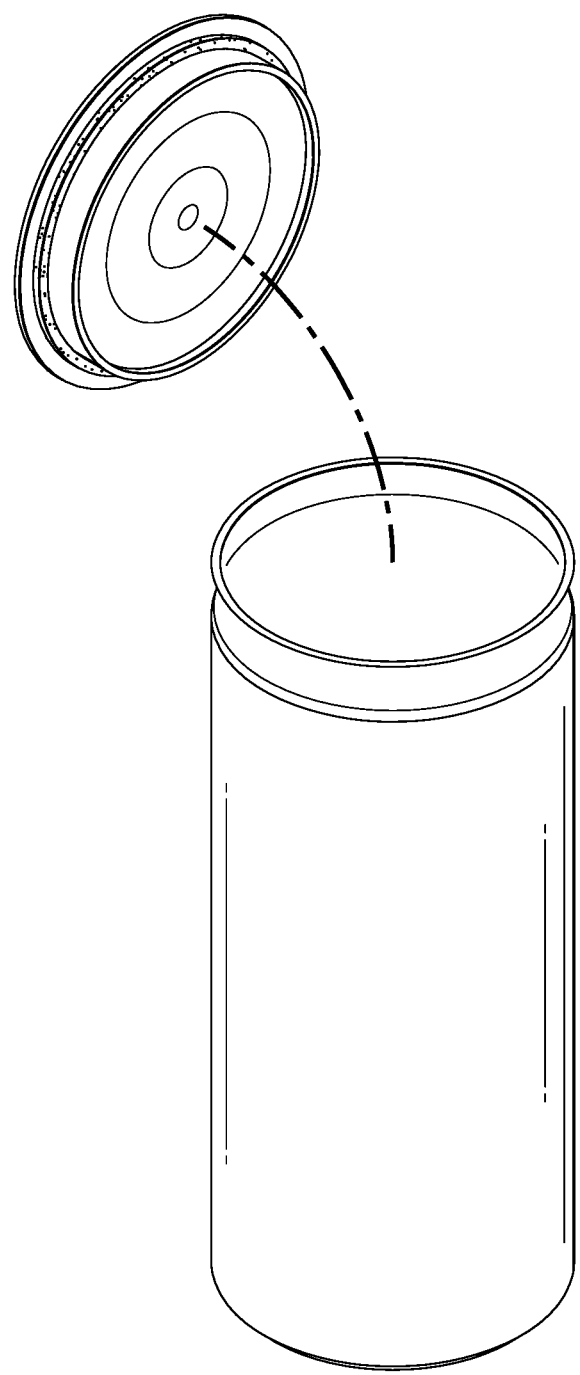
FIG. 6 illustrates sealing of the cans by gluing bases to bodies of cans to create a hermetic seal after sterilized cans have been filled in the aseptic chamber.

FIG. 6 illustrates sealing of the cans by gluing bases to cans to create a hermetic seal after sterilized cans have been filled in the aseptic chamber. Once the cans are sterilized and filled, the bases can have FDA approved adhesive glue or epoxy applied to their rims as shown in FIG. 6. Some systems apply the glue to the rim of the can, the rim of the base, or both the rims of the cans and the bases. When the bases are sandwiched together with the flange of the open end of the body of the can, the glue or epoxy can create a hermetic seal. Once the base and can are adhesively shut and a hermetic seal is formed, a transport system moves the cans out of the sterile chamber and a can seamer is used to roll the seam closed to achieve a more lasting bond. Some bases are sealed using induction or conduction in the aseptic chamber. Some systems have seam rollers arranged in the aseptic chamber.

Figure 7:
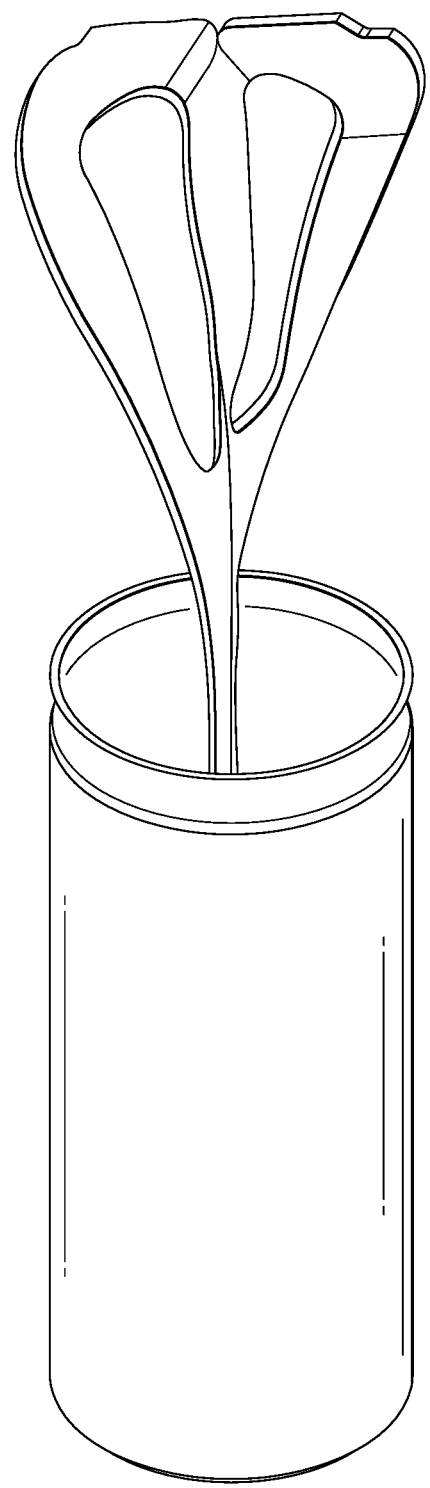
FIG. 7 illustrates insertion of a mixing paddle into a can.

FIG. 7 illustrates insertion of a mixing paddle into a can. When the cans include mixing paddles or other internal components, the mixing paddles or other internal components must also be sterilized. The mixing paddles or other internal components can be inserted into cans before the cans are sterilized. In some systems, the mixing paddles or other internal components can be inserted into the cans after sterilization. The sterilization process then sterilizes both the cans and their internal components. For example, mixing paddles can be inserted into the aluminum cans before the cans and mixing paddles are sterilized with hydrogen peroxide before the cans are filled and sealed. In some pods, the bases and mixing paddles are sterilized separately prior to assembly.

Figure 8:
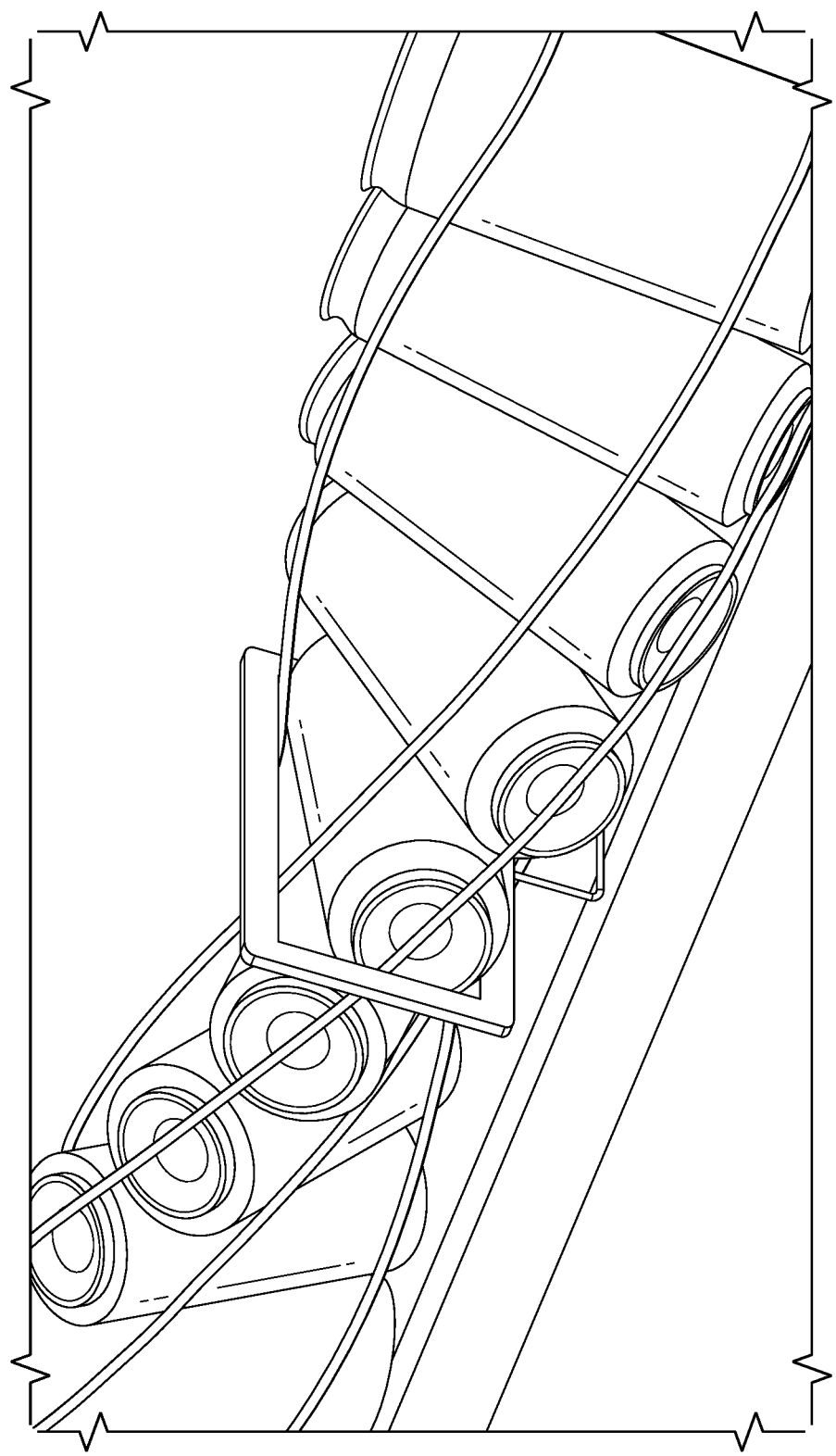
FIG. 8 illustrates a conveyor system that can be used to move cans, for example, into and out of the sterile chamber.

FIG. 8 illustrates a conveyor system (assembly) that can be used to move cans, for example, into and out of the sterile chamber. Some conveyor systems can also be used to convey cans between connected aseptic chamber or between stations within a single aseptic chamber. Other transport systems include, for example, rotary mounts with grips to hold cans.

Figure 9:
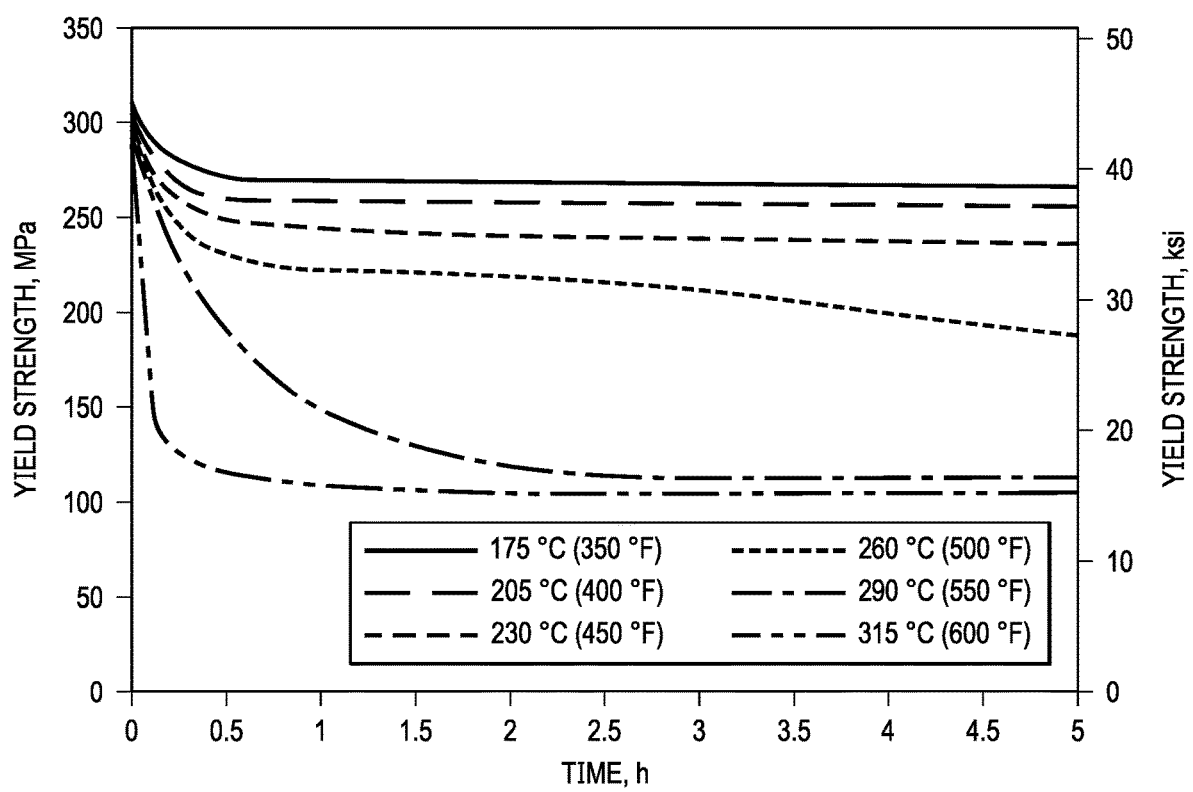
FIG. 9 is a chart illustrating the effects of temperatures on the yield strength of aluminum.

FIG. 9 is a chart illustrating the effects of temperatures on the yield strength of aluminum.

FIGS. 10A-18B illustrate an exemplary process for manufacturing and aseptically filling pods (e.g., aluminum cans) with ingredients for forming cooled food or drinks (e.g., ice cream). In this process, a spout is over-molded on the body of a can. A plug is then placed to close the spout. A mixing paddle is placed inside the can through an open end of a body of the can. A base is attached to the body of the can to close the open end of the body. The can is then aseptically filled.

Figure 10A:
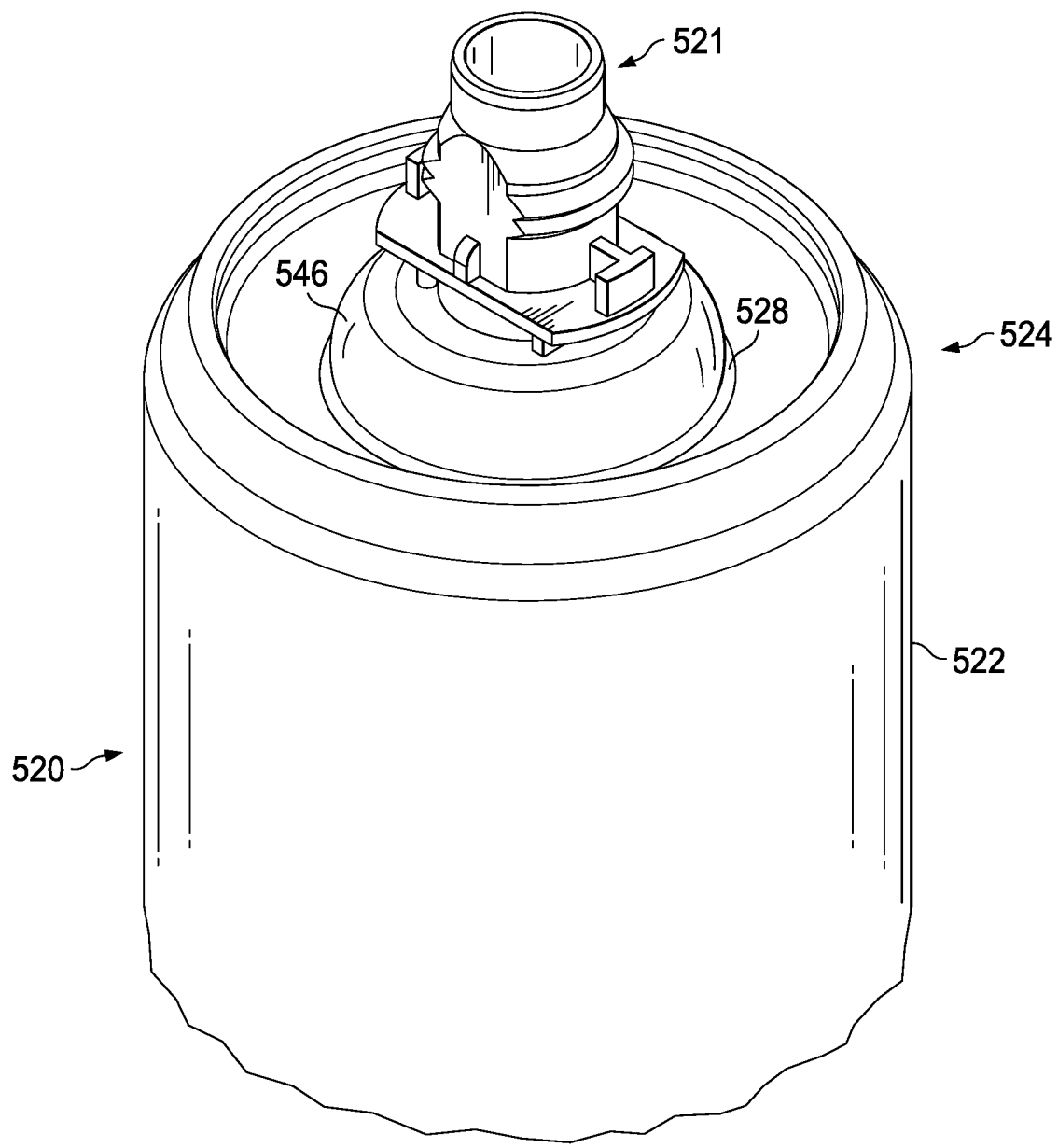
FIGS. 10A and 10B are, respectively, a perspective view and a cross-sectional side view of a body of the pod with a spout.
Figure 10B:
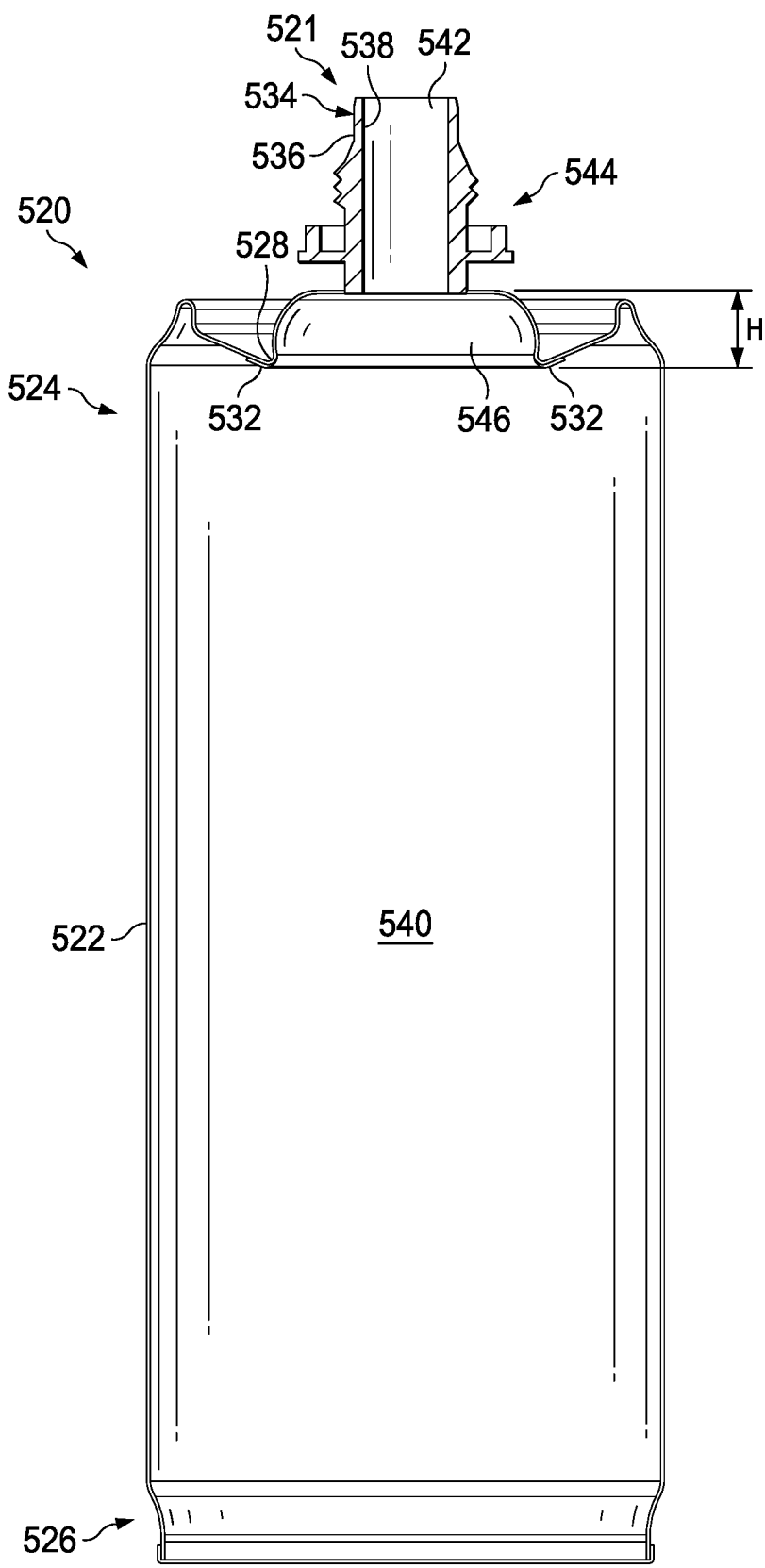

FIGS. 10A and 10B are, respectively, a perspective view and a cross-sectional side view of a pod (can 520) with a spout 521. The can 520 includes a body 522 having a domed end 524 and an open end 526. The domed end 524 defines a central aperture 528 that extends through the domed end 524. A spout 521 is attached to or is integral with the body 522 at the central aperture 528 defined by the domed end 524. In the can 520 the spout 521 is over-molded onto the body 522 at the aperture 528. In some pods, the spout is welded, adhered, or mechanically fastened to the body. An edge of the domed end 524 defines a plane. The spout 521 extends past the plane. Some sprouts terminate below the plane.

The spout 521 includes an annular flexible portion 546, a flange 532 extending radially outward from the flexible portion 546, and a hollow cylinder 534 extending away from the flexible portion 546 on the side opposite the flange 532. The spout 521 is over-molded to the body 522 of the can 520 with the flange 532 attached to an inner surface of the domed end 524 with the flexible portion 546 and the cylinder 534 extending outside the can 520. The spout 521 defines a channel 542 that fluidly connects an interior 540 of the can 520 to the environment. An engagement surface 544 extends radially outward from the cylinder 534.

The flexible portion 546 of the spout 521 has a height H and connects the flange 532 to the cylinder 534. The flexible portion 546 decreases in width from the flange 533 to the wall 534. The flexible portion 546 has two positions, an extended position as shown in FIGS. 10A and 10B and a retracted position. In this extended position, the flexible portion 546 is outside the body 522 of the can 520. In the retracted position, the flexible portion 546 extends inside the interior 540 of the body 522 of the can 520. The retracted position is described in detail with reference to FIGS. 17A and 17B. A plug is then placed on the spout 521.

Figure 11A:
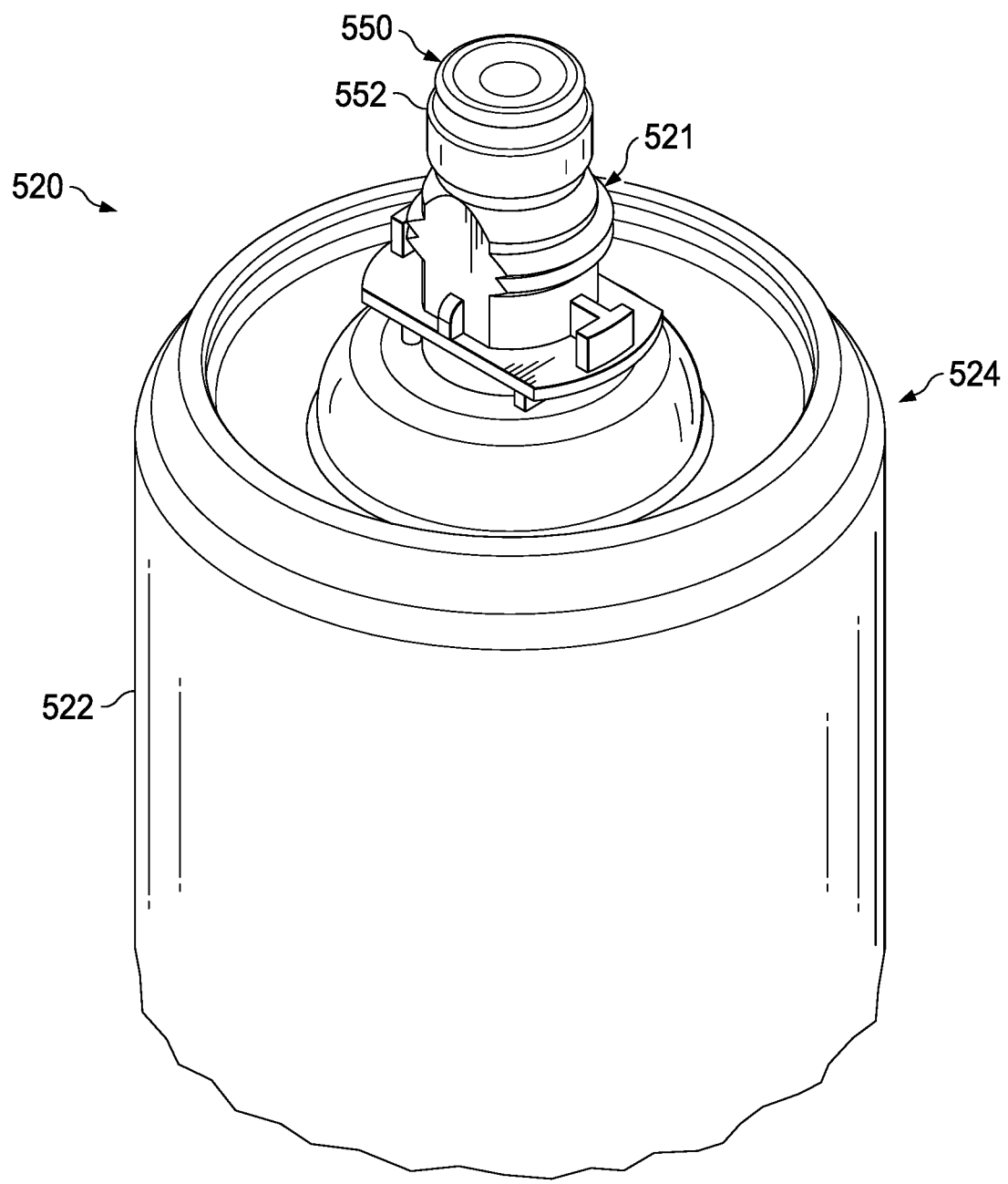
FIGS. 11A and 11B are, respectively, a perspective view and a cross-sectional side view of the spout and a plug arranged on the spout.
Figure 11B:
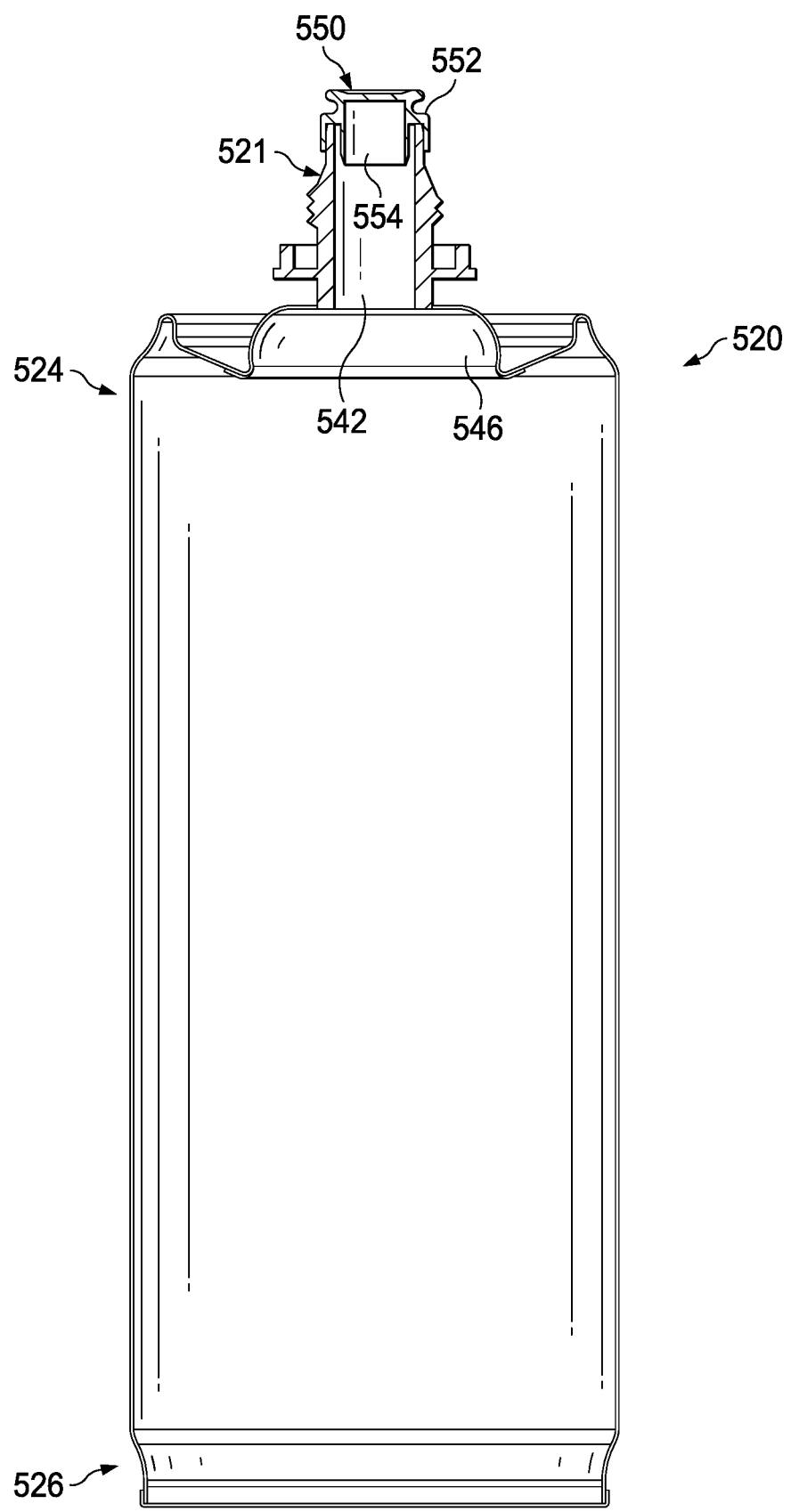
Figure 12:
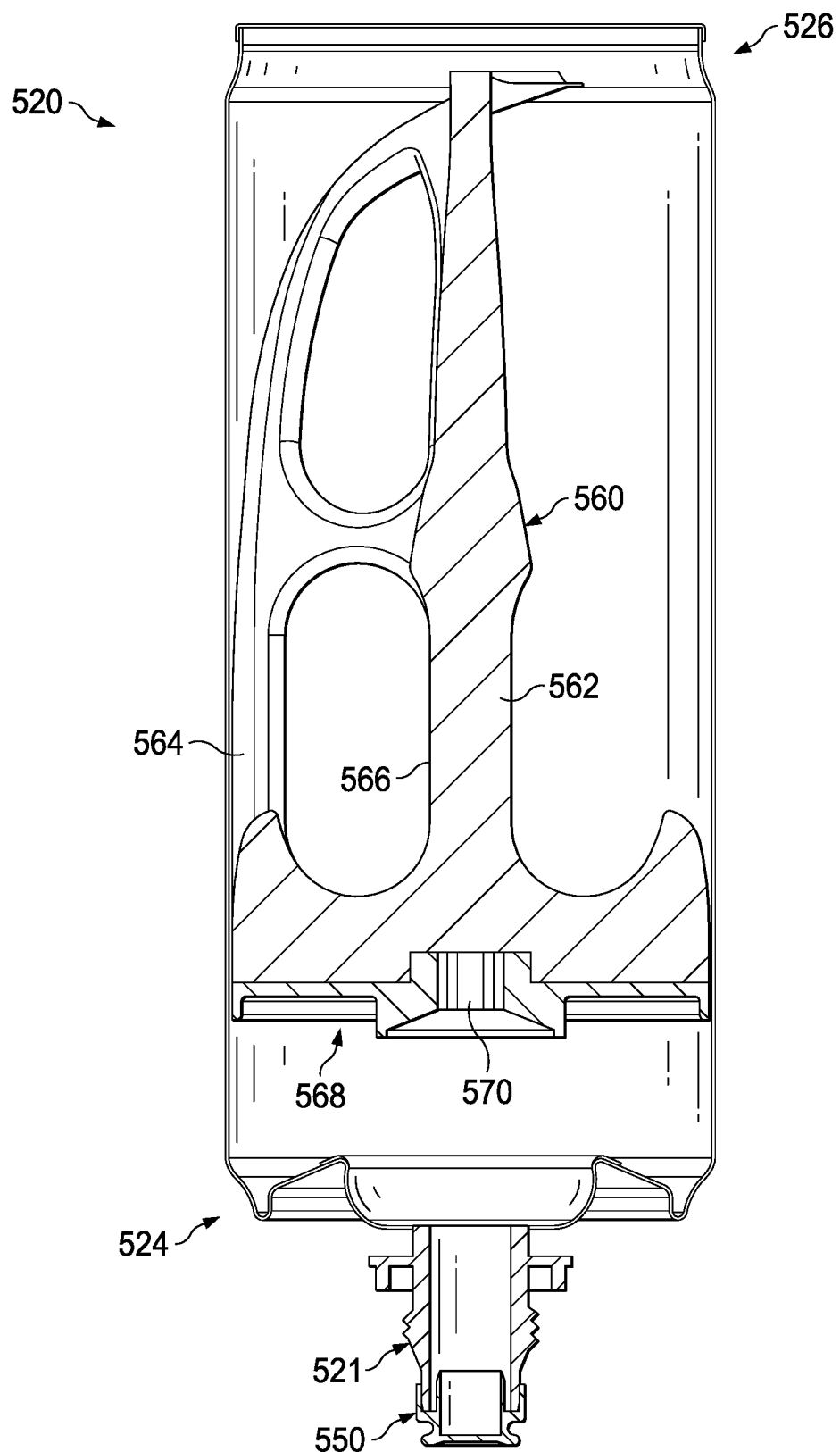
FIG. 12 is a cross-sectional side view of a paddle disposed in the body of the pod.

FIGS. 11A and 11B illustrate can 520 after a plug 550 has been placed on the spout 521 to close the channel 542. The plug 550 has a cover 552 and a projection 554 that extends from the cover 552. When engaged with the spout 521, the cover 552 extends around the exterior surface 536 and the projection 554 extends into the channel 542. The plug 550 is sized such that, when arranged in the channel 542, the projection 554 and spout 521 are fluidly sealed. In some plugs, the fluid seal is created by the contact between the cover and the spout. In some plugs, the fluid seal is created by the contact between the protrusion and the spout. Some plugs may be entirely or partially made of a soft plastic that holds the plug onto the spout by friction. Other plugs may engage with the spout using a tongue and groove connection or using a threaded connection. The can 520 is then inverted and a mixing paddle is placed inside the can 520 through the open end 526 of the body 522 of the can 520.

FIG. 11 is a cross-sectional side view of a mixing paddle 560 disposed in the interior 540 of the can 520. The paddle 560 includes central stem 562 and a helical blade 564 that extends from the central stem 562. The helical blade 564 defines openings 566 through which fluid flows. A connection end 568 of the paddle 560 includes a driveshaft connector. The driveshaft connector in can 520 is a recess 570 (female connector) that is shaped to receive a driveshaft of a machine. Some driveshaft connectors are protrusions (male connectors) that engage a recess of the driveshaft. The recess 570 is axially aligned with the channel 542 of the spout 521 and spaced apart from the spout 521 when the spout 521 is in the extended position. The connection end 568 is distanced from the open end 526 of the body 522 by about the height H of the flexible portion 546. After the paddle 560 is inserted, a base is attached to the body 522 of the can 520 to close the open end of the body 522.

Figure 13A:
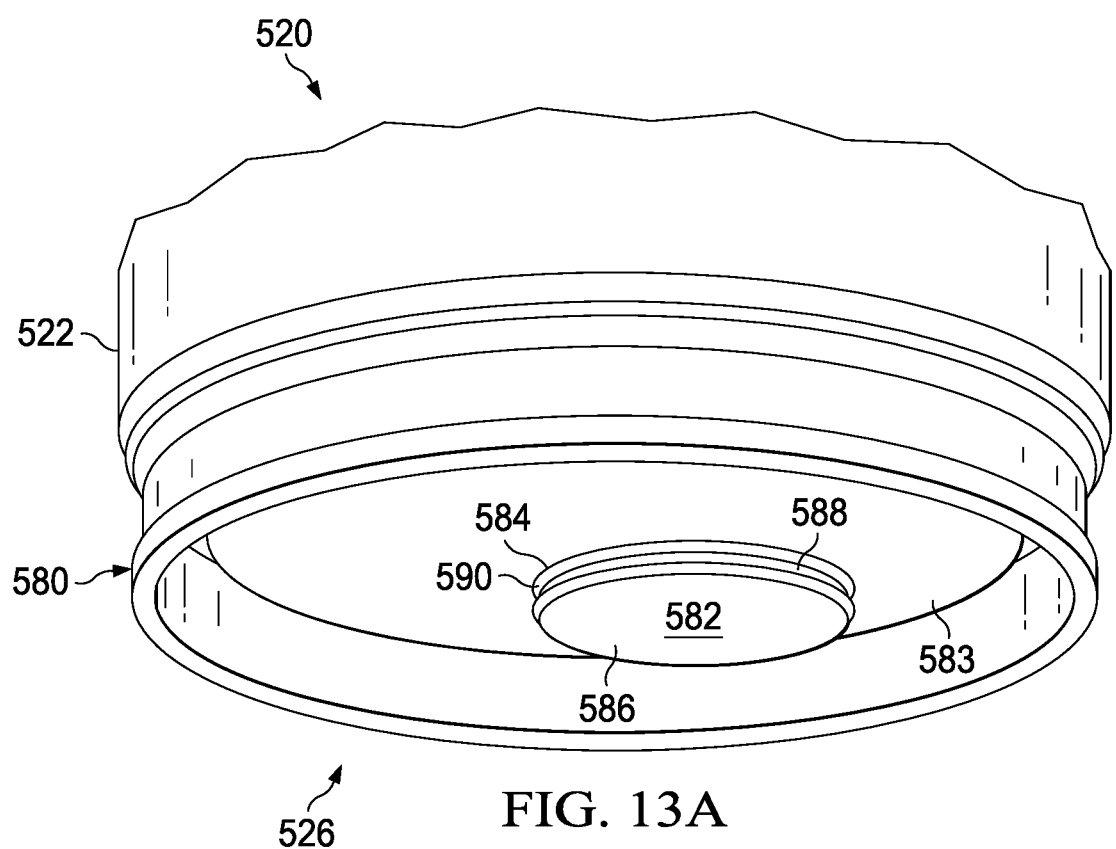
FIGS. 13A and 13B are views of a base of the pod seamed to a second end of the body.
Figure 13B:
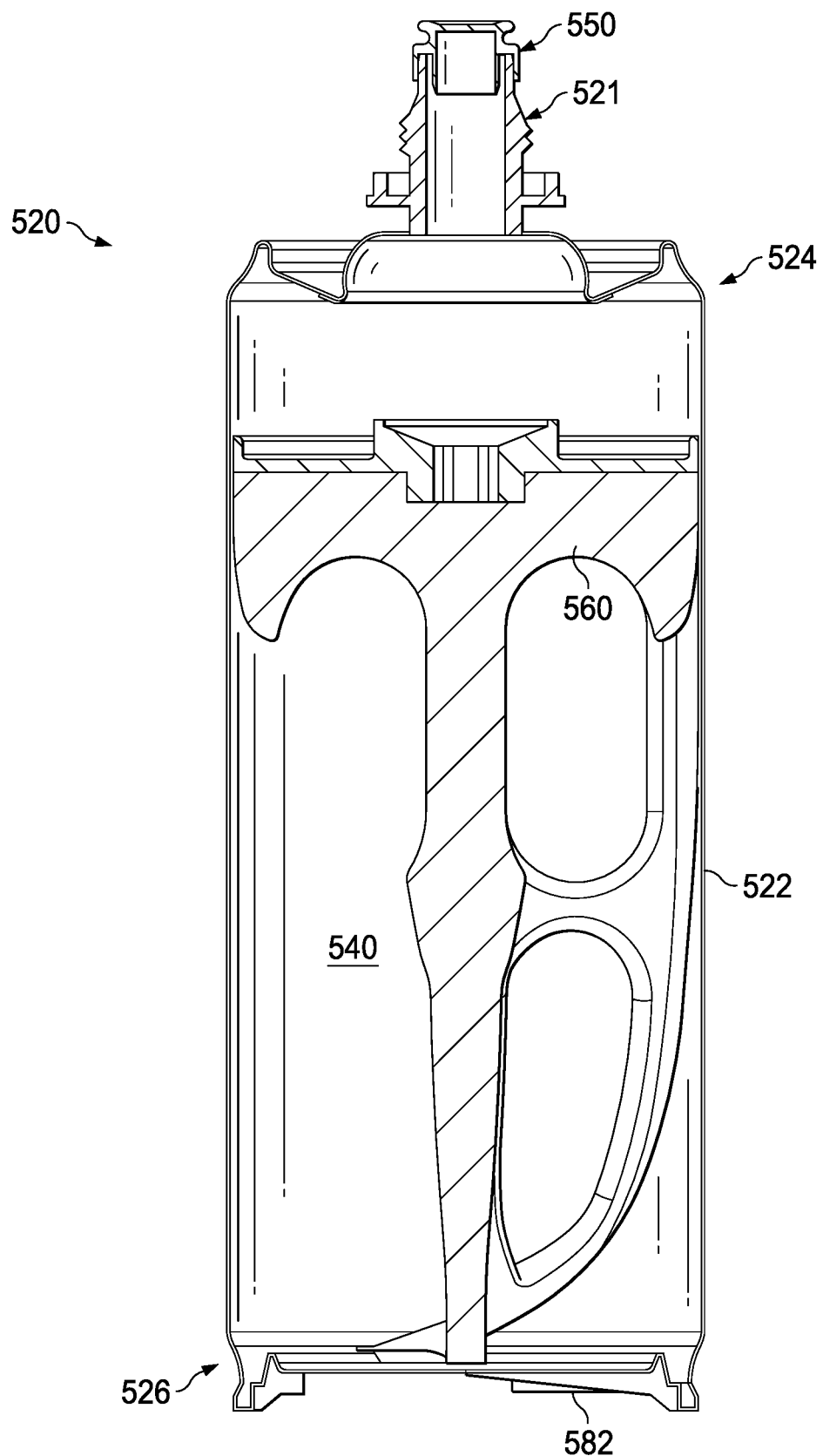

FIGS. 13A and 13B are views of a base 580 of the can 520 seamed to the open end 526 of the can 520. The base 580 covers the open end 526 of the body 522 of the can 520. The base 580 includes a protrusion 582 that extends outward relative to a primary surface 583 of the base 580. The protrusion 582 is attached to the primary surface 583 of the base 580, for example, by a weakened score line 584. The scoring can be a score into the base of the aluminum sheet or a score into the wall of the protrusion 582. For example, the material can be scored from an initial thickness of 0.008 inches to 0.010 inches to a postscoring thickness of 0.001 inches-0.008 inches. In an alternative embodiment, there is no post-stamping scoring but rather the walls are intentionally thinned for ease of rupture. In another version, there is not variable wall thickness but rather a machine dispenser is operated to cut the 0.008 inches to 0.010 inches wall thickness on the protrusion 582. With the scoring, the protrusion 582 can be lifted and sheared off the base 580 with 5-75 pounds of force (e.g., between 15-40 pounds of force).

The base 580 is manufactured separately from the body 522 of the can 520 and then attached (for example, by crimping or seaming) to the body 522 of the can 520 covering the open end 526 of the body 522. During manufacturing, seaming the base 580 to the body 522 maintains the position of the paddle 560 within the interior 540 of the can 520. The protrusion 582 of the base 580 can be formed, for example, by stamping, deep drawing, or heading a sheet of aluminum to form the base. After the base is attached, the can is sterilized and then aseptically filled.

Figure 14:
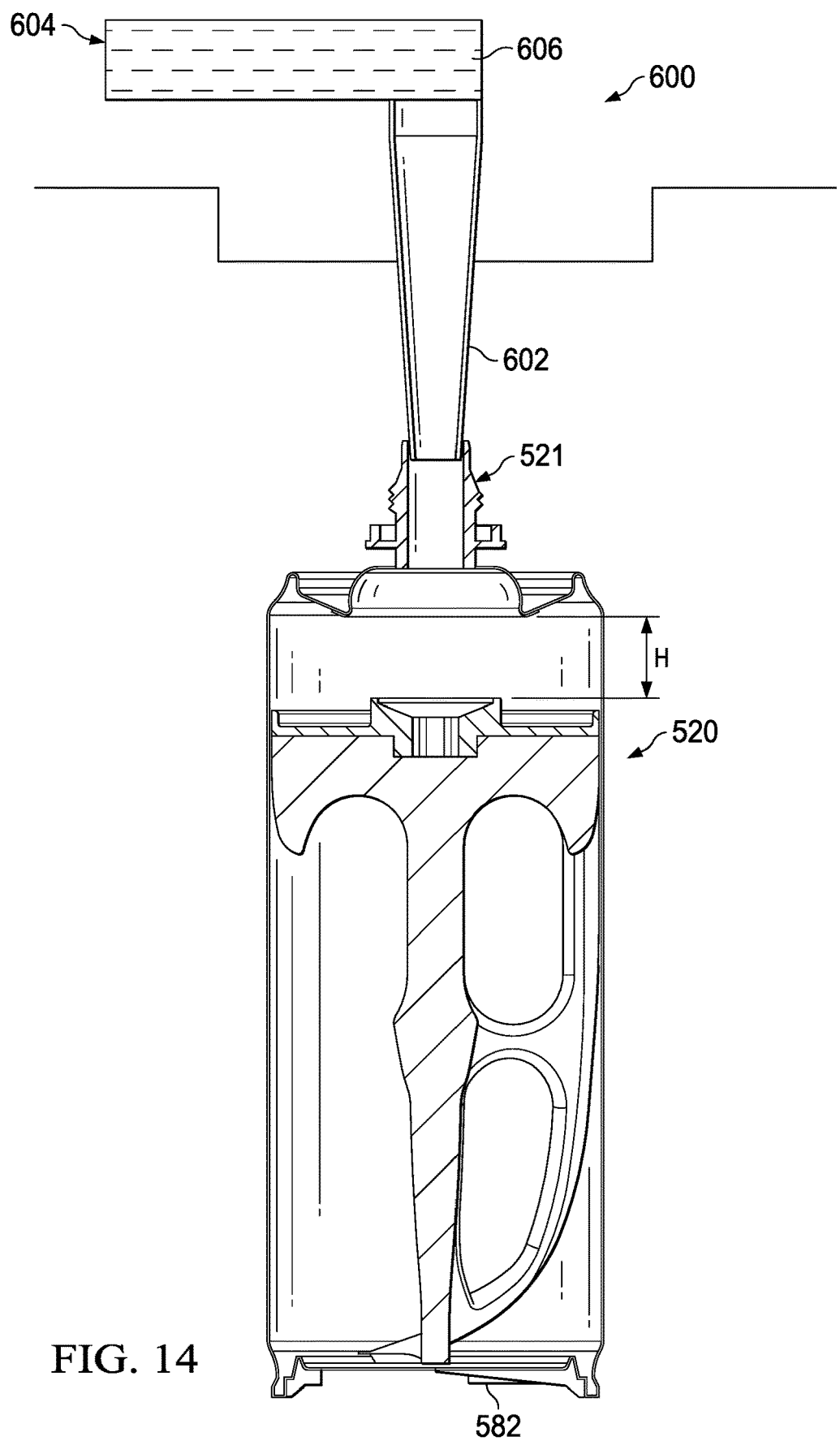
FIGS. 14 and 15 are cross-sectional side views of a dispensing system positioned to fill a pod with fluid for producing a frozen or chilled confection during manufacturing.
Figure 15:
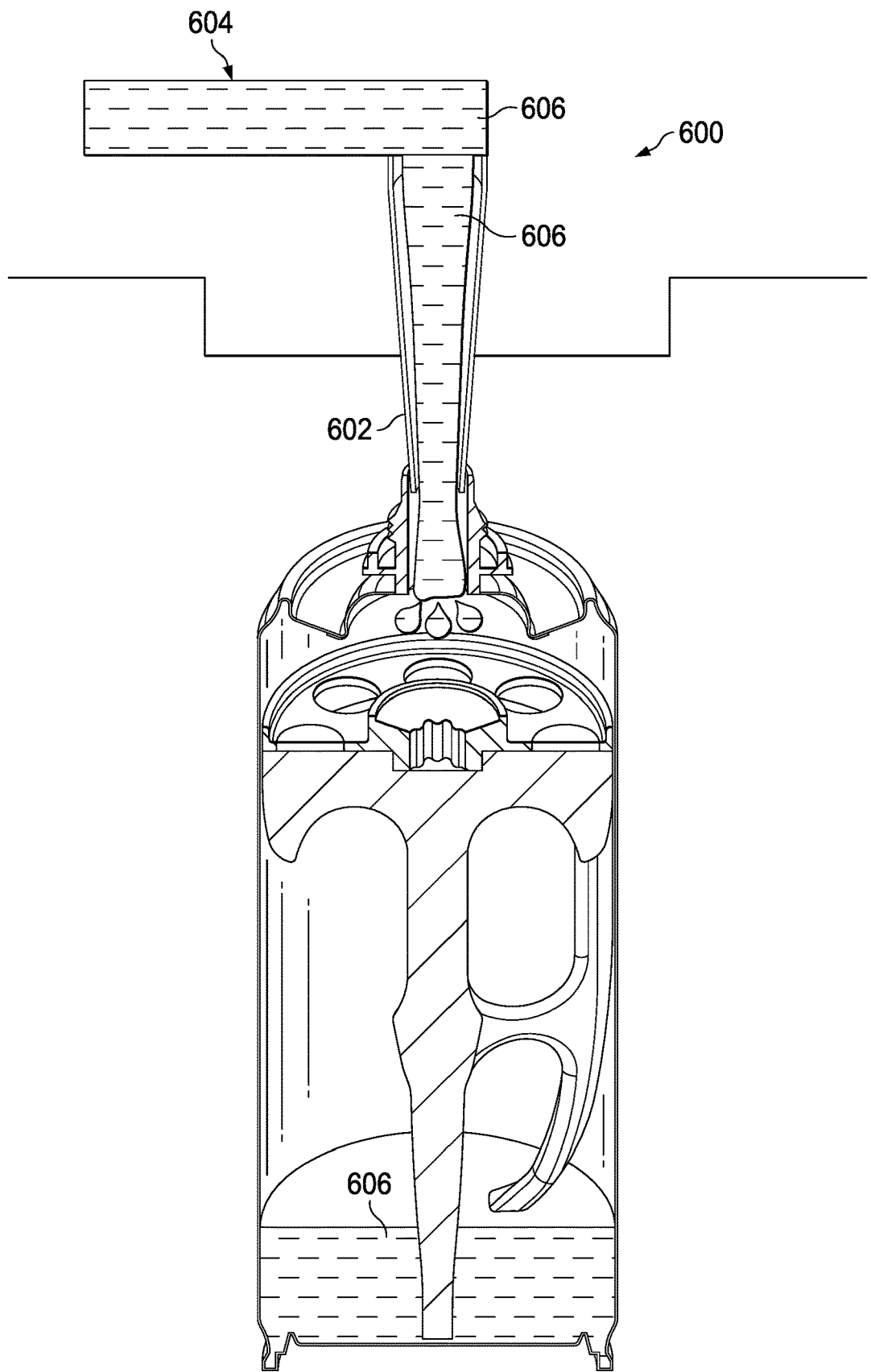

FIGS. 14 and 15 are cross-sectional side views of a dispensing system 600 positioned to fill a can 520 with sterilized or pasteurized fluid for producing a frozen or chilled confection. The dispending system includes a nozzle 602 that extends through the channel 542 when the plug 550 is removed and the channel 542 is aligned with the dispensing system 600. The dispensing system 600 includes a fluid source 604 that holds a large volume of fluid 606, for example, ice cream mix, beverage mix, or another food or beverage. The fluid source 604 is fluidly connected to the nozzle 602. Fluid 606 flows from the nozzle 602 to fill the can 520, as shown in FIG. 14. In some systems, the pod is filled with a solid or powder rather than a fluid.

Figure 16:
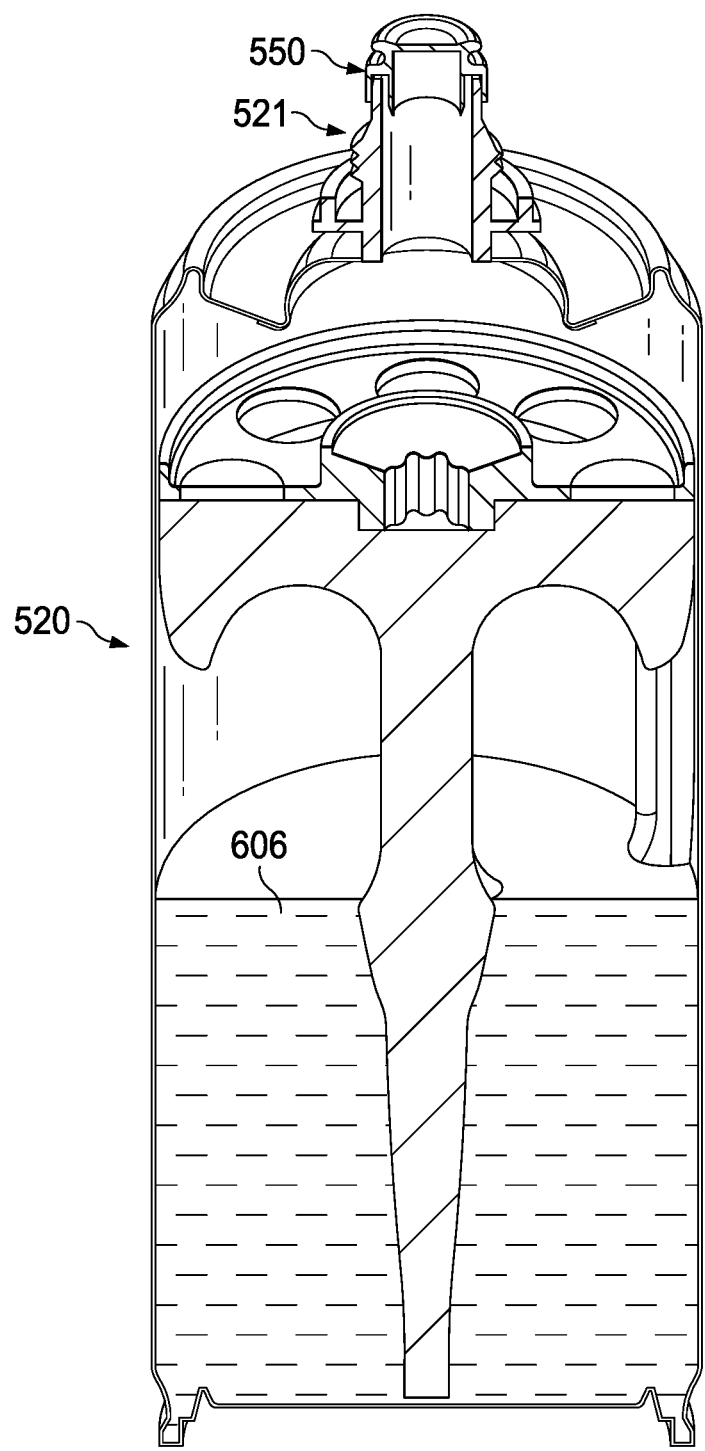
FIG. 16 is a cross-sectional side view of the filled pod with the plug engaged with the spout.

FIG. 16 is a cross-sectional side view of filled can 520 with the plug 550 engaged with the spout 521. The plug 550 forms a hermetic seal, preventing fluid from flowing in or out of the can 520. Some plugs are arranged as corks or stoppers within the channel of the spout. Some plugs include a threaded portion that couples the plug to the spout, described in detail with reference to FIG. 20.

Figure 17A:
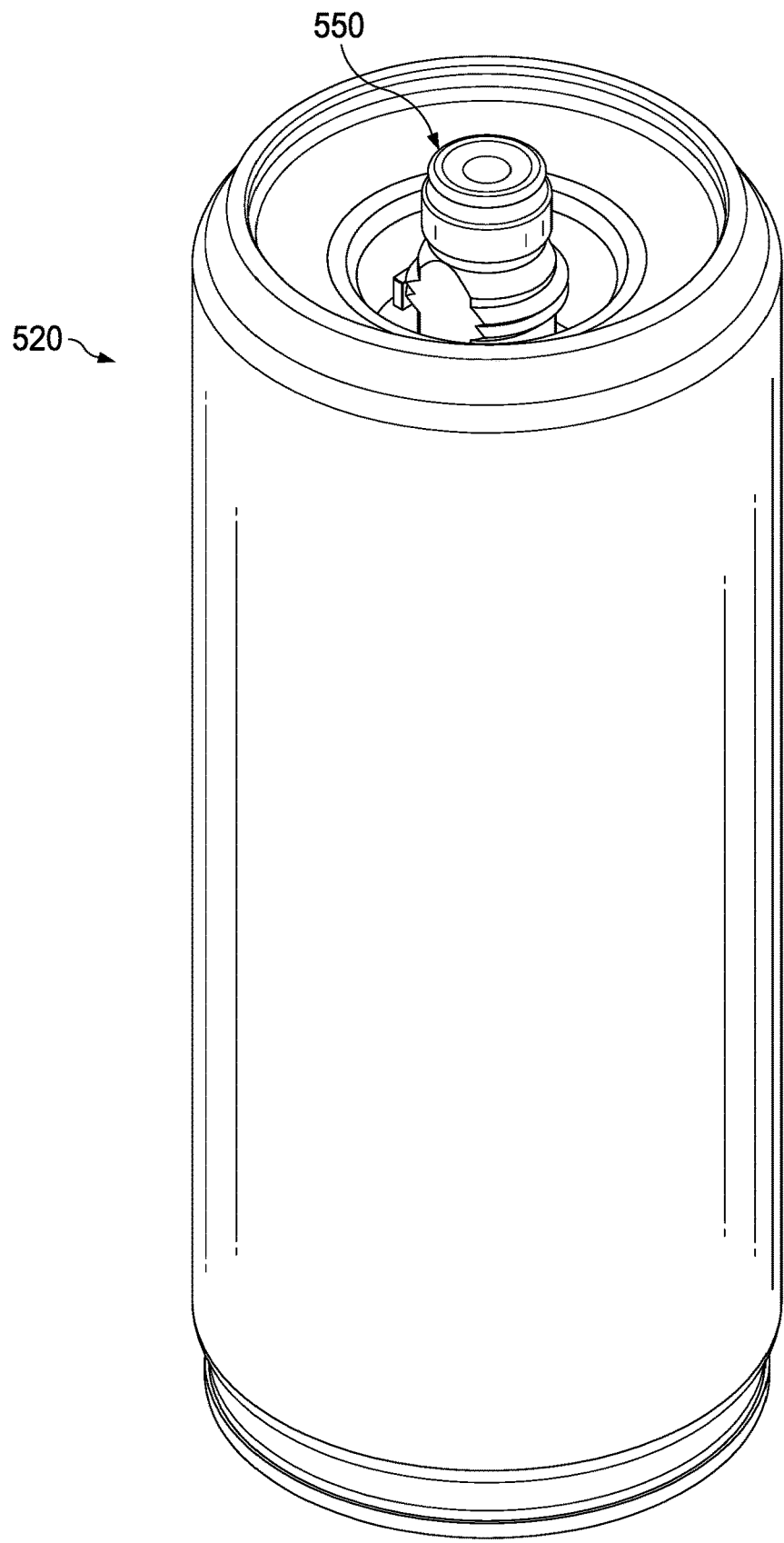
FIGS. 17A and 17B are, respectively, a perspective view and a cross-sectional side view the pod with the spout in the retracted position.
Figure 17B:
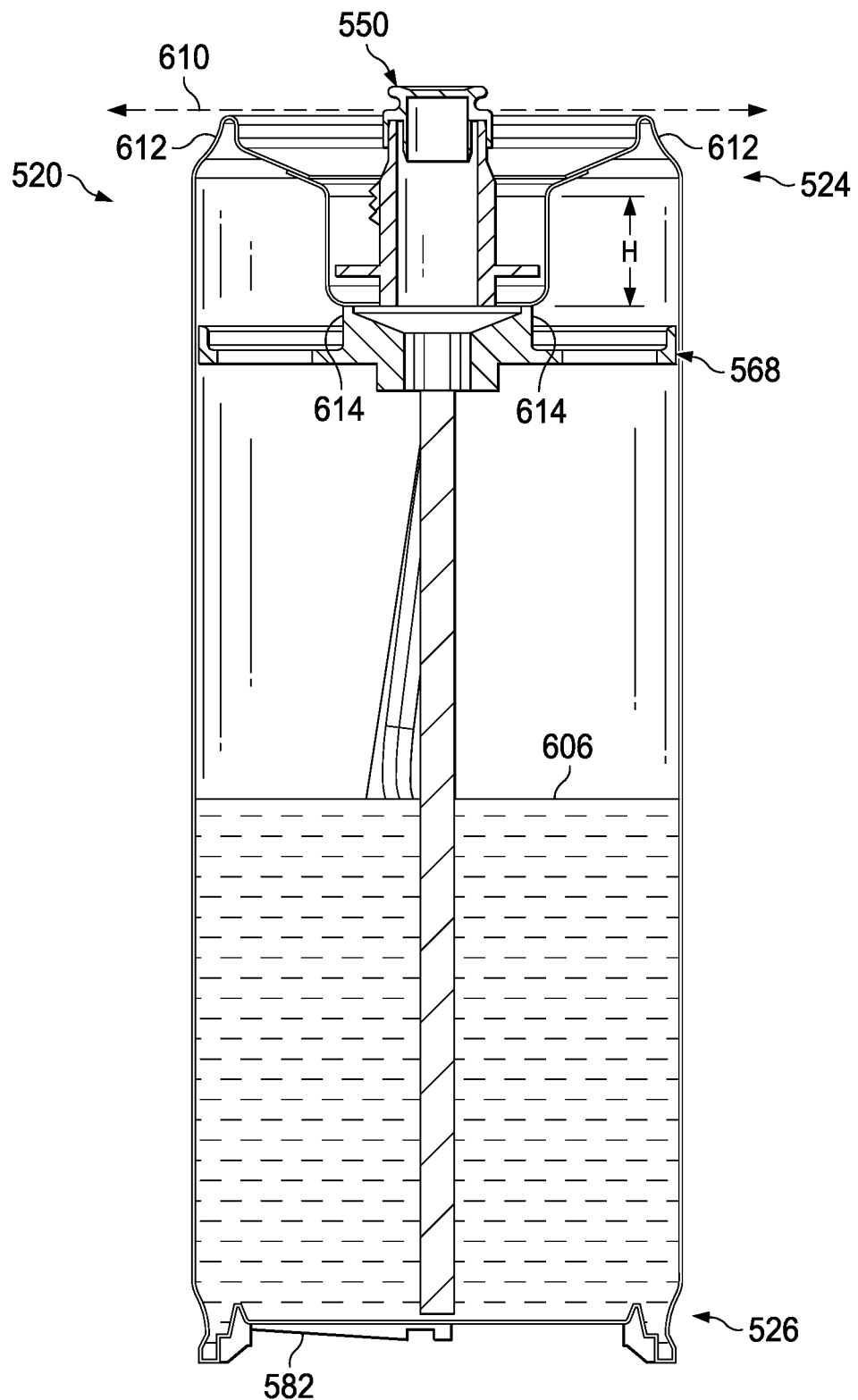

FIGS. 17A and 17B are a perspective view and a cross-sectional side view of the domed end 524 of the body 522 of the can 520 with the spout 521 in the retracted position. To move from the spout 521 from the extended position (e.g., as shown in FIGS. 10A and 10B) to the retracted position, an operator or machine presses the plug 550 or spout towards the open end 526 of the body 522. The flexible portion 546 inverts, flexing downwards, to move into the can 520. The cylinder 534, channel 542, and plug 550 are carried towards the open end 526 of the body 522 with the flexible portion 546. In this configuration, the plug 550 does not extend past a plane 610 defined by a rim 612 of the domed end 524 of the body 522. Some plugs extend past the plane defined by the rim. In some pods, the entire plug is arranged within the channel, and the walls of the spout do not extend past the plane defined by the rim. In some pods, the entire plug is arranged within the channel and the walls of the spout extend past the plane defined by the rim.

In the retracted position, the height H of the flexible portion extends in the opposite direction, into the interior of the can 520. As the connection end 568 of the paddle 560 is spaced H from the domed end 524 of the body 522, a station 614 of the flexible portion abuts the connection end 568 of the paddle 560. Some stations of the flexible portion lie adjacent to the connection end of the paddle, but do not directly abut the connection end of the paddle, when the spout is in the retraced position.

Figure 18A:
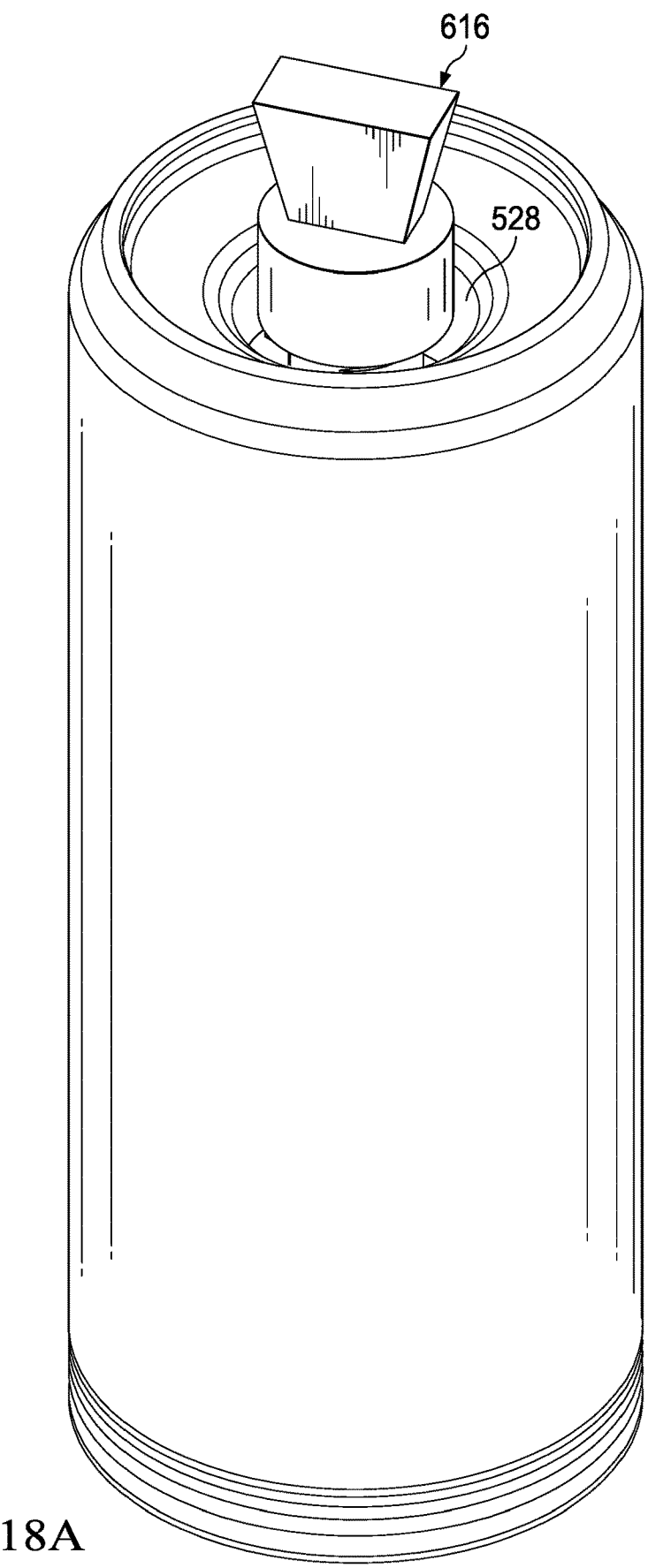
FIGS. 18A and 18B are, respectively, a perspective view and a cross-sectional side view of the pod with a cap engaged with the spout in the retracted position.
Figure 18B:
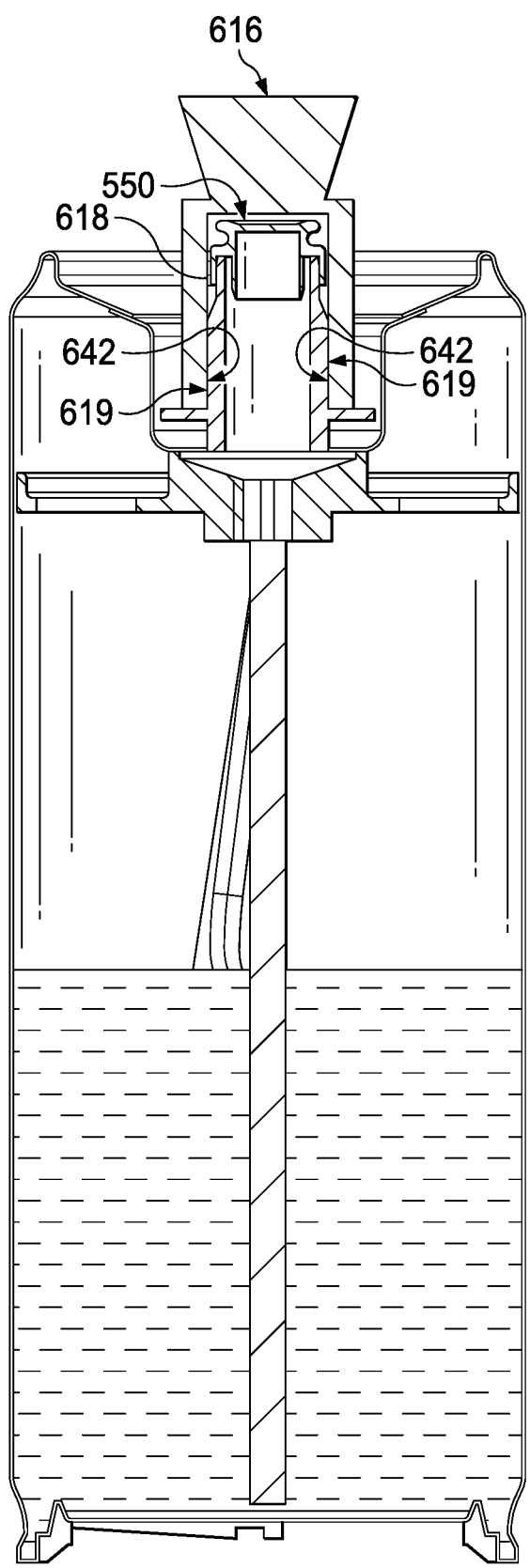

FIGS. 18A and 18B are a perspective view and a cross-sectional side view of the domed end 524 of the body 522 of the can 520 with a cap 616 engaged with the spout 521 in the retracted position. The cap 616 is a wingnut cap. Some systems use other caps (e.g., threaded caps, snap fit caps, or peel-off caps).

The cap 616 is arranged over the plug 550. The cap 616 includes a first interior attachment area 618 and a second interior attachment area 619. The first interior attachment area 618 engages the plug 550 such that the plug 550 is axially and rotationally constrained to the cap 616. The second interior attachment area 619 releasably connects the cap 616 to the engagement area 642 of the spout 521. The cap 616 is attached to the spout 251 when the spout 521 is in the retracted position, however, the cap 616 may also be connected to the spout 521 when the spout 521 is it in the extended position. The wingnut cap 616 extends past the plane 610 of the rim 612, however, some caps may have a different configuration that does not extend past the plane of the rim.

Figure 19:
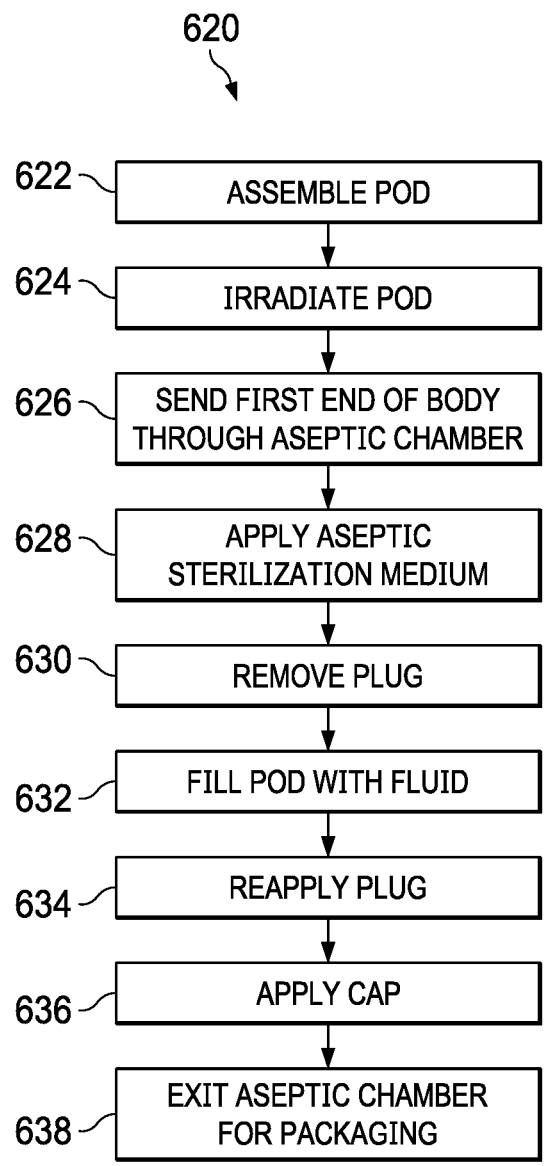
FIG. 19 is a schematic flow diagram of packaging, aseptic sterilization, filling, and sealing steps of an aseptic packaging system.

FIG. 19 is a schematic flow diagram 620 of packaging, aseptic sterilization, filling, and sealing steps of an aseptic packaging system. Although described with references to FIGS. 10A-18B, the method 620 can be performed with other pods. The can 520 is assembled (step 622) by overmolding the spout 521 to the body 522 (FIGS. 10A and 10B), applying the plug 550 to the spout 521 (FIGS. 11A and 11B), inserting the paddle 560 into the open (second) end 526 of the body 522 (FIG. 12), and seaming the base 580 to the open end 526 of the body 522 (FIGS. 13A and 13B). The spout 521 is in the extended position. Seaming the base 580 to the body 522 creates a hermetic seal between the open end 526 of the body 522 and the base 580. This can 520 contains no fluid and is herein referred to as an "empty" pod, though the can 520 does contain the paddle 560.

The empty can 520 is irradiated (step 624) to sterilize the interior and exterior of the empty can 520. For example, the irradiation sterilization can be performed by applying Gamma radiation (up to log 5 of inactivation of pathogens) to the pods 520. Gamma rays (measured in kiloGrays (kGy)) pass readily through plastics and kill bacteria by breaking the covalent bonds of bacterial DNA. After a mean bioburden of the pod (or each of the body, the base, the cap, and the mixing paddle) is quantified and sensitivity to a low radiation dose (8-10 kGy) is established, a statistically determined higher dose (typically >25 kGy) can be applied to provide the appropriate sterility assurance safety margin for every unit in the batch. This safety margin is similar to that of moist heat sterilization, where a target of $<10^6$ probability of a non-sterile unit (Sterility Assurance Level, SAL) is established.

During irradiation sterilization, Cobalt 60 is stored safely in a pool of water, and a chamber above the pool is surrounded by a thick concrete barrier that prevents gamma rays from escaping when the gamma source is elevated into the irradiation chamber. Products for sterilization is packaged, palletized, and transported into the irradiation chamber using a conveyor.

The minimum sterilizing dose for the pod, is influenced by the pallet-load configuration and the density or the material and/or configuration. Dose-measuring devices (dosimeters) are distributed throughout the packaged load to confirm that the minimum sterilizing dose is reached throughout the batch. Because the received dose can vary based on the density of the materials, the materials are typically qualified to withstand up to 50 kGy to ensure the minimum sterilizing dose can be achieved throughout the batch.

Gamma irradiation uses gamma rays emitted by the radioactive decay of atomic nuclei to kill microorganisms throughout the product and its packaging with little temperature change and without residues. The amount of radiation received depends on the type of product and its dose requirements. Other sterilization techniques may also be used to sterilize the pod. This step may be performed at different location than the filling.

The empty can 520 is then arranged so that the domed end 524 of the can 520 enters an aseptic chamber of a filling unit (step 626). The filling unit may grasp the first end of the can 520 using a clamp, sealing the domed end 524 of the can 520 in the aseptic chamber, separate from the rest of the can 520. In some cases, the sterilization machine grasps the pod by the spout so that only the spout enters the aseptic chamber. In some approaches, the entire can enters the aseptic chamber.

Upon entering the chamber being maintained under aseptic conditions, exterior surfaces of can portions that enter the chamber are sterilized, for example, to kill microorganisms deposited on exterior surfaces of the cans during movement to the filling station. In some approaches, exterior surfaces of the first end 254 of the body 525, the spout 521, and the plug 550 are sterilized by spraying a vaporized sterilization medium (e.g., vaporized hydrogen peroxide, steam, gaseous ozone, or vaporized nitrogen) (step 628) on the domed end 524 of the body 522, spout 521, and plug 550.

The plug 550 is then removed from the spout 521 while still in the aseptic chamber (step 630). A nozzle 602 of a dispensing system 600 extends through the channel 542, as shown in FIG. 13, and begins to fill the can 520 with the fluid 606 (step 632), for example, liquid ice cream mix, as shown in FIG. 14. The dispensing system 600 is located within the aseptic chamber of the filling unit. The can 520 receives the liquid ice cream mix (e.g., until the can 520 is about half full). The dispensing system may meter the volume of the dispensed liquid using a flow meter, a timer, and/or the weight of the fluid source 604 or the can 520. The dispensing system 600 may include a controller to determine the amount of dispensed liquid and to control the aseptic sterilizing machine. Some dispensing systems use touchless dispensing to prevent cross contamination. In some systems, after dispensing, the dispensing system discharges air to clear fluid from the driveshaft connector or the blade. Some nozzles are arranged with multiple heads to release angled streams of fluid downwards, towards the walls rather than vertically downwards.

When the proper volume or weight of ice cream mix has been transferred, the nozzle 602 is removed from the channel 542 and the plug 550 is returned (step 634) to the spout 521, as shown in FIG. 16. The spout 521 is pressed into the retracted position. In some methods the spout is moved into the retracted position before returning the cap onto the spout. The cap 616 is then applied onto the plug 550 and spout 521 (step 636). The first interior attachment area 618 of the cap 616 attaches to the plug 550 and the second interior attachment area 619 releasably engages the spout 521. The first interior attachment area 618, may be for example, flexible arms that engage a portion or edge of the cover. The second interior attachment area 619 may be flexible arms, or threads that engage with corresponding threads on the engagement surface 544 of the spout 521. The cap 616 reinforces the hermetic seal formed by the spout 521 and the plug 550. Some caps are tamper proof caps that provide evidence of tampering prior to the intended use of the pod.

The can 520 leaves the aseptic chamber and filling unit (step 638) and is prepared for shipment and packaging. In some methods, the cap 616 is applied to the plug 550 and spout 521 after exiting the aseptic chamber and/or the filling unit.

Figure 20:
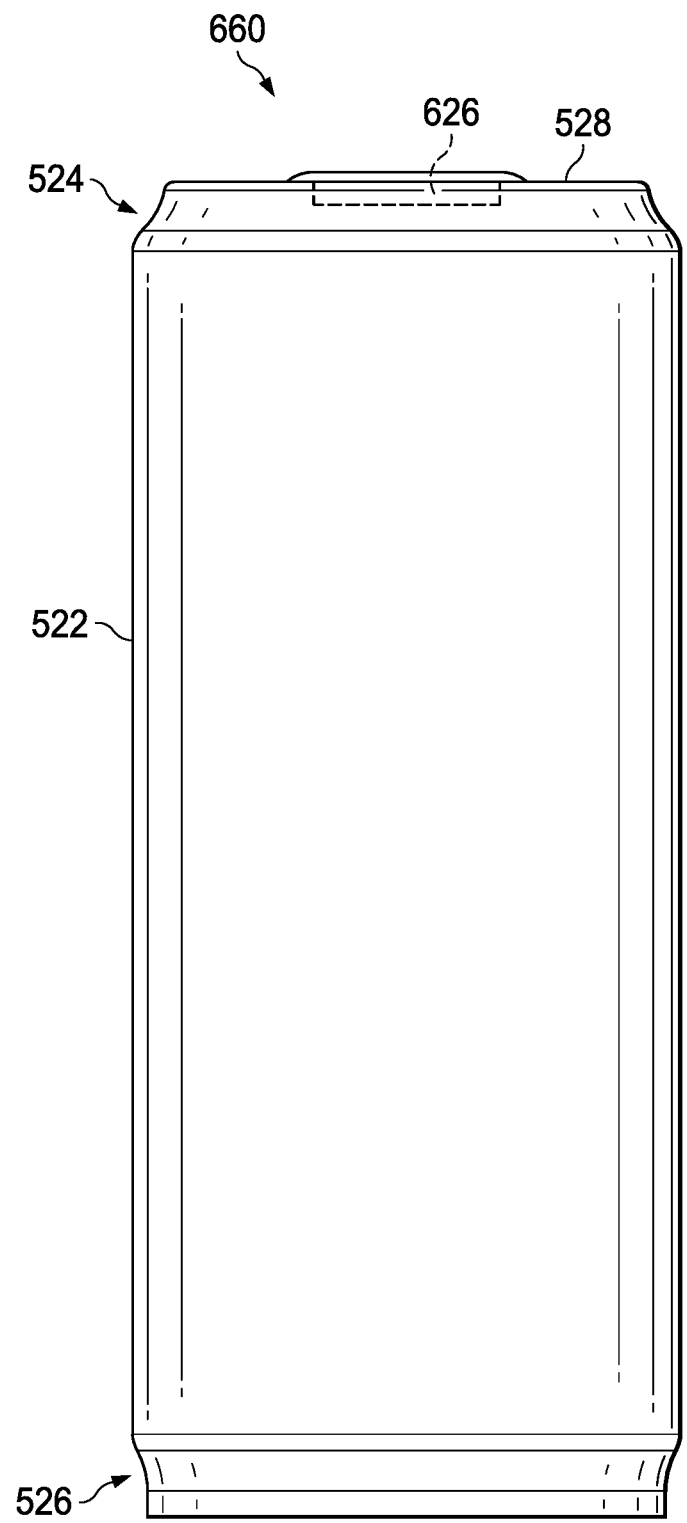
FIG. 20 is a view of an empty body of a pod.

FIG. 20 is a side view of a body 522 of a pod 660. The pod 660 is substantially similar to the can 520, however the body 522 of the pod 660 has an attachment arranged in or on the aperture 528 of the domed end 524. The attachment in the pod 660 is a nut 626 defining an opening with a threaded inner surface. The opening of the nut 626 is aligned with the aperture 528 of the domed end 524 of the body 522 of the pod 660. When inserted into a machine, the nut and aperture can receive a sterile driveshaft from a machine. A puncturable cover may extend over the aperture defined by the domed end or may extend over the opening defined by the attachment. The puncturable cover may be a gasket, pierceable membrane, valve, or a thin aluminum cover. The pod 660 is filled using an aseptic filling method that is different than the method 620 described with reference to FIG. 19.

Figure 21:
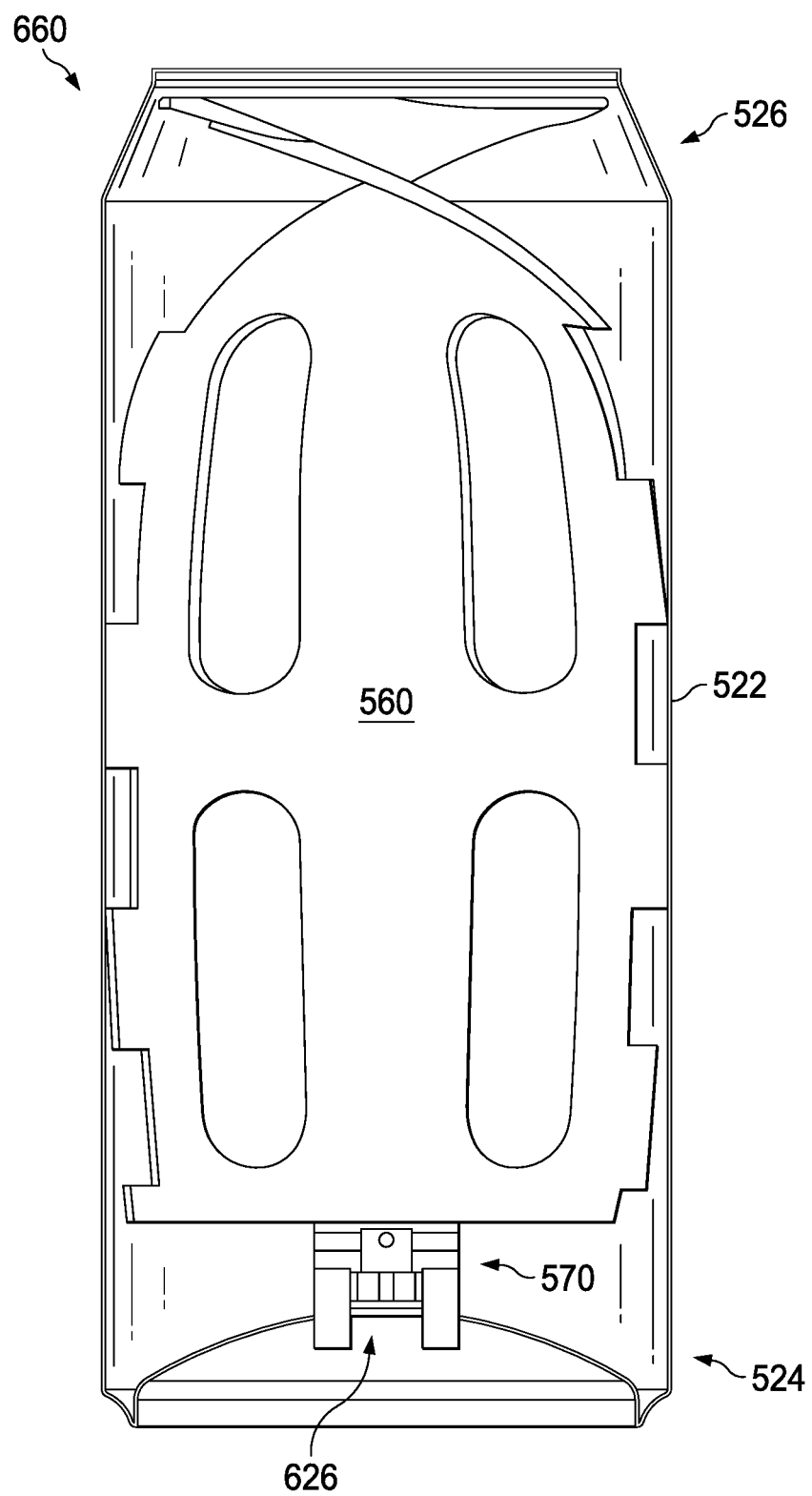
FIG. 21 is a view of a paddle inserted into the body of the pod.

FIG. 21 is a cross-sectional side view of the pod 660 with the paddle 560 inserted through the open (second) end 526 of the body 522. The driveshaft connector (recess 570) is aligned with the opening in the nut 626. When fully assembled, threads on an outer surface of the drive shaft connector mate with inner threads of the nut 626, connecting the mixing paddle 560 to the nut 626, and by extension the body 522 of the pod 660. The nut 626 can be inserted into the aperture 528 so that the nut 626 extends partially into the pod body 522 and partially out of the pod body 522. In some pods, the nut is glued to the domed end of the pod. The nut can be aligned with the aperture defined in the domed end of the pod so that the driveshaft connector of the mixing paddle extends through the aperture to mate with the nut. When fully threaded together, the attachment and the driveshaft connector form a (first) fluid seal.

Figure 22:
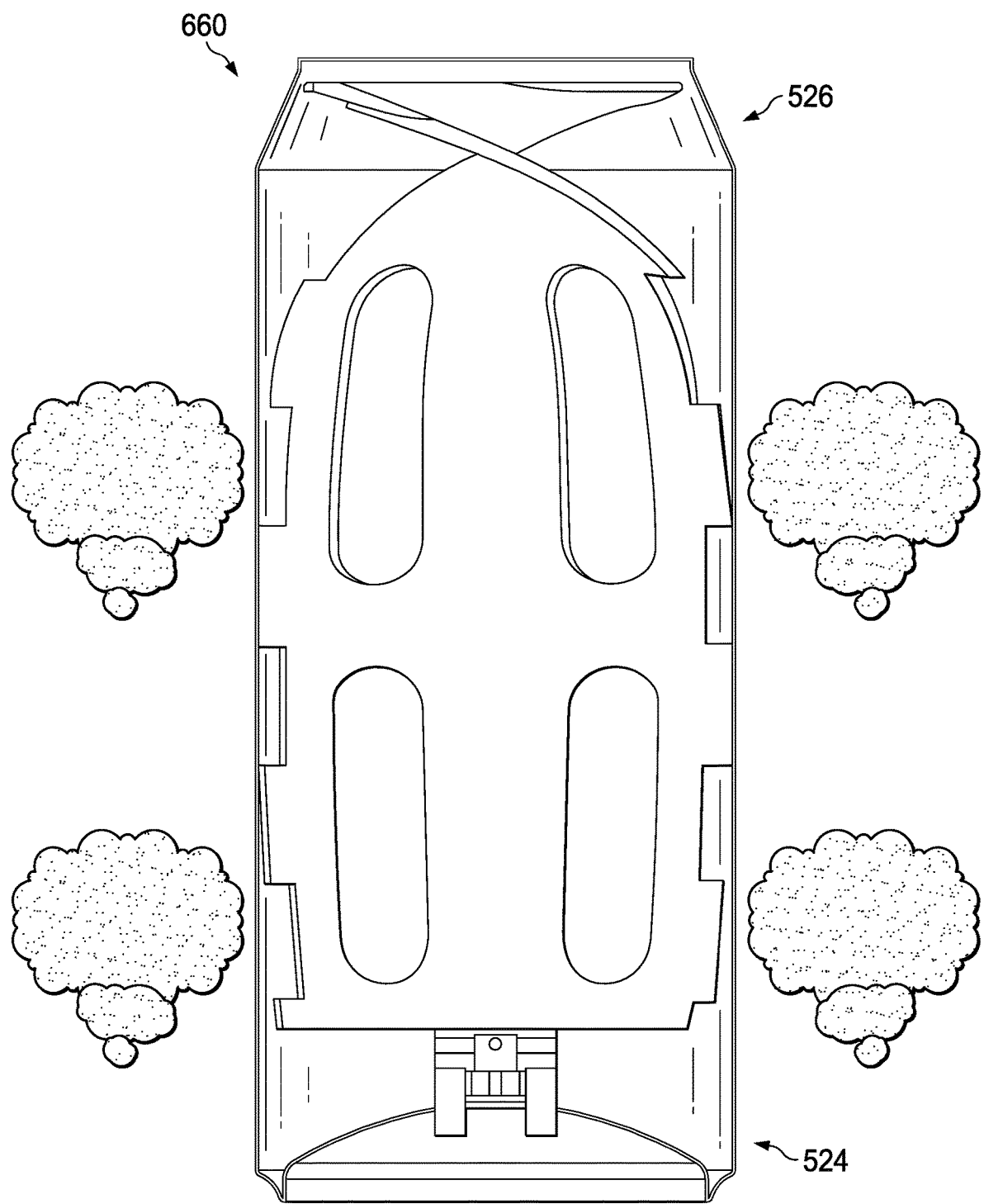
FIG. 22 is a view of hydrogen peroxide vapor sterilizing the pod.

FIG. 22 is a cross-sectional side view of vaporized aseptic sterilization medium (e.g., vaporized hydrogen peroxide) being applied to the body 522 and the paddle 560. The aseptic sterilization medium is also applied to the base 580 (not shown). The vaporized hydrogen peroxide sterilizes the exterior and interior 540 of the body 522 and the paddle 560. The attachment and the driveshaft connector may be partially threaded together so as to allow the flow of the sterilization medium to reach the inner surface of the attachment and the outer surface of the driveshaft connector. In some cases, the mixing paddle and pod are sterilized as individual components then assembled together after sterilization.

Figure 23:
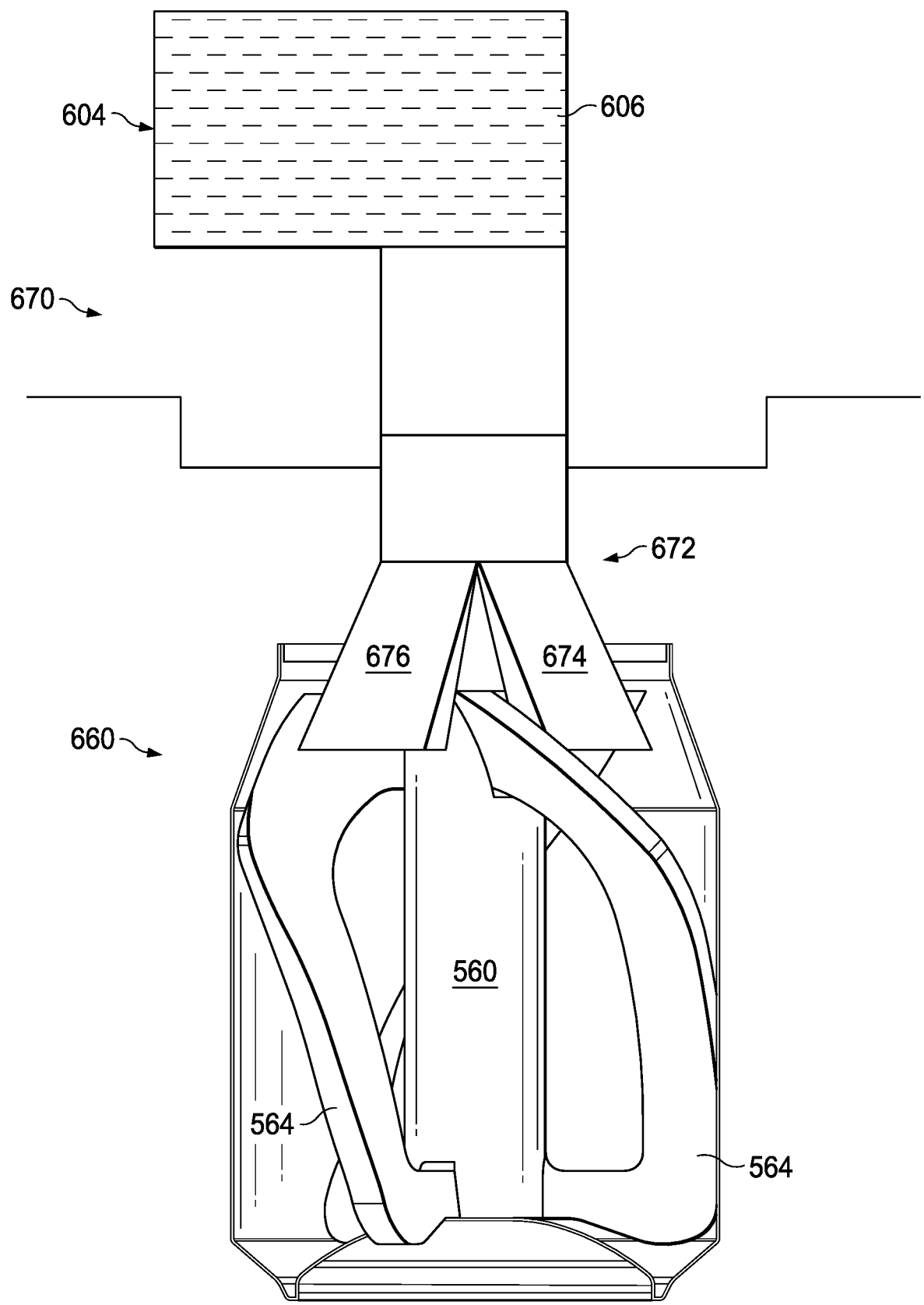
FIG. 23 is a view of the pod being filled with fluid.

FIG. 23 is a view of the pod 660 with a dispensing system 670. The dispensing system 670 is substantially similar to dispensing system 600 however dispensing system 670 includes a multi-headed nozzle 672 that is arranged between the blades 564 of the paddle 560, rather than the nozzle 602. The multi-headed nozzle 672 includes a first head 674 and a second head 676. The first head 674 is arranged on one side of the blade 564 and the second head 676 is arranged on the other side of the blade 564. This configuration reduces the likelihood of liquid from contacting the driveshaft connector of the blade and reduces the risk of liquid spill due to liquid hitting the mixing paddle. The dispensing system receives sterilized food or drink. The food or drink can be sterilized by passing the food or drink through an ultra-high temperature (UHT) processing system or a high-temperature, short-time (HTST) processing system. Fluid, for example, liquid ice cream mix, flows through the heads 674, 676 of the nozzle 672 from the fluid source 604, and into the pod 660.

Figure 24:
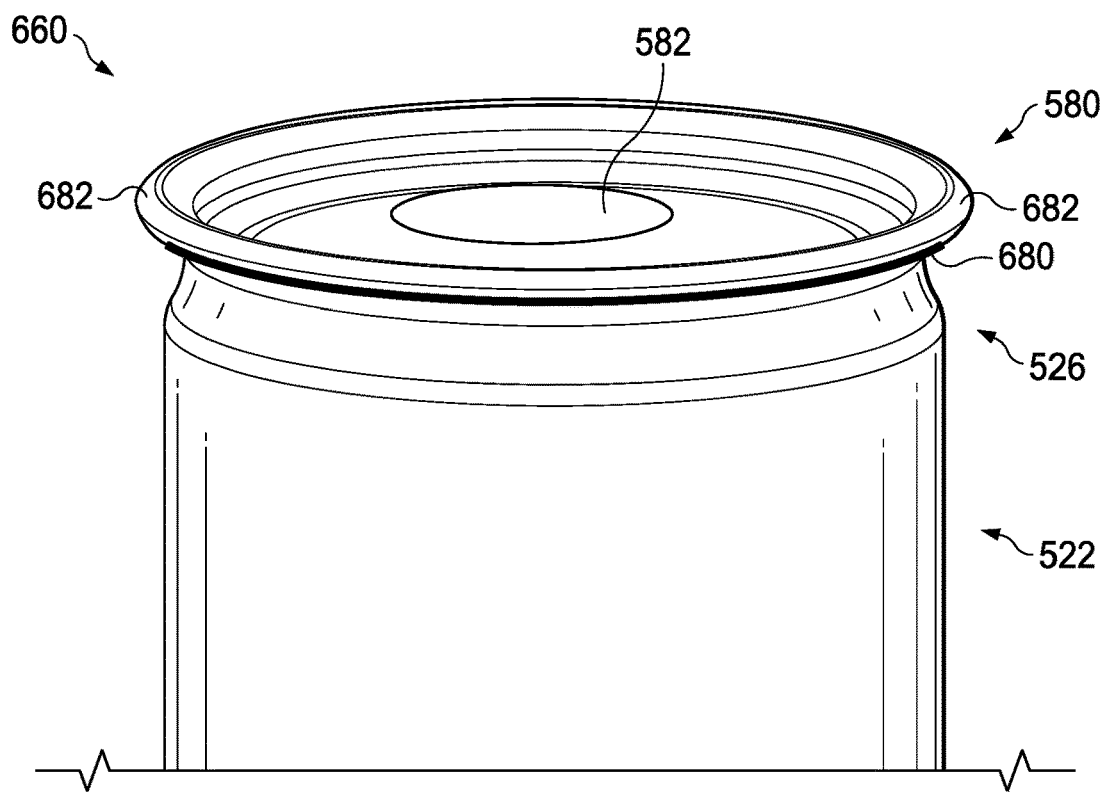
FIG. 24 is a view of a base adhered to the body.

FIG. 24 is a cross-sectional side view of the open end 526 of the body 522 of the pod 660 with the base 580. An adhesive layer 680 lies between the base 580 and the open end 526 of the body 522 to hermetically seal the base 580 to the open end 526. The adhesive layer includes a food safe adhesive. Some adhesive layers are formed by melting a food safe material, for example, metal or plastic. Some adhesive layers are food safe resins that adhere to and are compliant with FDA Station 175.105 or 21 CFR Stations 177.1395 laminate structures for use up to 250° F. and 177.1390 laminate structures for use above 250° F. Some adhesive layers are inductively or conductively sealed.

Figure 25:
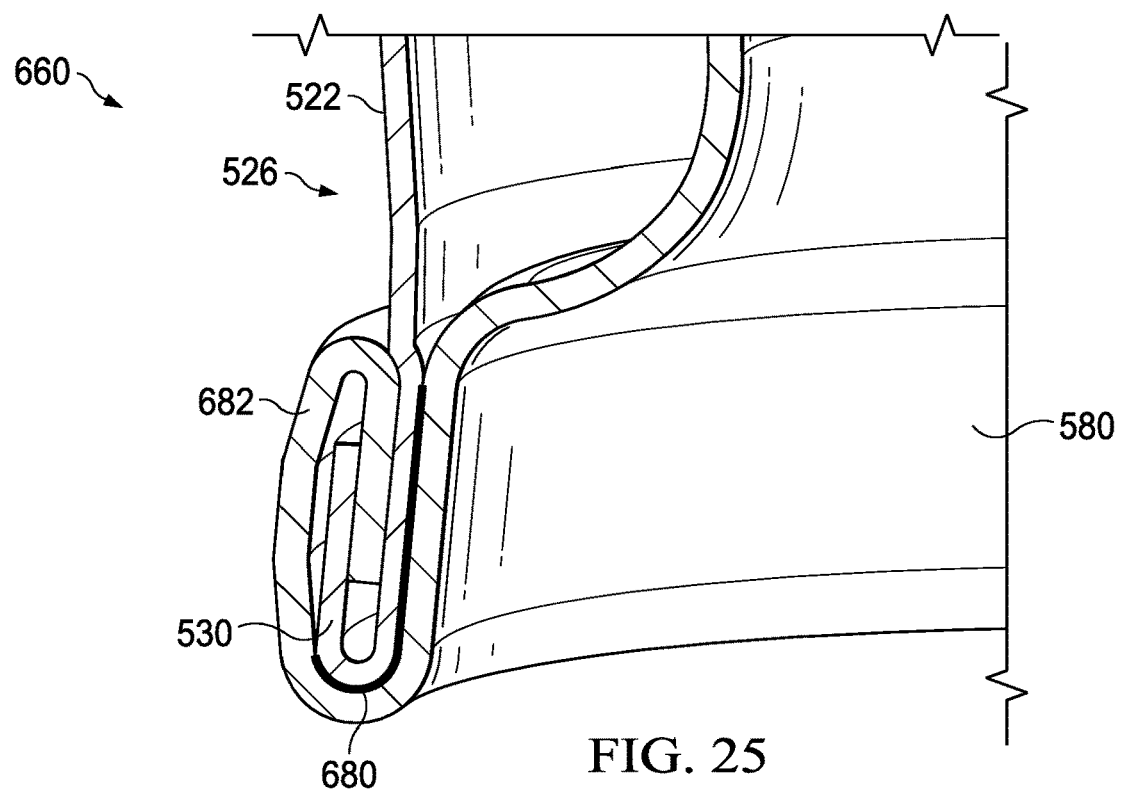
FIG. 25 is a view of the base being seamed to the body.

FIG. 25 is a cross-sectional side view of the base 580 attached to the open end 526 of the body 522 of the pod 660 with the adhesive layer 680. As described with reference to FIGS. 13A and 13B, the base 580 is attached by crimping or seaming edges 682 of the base 580 to the body 522 of the can 520 to cover the open end 526 of the body 522. During manufacturing, the base 580 is first adhered to the body 522 then seamed to the body 522 to maintain the position of the paddle 560 within the interior 540 of the can 520 and to maintain the sterility of the contents of the can 520. The protrusion 582 of the base 580 can be formed, for example, by stamping, deep drawing, or heading a sheet of aluminum being used to form the base.

Figure 26A:
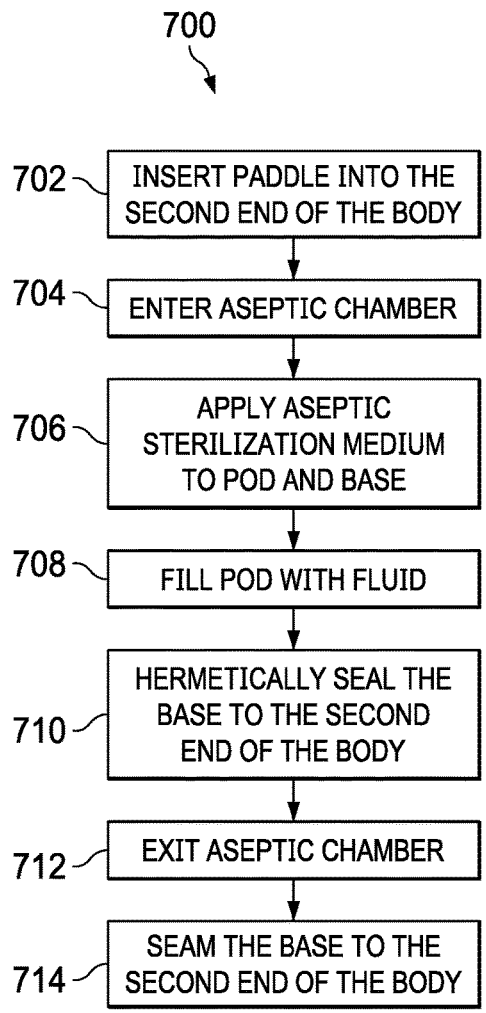
FIG. 26A is a schematic flow diagram of packaging, aseptic sterilization, filling, and sealing steps of an aseptic packaging system.

FIG. 26A is a schematic flow diagram of a method 700 of aseptically filling containers (e.g., pods). Although described with reference to FIGS. 19-24 (e.g., the pod 660), the method 700 can be used to fill other pods. In the method 700, the pod 660 is assembled prior to entering the filling unit. The filling unit has an aseptic chamber with an inlet, a sterilization station, a connection tightening station, a sealing station, and an outlet.

The pod is assembled by inserting the paddle 560 into the open (second) end 526 of the body 522 (step 702), as shown in FIG. 21. The driveshaft connector 270 is aligned with the nut 626. The mixing paddle 560 is rotated to partially thread the driveshaft connector 270 and nut 626 together in a loose connection. Various other internal components are also added to the pod, for example an O-ring may be inserted into the pod 660. In this configuration, the pod 660 is assembled with loose connections between internal components. The loose connections allow for the sterilizing medium to reach all surfaces of the internal components. For example, the nut 626 and a first O-ring are be glued first to the domed end of the body of the pod. The driveshaft connector 270, attached to the mixing paddle 560, is coupled with a second O-ring. The driveshaft connector 270 is then loosely screwed into the nut 626 through the aperture in the can. The driveshaft connector 270 would be tightened to the nut after sterilization using a robotic arm or simple mechanical torqueing system. The first O-ring is arranged between the body of the pod and the nut. The second O-ring is arranged between the body of the pod and the driveshaft connector.

The body 522 of the pod 660, holding the paddle 560, enters the aseptic chamber at the inlet of the filling unit with the open (second) end 526 facing up (step 704). The base 580 (not shown) also enters the inlet of the aseptic chamber of the filling unit. The body 522 and paddle 560 are moved together into the sterilization station and are sterilized using the vaporized aseptic sterilization medium, hydrogen peroxide (step 706) as shown in FIG. 22. Vaporized hydrogen peroxide also sterilizes the base 580. Due to the loose partially threaded connection between the driveshaft connector 270 and the nut 626, the sterilization medium also contacts the internal surface of the nut 626 and the outer surface of the driveshaft connector 270. Some machines include vibration units that vibrate the body 522 of the pod 660, holding the paddle 560, to assist the sterilizing gas in contacting the surface of all components.

After sterilization, the body 522 with the mixing paddle 560 and other components, move into the connection tightening station of the aseptic chamber. The filling unit, or a tightening robot located within the filling unit, rotates the mixing paddle to tighten the driveshaft connector 270 to the nut 626. The tightening robot can rotate the mixing paddle by gripping and rotating the blades. Some tightening robots insert a sterile driveshaft through the opening of the nut and the aperture to connect with the driveshaft connector of the mixing paddle. The tightening robot then rotates the mixing paddle by rotating the sterile driveshaft. When tightened together, a tight (first) fluid seal forms between the driveshaft connector 270 and the nut 626. In some cases, the connection between the driveshaft connector and the nut may be a snap fit, a multi-snap fit. An (first) O-ring may be disposed between the driveshaft connector and the body of the pod. A (second) O-ring may be disposed between the attachment (nut) and the body of the pod. The O-rings are arranged on domed end of the body of the pod so that openings in the O-rings are aligned with the aperture of the domed end of the body of the pod. The O-rings can have an inner diameter that is equal to or greater than a diameter of the aperture.

The dispensing system 670 is located within the filling station of the aseptic chamber of the filling unit. The pod body 522, in tight connection with the mixing paddle 560, enter the filling station of the aseptic chamber. The open end 526 of the body 522 receives the nozzle 672 and fluid 606, for example, liquid ice cream mix, flows from the dispensing system 670 into the body 522, shown in FIG. 24 (step 708). Once the body 522 is about 40-80% full with ice cream mix, the dispensing system 670 stops dispensing the fluid 606. The dispensing system may meter the volume of the dispensed liquid using a flow meter, a timer, and/or the weight of the fluid source 604 or the pod 660. The dispensing system may include a controller to determine the amount of dispensed liquid and to control the aseptic sterilizing machine. Some dispensing systems use touchless dispensing to prevent cross contamination. In some cases, liquefied gas is injected into the body of the pod (can) to generate an internal pressure of between 5 psi and 50 psi above atmospheric pressure. The liquefied gas may be sterilized to eradicate microbial contamination prior to being injected into the pod body (can). The food-safe adhesive provides sufficient bond strength to maintain the internal pressure both while the can is inside the aseptic chamber and during the mechanical seaming after being removed from the aseptic chamber.

The body 522, paddle 560, and liquid ice cream mix 606, are moved to the sealing station of the aseptic chamber. The filling unit, or a sealing machine arranged in the filling unit, applies the adhesive layer 680 to the open end 526 of the body 522. In some methods, the adhesive layer is applied to the base or both the base and the open end of the body. In some cases, the adhesive layer is applied to the base prior to the base entering the aseptic chamber of the filling unit. The base 580 is placed on the adhesive layer 680 to hermetically seal and secure the base 580 to the body 522 (step 710). The hermetic (second) seal formed by the adhesive layer 680 maintains the sterility of the ice cream mix 606. The filling unit may apply light, heat, and/or pressure to cure the adhesive layer and form the hermetic seal.

The pod 660 exits the aseptic chamber and the filling unit (step 712) by the export station. A seaming machine roll seams the edges 682 of the base 580 to the open end 526 of the body 522 (step 714). Seaming the base 580 to the body 522 strengthens the connection between the base 580 and body 522 and improves the hermetic seal. In some methods, the roll seaming machine may be located within the aseptic chamber in a roll seaming station. The roll seaming station may be a substation of the sealing station. In such embodiments, the roll seaming machine includes aseptic compatible lubricants, grease, and components so as to maintain the aseptic environment within the aseptic chamber. In some cases, some mechanisms of the roll seaming machine may be isolated outside of the aseptic chamber. For example, a head of the seamer used for contacting and seaming the base to the pod may be arranged in the aseptic chamber (e.g., while all other mechanisms and lubricants are located outside of the sterile zone).

Figure 26B:
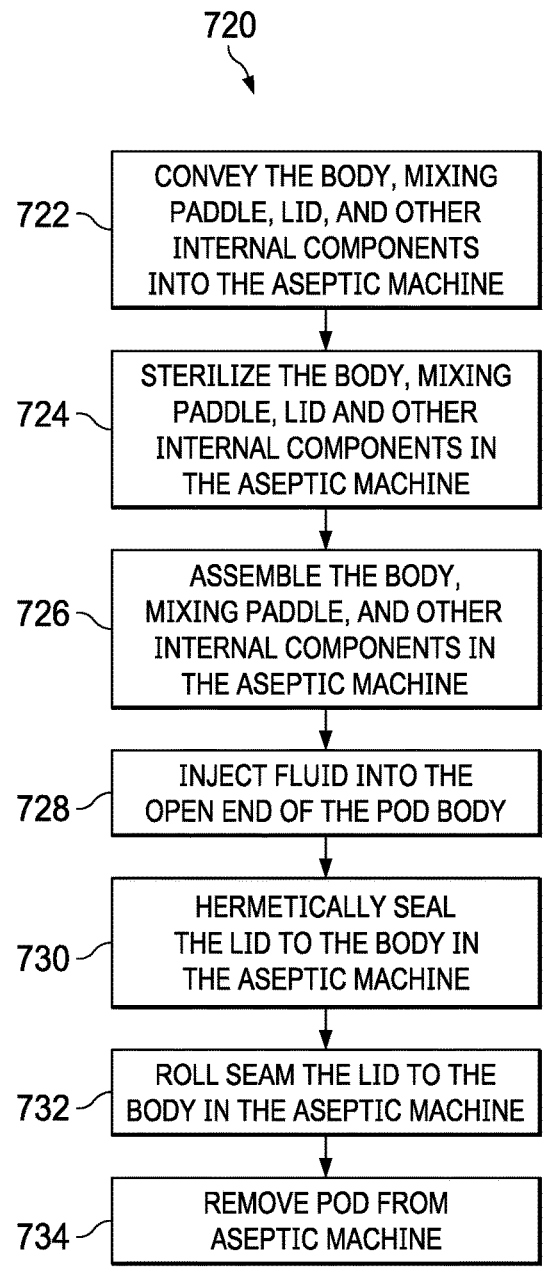
FIG. 26B is a schematic flow diagram of packaging, aseptic sterilization, filling, and sealing steps of an aseptic packaging system.

FIG. 26B is a schematic flow diagram of a method 720 of packaging, aseptic sterilization, filling, and sealing steps of the aseptic packaging system. Although described with reference to FIGS. 19-24 (e.g., the pod 660), the method 720 can be performed with other pods. In the method 720, the pod 660 is assembled after sterilization in the aseptic chamber. In this approach, the filling unit has an aseptic chamber with multiple stations for each processing step. The aseptic chamber has an inlet, a sterilization station, an assembly station, a fluid injection station, a sealing station, and an export station.

The body 522 of the pod 660, the mixing paddle 560, the base 580, and other internal components of the pod 660 enters the aseptic chamber (step 722) at the inlet. The body 522 is oriented with the open (second) end 526 open to the aseptic environment. The body 522 of the pod 660, the mixing paddle 560, the base 580, and the other internal components of the pod 660 are moved into the sterilization station of the aseptic chamber and are sterilized individually using the vaporized aseptic sterilization medium (e.g., hydrogen peroxide) (step 724). The internal components may include the attachment (e.g., the nut 626). In some methods, the attachment is connected to the body 522 prior to sterilization. For example the nut may be glued to the domed end of the body outside of the aseptic chamber.

After sterilization, body 522 of the pod 660, the mixing paddle 560, the base 580, and the other internal components of the pod 660 are moved into the assembly station. The filling unit, or an assembly robot within the filling unit, assembles the pod 660 (step 726). In some methods, the pod 660 is assembled by gluing the nut 626 to the domed end 524 of the body 522 so that the nut 626 aligns with the aperture 528. Assembling the pod 660 also includes inserting the mixing paddle 560 through the open end 526 of the body 522 and tightly connecting the nut 626 to the driveshaft connector 570 (e.g., by threaded connection) so that the internal surface of the nut and the outer surface of the driveshaft connector 570 form a fluid seal. In some cases, the connection between the driveshaft connector and the nut may be a snap fit, or a multi-snap fit. In some methods, the nut 626 is held in alignment by a machine, rather than glued to or formed with the body 522. In such an embodiments, the threaded connection between the driveshaft connector and the nut holds the nut in place on the domed end of the body.

The pod body 522, mixing paddle 560, and other internal components move into the dispensing system located in the aseptic chamber of the filling unit. The open end 526 of the body 522 receives the nozzle 672 and fluid 606, for example, liquid ice cream mix, flows from the dispensing system 670 into the body 522 (step 728), shown in FIG. 26B. Once the body 522 is about 40-80% full with fluid 606 (e.g., ice cream mix), the dispensing system 670 stops dispensing the fluid 606. The dispensing system may meter the volume of the dispensed liquid using a flow meter, a timer, and/or the weight of the fluid source 604 or the pod 660. The dispensing system may include a controller to determine the amount of dispensed liquid and to control the aseptic sterilizing machine. Some dispensing systems use touchless dispensing to prevent cross contamination. In some cases, liquefied gas is injected into the body of the pod (can) to generate an internal pressure. The liquefied gas is injected in an injection station of the aseptic chamber, immediately before sealing the base to the body. The injection station of the aseptic chamber is directly prior or adjacent to the sealing station the aseptic chamber. The internal pressure can be between about 5 psi and about 50 psi above atmospheric pressure. The liquefied gas may be sterilized to eradicate microbial contamination prior to being injected into the pod body (can). The food-safe adhesive provides sufficient bond strength to maintain the internal pressure both while the can is inside the aseptic chamber and during the mechanical seaming outside the aseptic chamber.

The body 522, paddle 560, and fluid 606, are moved to a sealing station of the aseptic chamber. The filling unit applies the adhesive layer 680 to the open end 526 of the body 522. In some methods, the adhesive layer is applied to the base or both the base and the open end of the body. The base 580 is placed on the adhesive layer 680 to hermetically seal and secure the base 580 to the body 522 (step 730). The hermetic seal formed by the adhesive layer 680 maintains the sterility of the ice cream mix 606. The filling unit may apply light, heat, and/or pressure to cure the adhesive layer and form the hermetic seal.

The hermetically sealed pods 660 are moved to a seaming station of the aseptic chamber. A (roll) seaming machine, compatible with aseptic environment, roll seams the edges 682 of the base 580 to the open end 526 of the body 522 (step 732). The roll seaming machine includes aseptic compatible lubricants, grease, and components so as to maintain the aseptic environment within the aseptic chamber while all other mechanisms and lubricants are located outside of the sterile zone. Seaming the base 580 to the body 522 strengthens the connection between the base 580 and body 522 and improves the hermetic seal. In some methods, the roll seaming machine may be located outside the aseptic chamber. In such an embodiment, the hermetically sealed pod exits the filling unit and a seaming machine roll seams the edges of the base to the open end of the body. The hermetically sealed and roll seamed pod 660 then exits the filling unit (step 734) by the export station.

Figure 27A:
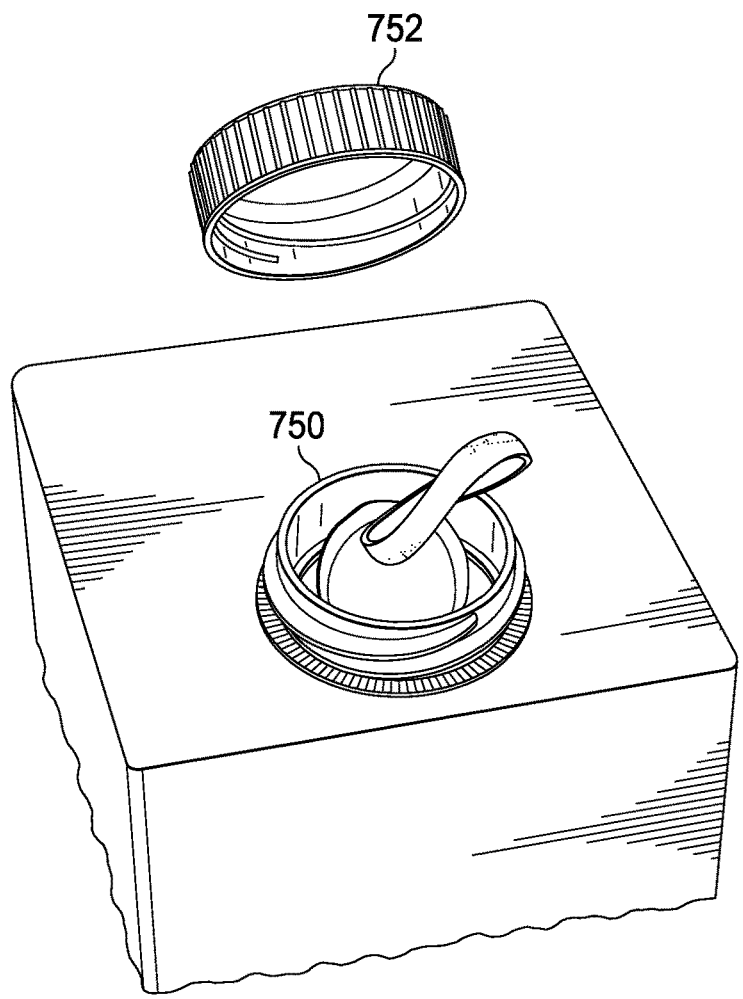
FIG. 27A is perspective view of a rigid spout on a pod.
Figure 27B:
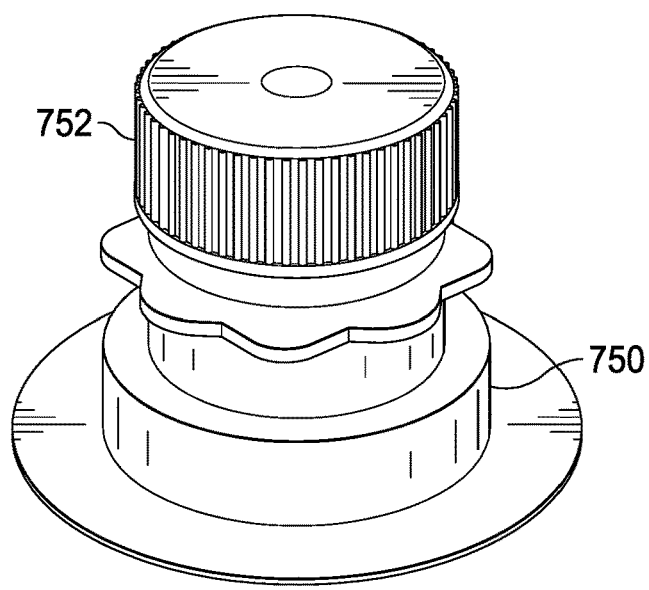
FIG. 27B is a perspective of the rigid spout with a cap, separated from the pod.

FIG. 27A is perspective view of a rigid spout 750 on a pod. FIG. 27B is a perspective of the rigid spout 750 with a cap 752, both separated from the pod. The spout 750 is substantially similar to the spout 521. However, the spout 750 is rigid without the flexible portion included in the spout 521. The spout 750 also has only one position in which the spout stands out from the first end 524 of the pod. Threads of the cap 752 are engagable with threads of the spout 750 to attach the cap 752 to the spout 750.

Figure 28A:
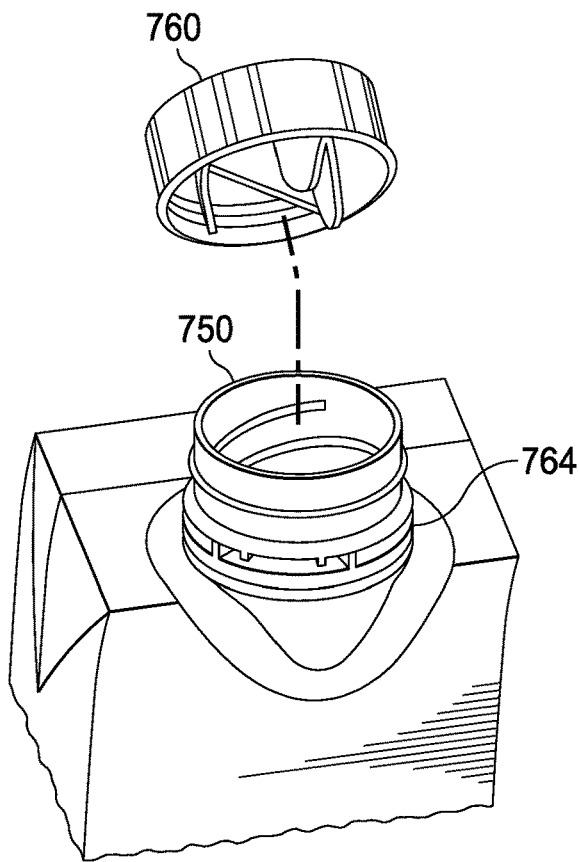
FIGS. 28A and 28B are perspective views of the rigid spout and a cutting cap.
Figure 28B:
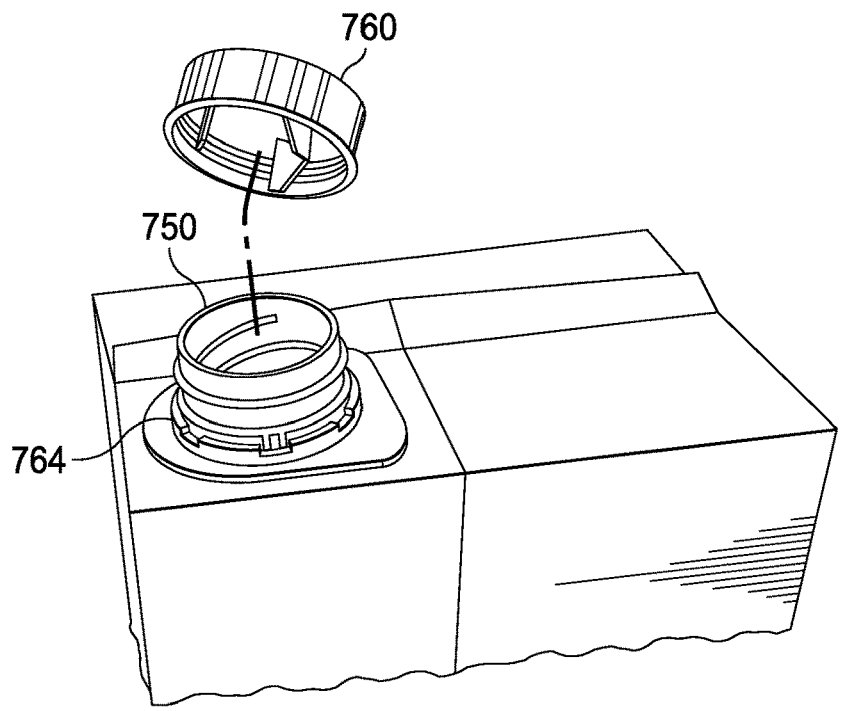
Figure 28C:
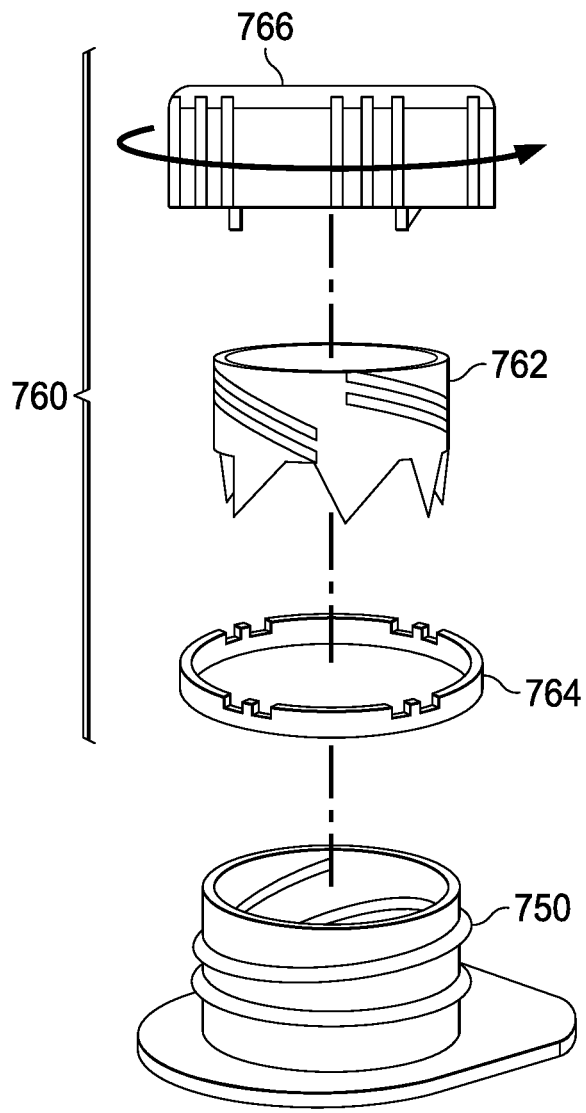
FIG. 28C is an exploded perspective view of the rigid spout and cutting cap.
Figure 29A:
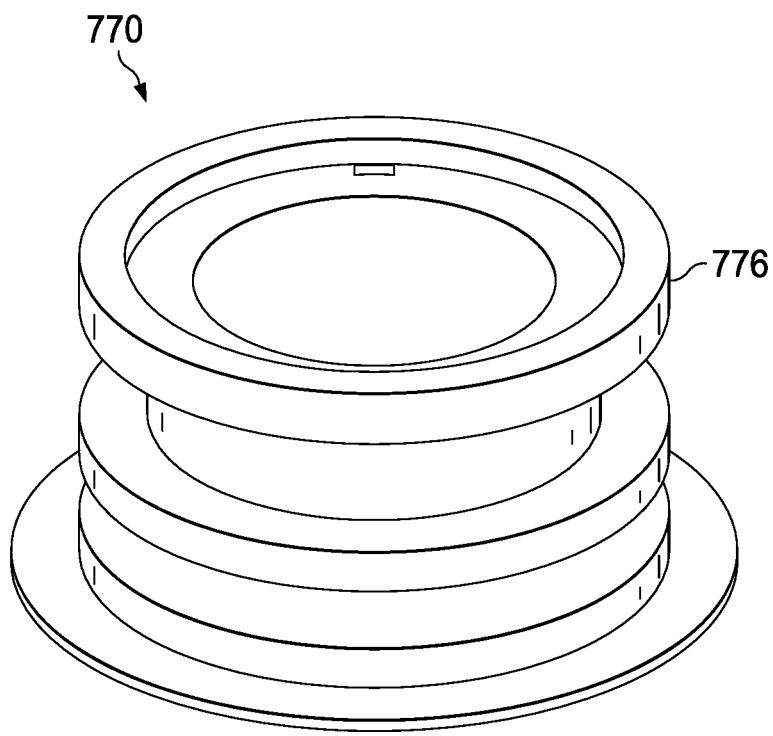
FIGS. 29A and 29B are perspective views of a spout and a resilient cap.
Figure 29B:
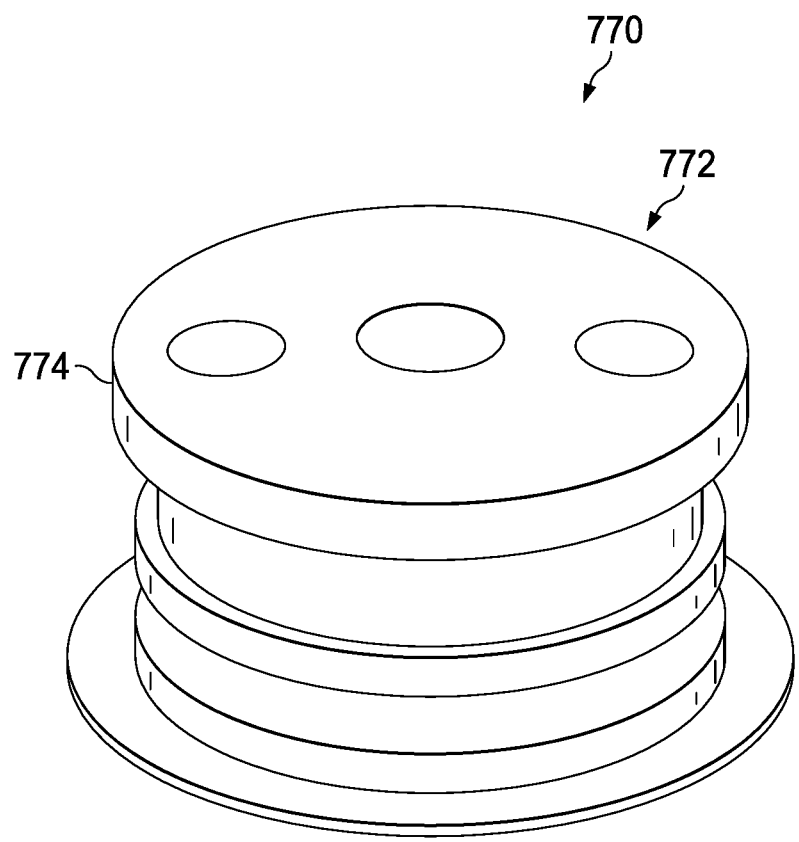

FIGS. 28A and 28B are perspective views of the rigid spout 750 and a cutting cap 760 threadedly engagable with the spout 750. FIG. 27C is an exploded perspective view of the spout 750 and cap 760. The cap includes a cutter 762 having toothed edges for cutting a plug, seal, or membrane in the interior of the spout 750. The cap 760 also includes a tamper evident ring 764 that separates from the cap 760 when the cap 760 rotates to expose the spout 750. The cutter 762 extends from a cover 766 of the cap 760. Threads are arranged on the interior of the cover 766 for connected the cap 760 to the spout 750.

FIGS. 28A and 28B are perspective views of a spout 770 and a resilient cap 772. To engage the cap 752 with the spout 770, walls 774 of the cap 772 deflect radially outward to receive a lip 776 of the spout 770. Once past the lip 776, the walls relax radially inward to form a seal between the spout 770 and the cap 772. Some spouts are compressible and have a flexible station that folds axially, but remains outside of the pod.

Examples of a commercially available spouts are TertraPak spouts and Bag-in-Box spouts.

In some pods, the spout is arranged in, on, or formed with the base of the pod instead of from the domed station.

While the methods 700 and 720 have been described with reference to an aseptic chamber with multiple stations in a single aseptic chamber, some methods use a filling unit with a primary chamber and multiple secondary chambers. The primary chamber is connected to the secondary chambers by aseptic pass-through channels. The pass through channels maintain the aseptic environment in the filling unit. The secondary chambers can each include an inlet and a sterilization station. The secondary chambers receive at least one component at the inlet and sterilize the at least one component at the sterilization station of the secondary chamber. This configuration allows for customized sterilization for each components in series or in parallel. For example, the mixing paddle may enter a first secondary chamber and the pod body may enter a second secondary chamber. The first secondary chamber is equipped with a disinfectant bath and the second secondary chamber is equipped to perform dry disinfecting, or another vapor (gaseous) based disinfecting process. The mixing paddle and body are sterilized in the secondary chambers and then are conveyed by the pass through channels to the primary chamber. The primary chamber includes an assembly station, a sealing station, and a roll seaming station that assemble, seal, and seam the pod. Some filling units have a plurality of secondary chambers.

This can also prevent bottlenecking by performing a slow step in multiple chambers or stations, thereby increasing the speed of production. For example, assembling the mixing paddle with the body of the pod may require a longer time to execute, relative to the other steps (e.g., sealing, sterilizing, seaming or filling). The filling unit may include multiple secondary chambers, multiple tertiary chambers, or multiple assembling stations that assemble the mixing paddle with the body of the pod.

While a filling unit with a primary chamber and secondary chambers has been described, some filling units have tertiary chambers connected to each secondary chamber.

While a filling unit with multiple chambers connected by aseptic pass-throughs has been described, some units have transport systems that do not maintain aseptic conditions between chambers. In these units, pod components may be sterilized, sealed in sterile packaging, and stored for later use. The packaging containing the sterilized components is sterilized before entering an aseptic chamber where the packaging is opened and pod components extracted. The pre-packaged, sterile components can then be assembled. In some methods, some components may be prepackaged in aseptic packaging while other components are sterilized in real time in the filling unit.

While the method has been described as sealing, gluing, or applying epoxy to the base or body in a sealing station of the primary aseptic chamber, some methods include sterilizing the base prior to entering the primary aseptic chamber. The base, may be sterilized in a different filling unit or in the same filling unit, in a secondary chamber without aseptic connection to the primary aseptic chamber. In such a case the base or a multitude of bases may be sterilized and prepackaged in the sterile packaging. The filling unit can include a system for opening the base packaging so that the aseptic environment in the aseptic primary chamber is maintained. In some cases, a layer or epoxy or adhesive is applied to the base prior to entering the primary chamber, for example, in the different filling unit or secondary aseptic chamber. The epoxy can then be cured by heat, light, or pressure in the primary aseptic chamber, after unpacking the base and applying the base to the open end of the body.

A number of embodiments of the invention have been described Nevertheless, it will be understood that various modifications may be made without departing from the spirit and scope of the invention. Accordingly, other embodiments are within the scope of the following claims.

What is claimed is:

1. A method of manufacturing shelf stable pods containing food or drink to be rapidly cooled, the method comprising:
    inserting a mixing paddle into an aluminum can through an open end of a body of the aluminum can, wherein the mixing paddle is inserted into the aluminum can before the aluminum can is moved into a first aseptic chamber;
    sterilizing the aluminum can and mixing paddle at temperatures below a stress relief temperature of the aluminum can in the first aseptic chamber;
    filling the aluminum can with a sterilized food or drink in the first aseptic chamber;
    sealing a sterilized base of the aluminum can to the open end of the body of the aluminum can with a food-safe adhesive to create a hermetic seal;
    removing the aluminum can from the first aseptic chamber while maintaining the hermetic seal outside the first aseptic chamber; and
    mechanically seaming the sterilized base to the body of the aluminum can while maintaining the hermetic seal.

2. The method of claim 1, wherein removing the aluminum can and the sterilized base from the first aseptic chamber comprises moving the aluminum can and the sterilized base along a conveyor system.

3. The method of claim 1, further comprising:
    prior to sealing the sterilized base to the open end of the body of the aluminum can with the food-safe adhesive to create the hermetic seal, sterilizing the base in a second aseptic chamber; and
    transporting the sterilized base into the first aseptic chamber while maintaining the sterilized base in aseptic conditions.

4. The method of claim 1, wherein the sterilized base is comprised of aluminum.

5. The method of claim 1, wherein the food-safe adhesive is a food safe resin compliant with FDA Part 175.105 or 21 CFR Part 175.105 or 177.1395.

6. The method of claim 1, further comprising adding liquefied gas into the body of the aluminum can prior to sealing the sterilized base to the open end of the body of the aluminum can.

7. The method of claim 6, wherein the liquefied gas is sterilized to eradicate microbial contamination prior to being added into the aluminum can.

8. The method of claim 6, wherein the liquefied gas is injected in an amount to generate an internal pressure of about 5 psi to about 50 psi above atmospheric pressure after the sterilized base is sealed to the open end of the body of the aluminum can.

9. The method of claim 8, wherein the internal pressure is maintained outside the first aseptic chamber while mechanically seaming the sterilized base to the body of the aluminum can.

10. The method of claim 1, wherein the mixing paddle is inserted into the aluminum can before the aluminum can is moved into the first aseptic chamber.

11. The method of claim 1, wherein sealing the sterilized base to the open end of the body of the aluminum can with the food-safe adhesive comprises applying pressure to the sterilized base.

12. The method of claim 11, wherein sealing the sterilized base to the open end of the body of the aluminum can with the food-safe adhesive comprises applying the food-safe adhesive to the aluminum can.

13. The method of claim 11, wherein sealing the sterilized base to the open end of the body of the aluminum can with the food-safe adhesive comprises applying the food-safe adhesive to the sterilized base.

14. The method of claim 1, wherein seaming the sterilized base to the aluminum can comprises seaming the sterilized base to the aluminum can using a 2-roller can seamer.

15. The method of claim 1, wherein inserting the mixing paddle into the aluminum can through the open end of the body of the aluminum can comprises rotating the mixing paddle to partially thread a driveshaft connector and a nut together in a loose connection.

16. A method of manufacturing shelf stable pods containing food or drink to be rapidly cooled, the method comprising:
inserting a mixing paddle into an aluminum can through an open end of a body of the aluminum can;
sterilizing the aluminum can and mixing paddle at temperatures below a stress relief temperature of the aluminum can in a first aseptic chamber;
filling the aluminum can with a sterilized food or drink in the first aseptic chamber;
sealing a sterilized base of the aluminum can to the open end of the body of the aluminum can with a food-safe adhesive to create a hermetic seal;
adding liquefied gas into the body of the aluminum can prior to sealing the sterilized base to the open end of the body of the aluminum can, wherein the liquefied gas is injected in an amount to generate an internal pressure of about 5 psi to about 50 psi above atmospheric pressure after the sterilized base is sealed to the open end of the body of the aluminum can;
removing the aluminum can from the first aseptic chamber while maintaining the hermetic seal outside the first aseptic chamber; and
mechanically seaming the sterilized base to the body of the aluminum can while maintaining the hermetic seal, wherein the internal pressure is maintained outside the first aseptic chamber while mechanically seaming the sterilized base to the body of the aluminum can.

17. The method of claim 16, wherein removing the aluminum can and the sterilized base from the first aseptic chamber comprises moving the aluminum can and the sterilized base along a conveyor system.

18. The method of claim 16, further comprising:
prior to sealing the sterilized base to the open end of the body of the aluminum can with the food-safe adhesive to create the hermetic seal, sterilizing the base in a second aseptic chamber; and
transporting the sterilized base into the first aseptic chamber while maintaining the sterilized base in aseptic conditions.

19. The method of claim 16, wherein the sterilized base is comprised of aluminum.

20. The method of claim 16, wherein the food-safe adhesive is a food safe resin compliant with FDA Part 175.105 or 21 CFR Part 175.105 or 177.1395.

21. The method of claim 16, wherein the liquefied gas is sterilized to eradicate microbial contamination prior to being added into the aluminum can.

22. The method of claim 16, wherein the mixing paddle is inserted into the aluminum can before the aluminum can is moved into the first aseptic chamber.

23. The method of claim 16, wherein sealing the sterilized base to the open end of the body of the aluminum can with the food-safe adhesive comprises applying pressure to the sterilized base.

24. The method of claim 23, wherein sealing the sterilized base to the open end of the body of the aluminum can with the food-safe adhesive comprises applying the food-safe adhesive to the aluminum can.

25. The method of claim 23, wherein sealing the sterilized base to the open end of the body of the aluminum can with the food-safe adhesive comprises applying the food-safe adhesive to the sterilized base.

26. The method of claim 16, wherein seaming the sterilized base to the aluminum can comprises seaming the sterilized base to the aluminum can using a 2-roller can seamer.

27. The method of claim 16, wherein inserting the mixing paddle into the aluminum can through the open end of the body of the aluminum can comprises rotating the mixing paddle to partially thread a driveshaft connector and a nut together in a loose connection.

28. A method of manufacturing shelf stable pods containing food or drink to be rapidly cooled, the method comprising:
sterilizing a body of an aluminum can at temperatures below a stress relief temperature of the aluminum can in a first aseptic chamber of an aseptic filling system;
sterilizing a mixing paddle below a stress relief temperature of the mixing paddle in a second aseptic chamber of the aseptic filling system;
sterilizing a base below a stress relief temperature of the base in the aseptic filling system;
inserting the mixing paddle into the aluminum can through an open end of the body of the aluminum can in a primary aseptic chamber of the aseptic filling system;
aseptically filling the aluminum can with sterilized food or drink in the primary aseptic chamber;

securing the sterilized base to the open end of the body of the aluminum can with a food-safe adhesive to create a hermetic seal;

removing the aluminum can and the sterilized base from the primary aseptic chamber while maintaining the hermetic seal; and seaming the sterilized base to the aluminum can.

29. The method of claim 16, wherein the food-safe adhesive is a food safe resin compliant with FDA Part 175.105 or 21 CFR Part 175.105 or 177.1395.

30. The method of claim 29, further comprising adding liquefied gas into the body of the aluminum can prior to securing the sterilized base to the open end of the body of the aluminum can.

31. The method of claim 30, wherein the liquefied gas is sterilized to eradicate microbial contamination prior to being added into the aluminum can.

32. The method of claim 31, wherein the liquefied gas is injected in an amount to generate an internal pressure of about 5 psi to about 50 psi above atmospheric pressure after the sterilized base is secured to the open end of the body of the aluminum can.

33. The method of claim 32, wherein the internal pressure is maintained outside the first aseptic chamber while mechanically seaming the base to the body of the aluminum can.

34. The method of claim 33, wherein securing the sterilized base to the open end of the body of the aluminum can with the food-safe adhesive comprises applying the food-safe adhesive to the aluminum can.

35. The method of claim 33, wherein securing the sterilized base to the open end of the body of the aluminum can with the food-safe adhesive comprises applying the food-safe adhesive to the base.

36. The method of claim 33, wherein seaming the sterilized base to the aluminum can comprises seaming the sterilized base to the aluminum can using a 2-roller can seamer.

* * * * *